US012475867B2

(12) United States Patent
MacDonald et al.

(10) Patent No.: US 12,475,867 B2
(45) Date of Patent: Nov. 18, 2025

(54) AEROPHONE INSTRUMENT USING AIR-FILLED OBJECT

(71) Applicant: Orb Music Inc., Bethany (CA)

(72) Inventors: Jamus Adrian MacDonald, San Francisco, CA (US); Adam Jason Bagatavicius, Bethany (CA)

(73) Assignee: Orb Music, Inc., Bethany (CA)

( * ) Notice: Subject to any disclaimer, the term of this patent is extended or adjusted under 35 U.S.C. 154(b) by 0 days.

(21) Appl. No.: 18/245,087

(22) PCT Filed: Sep. 16, 2021

(86) PCT No.: PCT/CA2021/051293
§ 371 (c)(1),
(2) Date: Mar. 13, 2023

(87) PCT Pub. No.: WO2022/056635
PCT Pub. Date: Mar. 24, 2022

(65) Prior Publication Data
US 2024/0249705 A1 Jul. 25, 2024

(51) Int. Cl.
*G10D 9/10* (2020.01)
*G10D 7/00* (2006.01)

(52) U.S. Cl.
CPC ................. *G10D 9/10* (2020.02); *G10D 7/00* (2013.01)

(58) Field of Classification Search
CPC ................................... G10D 9/10; G10D 7/00
See application file for complete search history.

(56) References Cited

U.S. PATENT DOCUMENTS 1,313,705 A 8/1919 Lerch
2,509,429 A * 5/1950 Grow .................... G10D 7/063
84/380 B (Continued)

FOREIGN PATENT DOCUMENTS

CA 02764839 A1 1/2012
CN 205881437 U * 1/2017

(Continued)

OTHER PUBLICATIONS

European Search Report for application 21 867 989.2(Year: 2024).*

(Continued)

*Primary Examiner* — Robert W Horn
(74) *Attorney, Agent, or Firm* — Daniel C. Pierron; Widerman Malek, PL

(57) ABSTRACT

An apparatus for assembling an aerophone instrument including an air conduit with first and second ends and segments to provide an air passage; air inlets on the air conduit to create an air entry point for compressed air to be delivered into the air passage, air outlets on the air conduit to create an air exit point for the release of compressed air along the air pathways, each defined by the position of an air inlet and the position of an air outlets along the air conduit. An air-filled object is positioned to be operatively associated with the air conduit. Compressed air is deliverable to the air conduit through the air inlets, causing an area of a wall of the air-filled object to vibrate and causing compressed air to vibrate in the air passage compressed air exits the air conduit from the air outlets.

20 Claims, 45 Drawing Sheets

(56) References Cited

U.S. PATENT DOCUMENTS

| | | | | | |
|---|---|---|---|---|---|
| 3,756,112 | A * | 9/1973 | Adams | G10D 7/063 | 984/132 |
| 3,924,348 | A * | 12/1975 | Taylor | A63H 5/00 | 446/124 |
| D248,187 | S * | 6/1978 | Roe | D17/10 | |
| 4,539,888 | A * | 9/1985 | Whelan | G10D 7/063 | 984/145 |
| 4,704,934 | A * | 11/1987 | Nosrati | A63H 27/10 | 446/175 |
| 5,219,162 | A | 6/1993 | Orbanes et al. | | |
| 6,031,168 | A * | 2/2000 | Damm | G10D 7/063 | 84/465 |
| 6,126,634 | A | 10/2000 | Bagaoisan et al. | | |
| 6,483,017 | B1 | 11/2002 | Dill et al. | | |
| 6,672,930 | B1 * | 1/2004 | McElhaney | A63H 29/16 | 446/178 |
| 9,814,999 | B2 * | 11/2017 | Shaanti | A63H 5/00 | |
| 11,869,463 | B1 * | 1/2024 | Lazaroff | G10D 7/063 | |
| 11,922,909 | B2 * | 3/2024 | Duncan | G10D 7/063 | |
| 2005/0045022 | A1 * | 3/2005 | Gillis | G10D 7/063 | 84/380 B |
| 2006/0009319 | A1 | 1/2006 | Nelson et al. | | |
| 2014/0233780 | A1 | 8/2014 | Raisch et al. | | |
| 2024/0046904 | A1 * | 2/2024 | Stewart | G10D 7/063 | |
| 2024/0249705 | A1 * | 7/2024 | Bagatavicius | G10D 9/00 | |

FOREIGN PATENT DOCUMENTS

| | | | | |
|---|---|---|---|---|
| JP | 2015004755 | A * | 1/2015 | |
| WO | WO-2017168025 | A1 * | 10/2017 | G10D 9/06 |
| WO | 2018030551 | A2 | 2/2018 | |

OTHER PUBLICATIONS

Viewed in the Global Dossier, Supplementary European Search Report received in related European Patent Application No. 21867989.2, issued Aug. 13, 2024; 1 page.

* cited by examiner

AEROPHONE INSTRUMENT USING AIR-FILLED OBJECT

FIELD OF THE INVENTION

The present invention relates to the field of vibration generation through aerophone instruments using enclosed air-filled objects.

BACKGROUND OF THE INVENTION

The background to the invention provides information about the state of the art in the field relating to enclosed air-filled objects and the means for producing vibration and sound in aerophone instruments.

In the case of aerophones, an elastic material (such as but not limited to lips, wood, plastic, or metal) vibrates when in contact with the force of compressed air, which generates a musical tone. Despite using similar materials and air-based applications, there are currently no means available, to the best of our knowledge, to use an enclosed air-filled object as a musical vibration generator in an aerophone instrument. Air-filled objects such as toy balls and balloons, however, share similar material properties to vibration-generating objects like the musical reeds used in aerophone instruments. Both toy balls and musical reeds use air and elastic materials for deformation, whether for bouncing or to create vibration, respectively. In the case of balls and balloons, an elastic material encloses air, which allows the ball or balloon to maintain a resting three-dimensional profile.

Within the current state of the art, traditional aerophone instruments are hard to assemble, often involving an arduous and careful placement of precision manufactured reeds onto a mouthpiece. Reeds can be expensive, fragile, and easily chipped or otherwise damaged, which deters learning for young children and adults. The assembly of a musical reed uses fasteners to connect a reed to a mouthpiece or holder, and a slip fit connection between a mouthpiece and a horn. To add to the subtle complexity within the assembly, the reed tongue must be carefully oriented in line with the aerophone instrument, which is difficult for young users to implement. Difficult assemblies and placements create a learning curve when playing complex musical pipe instruments, especially for children or other people unfamiliar with fasteners, pipe connections, and pipe instruments.

In addition, the player must learn particular techniques in order to position their mouth inside or around a mouthpiece. In various mouthpiece configurations, a mouthpiece provides an air conduit that acts as a means for positioning a wooden or solid musical reed. A mouthpiece allows a player's lips to be positioned relative to a musical reed in such a way as to allow the successful delivery of air (e.g. the player's breath) over a reed and into the instrument in order to generate vibration. Once the vibration produced via the reed measures 20 Hz or more, it is effectively communicated as audible sound through the horn, woodwind, flute, or other aerophone instrument. Within instruments that contain lip reeds such as horns and trumpets, it may take significant practice for a user to learn how to use their lips and breath to produce vibration with lip embouchure. Assembly, reed fragility, and lip embouchure technique create a steep learning curve that can deter people from playing aerophone musical instruments.

Enclosed air-filled objects such as balls and balloons are some of the most popular toys and focal points of games and activities. A user can see, touch, and hear a ball or balloon when the object is bounced, thrown, caught, or vibrated. Enclosed air-filled objects like balls and balloons, as well as the various devices, instruments, and apparatuses that can functionally interact with them, hold a unique place in the cultural fabric of societies all over the world.

With reference to the following overview of prior art, while relevant to either enclosed air-filled objects or sound making aerophone devices, there is no integration of these two aspects in a manner that addresses the desire for more accessible, user-friendly, aerophone instruments.

U.S. Pat. No. 4,704,934A discloses an outer musical balloon that has an electronic music-producing device contained within a nearly opaque inner balloon. Music is activated when sufficient light permeates both balloons.

U.S. Pat. No. 5,219,162A discloses a toy ball having a solid body of foam plastic material and a noisemaker completely embedded within the foam plastic body. The noisemaker includes a hollow rigid housing, which may be formed of a hard plastic, and a marble within the housing that is free to roll around so as to create a clattering sound when the ball is moved around.

U.S. Pat. No. 6,126,634A discloses a dilating catheter for intraluminal use which has an elongated shaft and an enclosed inflatable member or section on the distal extremity of the catheter shaft which has multiple working sections. The first working section elastically expands upon inflation to a first pressure within a first pressure range, and a second working section elastically expands upon inflation to a second pressure range.

CA Patent Document No. 2764839A1 discloses an underwater musical instrument comprising hydraulically resonant bulbs. The spherical bulbs are made of or filled with non-gaseous material, and respond acoustically when they are hit by the user by causing water or other liquid to flow past rigid pipes that are connected to non-enclosed elastic reservoirs.

US Patent Document No. 20060009319A1 discloses a novelty ball assembly that produces noise when squeezed by discharging and releasing air. A noisemaker is disposed of within a self-expanding resilient shell that defines an internal chamber, proximate to the first vent port so that air displaced through the first vent port passes through the noisemaker. As air passes through the noisemaker, the noisemaker produces an audible sound.

U.S. Pat. No. 9,814,999B2 discloses toy aerophone building blocks that produce a plurality of sounds from a plurality of building block configurations. The building blocks are all four-sided polyhedrons that interlock to create aerophone instruments with a plurality of airway channels inside an inner space, whereby larger blocks create lower pitched sounds, while smaller blocks create higher pitched sounds when an air source provides airflow to each aerophone instrument.

US Patent Document No. 20140233780A1 discloses diaphragms for use in air horns or similar noise-producing devices. The diaphragms may have concave or convex non-linear shapes, wherein protrusions are included in the body of the rigid or semi-rigid diaphragm. The diaphragms may be made of any relevant materials and keep their unenclosed non-flat shapes during and without application of compressed gas.

U.S. Pat. No. 6,483,017B1 discloses a method and apparatus for tensioning or relaxing a membrane of a musical instrument, such as a traditional frame drum, using pressurized fluid that is guided into one or more variable pressure chambers formed by an expandable hollow body. Pressure is exerted evenly all around the circumference of the membrane, which is fixed only by a band so that it can be tensed or relaxed very rapidly. The band is arranged to vibrate freely in relation to the body while the membrane is subjected to pressure from the variably pressurized chamber.

As can be appreciated from the art overviewed above, related to enclosed air-filled objects, the application of these objects does not result in the production of a series of sounds through vibration in a way that can be tuned or played as an instrument. Furthermore, in the art overviewed above, related to sound production using compressed air, none of the solutions employ an enclosed air-filled object as its vibration-producing mechanism.

There remains a need to reimagine the traditional aerophone by replacing standard reeds with a durable, affordable, and workable alternative that helps players bypass the steep learning curves associated with assembly, embouchures, and skill acquisition with respect to this genre of instruments.

SUMMARY OF THE INVENTION

The present invention relates generally to vibration production through an aerophone instrument using an air-filled object that remains enclosed during use without the loss of air. The air-filled object begins to vibrate by its association with an apparatus that comprises an air conduit and a means for positioning the object along an air pathway (defined by an air conduit with an air passage) between one or more air inlets and one or more air outlets of the air conduit (e.g. a pipe) as air is delivered through the air passage of the air conduit. A first volume of compressed air is delivered through one or more air inlets of an air conduit, which produces a vibration on the external surface of a wall of the air-filled object, and exits one or more air outlets of the air conduit as a second volume of compressed air. The air-filled object can be situated at any point along an air pathway of the apparatus disclosed herein, provided that it causes a resistance to, or partially blocks the flow of compressed air within or through the air conduit. Depending on the configuration of the apparatus and the location of the air-filled object along an air pathway of the air conduit, and/or the pressure within the air-filled object, and/or the wall thickness or rigidity of the air-filled object, the degree of air compression required may be varied (e.g. by way of a player blowing, a foot pump, an air compressor, or a piston) to cause a wall of the air-filled object to vibrate at frequencies sufficient to produce sound that is audible to the human ear. The means used to position the air-filled object along an air pathway of the air conduit results in the creation of an interface conducive to sound-producing vibration. The means used and characteristics of the interface can also be varied (e.g. by a user holding the enclosed air-filled object in their hand at the air outlet of the air conduit, or by the application of various structures for securing, holding, and shifting the air-filled object's position relative to the air outlet) to provide options for producing a range of sounds and tones. For example, by changing the surface tension area of a wall of the air-filled object that vibrates when struck by the pressure of the first volume of compressed air before exiting one or more air outlets of the conduit as a second volume of compressed air. In this way, the apparatus of the present disclosure provides a user with an experience of playing an aerophone instrument using an air-filled object to generate sound in a multi-sensory, accessible (user-friendly), and dynamic way.

In one aspect there is provided an apparatus for assembling an aerophone instrument comprising:

- an air conduit with a first end and a second end to provide an air passage;
- one or more air inlets disposed on the air conduit at a first point and configured for delivering a first volume of compressed air to the air passage;
- one or more air outlets disposed on the air conduit at a second point and configured for releasing a second volume of compressed air from the air passage; and
- a means for positioning an air-filled object to be operatively associated with the air conduit, wherein when an air-filled object is operatively associated with the air conduit using the means for positioning the air-filled object and a first volume of compressed air is delivered to enter the air conduit through one or more air inlets, a wall of the air-filled object vibrates and causes a second volume of compressed air to vibrate in the air passage before some or all of said second volume of compressed air exits the air conduit from one or more air outlets.

In another aspect there is provided an aerophone instrument comprising:

- an apparatus comprising:
  - an air conduit with a first end and a second end to provide an air passage;
  - one or more air inlets disposed on the air conduit at a first point and configured for delivering a first volume of compressed air to the air passage;
  - one or more air outlets disposed on the air conduit at a second point and configured for releasing a second volume of compressed air from the air passage; and
- an air-filled object operatively associated with the air conduit using the means for positioning the air-filled object, wherein when a first volume of compressed air is delivered to enter the air conduit through one or more air inlets, a wall of the air-filled object vibrates and causes a second volume of compressed air to vibrate in the air passage before some or all of said second volume of compressed air exits the air conduit from one or more air outlets.

In still another aspect there is provided a method of assembling an aerophone instrument comprising the steps of:

- providing an apparatus comprising:
  - an air conduit with a first end and a second end to provide an air passage;
  - one or more air inlets disposed on the air conduit at a first point and configured for delivering a first volume of compressed air to the air passage of the air conduit;
  - one or more air outlets disposed on the air conduit at a second point and configured for releasing a second volume of compressed air from the air passage; and
  - a means for positioning an air-filled object to be operatively associated with the air conduit; and
- positioning an air-filled object to be operatively associated with the air conduit using the means for positioning the air-filled object.

In yet another aspect there is provided a method of producing a vibration comprising the steps of:

- assembling an aerophone instrument; and
- delivering a first volume of compressed air to enter the air conduit through one of the one or more air inlets to cause a wall of the air-filled object to vibrate.

In one embodiment, when the air-filled object is operatively associated with the air conduit using the means for positioning the air-filled object a vibration gap is formed through which the vibration of the area of the wall of the air-filled object causes the vibration of the second volume of air.

In another embodiment, the means for positioning the air-filled object comprises one or more vibration anchor points to keep the air-filled object stationary in a desired position.

In still another embodiment, the one or more segments of the air conduit each define a segment of the air passage.

In yet a further embodiment, one of the one or more segments of the air conduit may be interchanged with another segment of an air conduit.

In yet another embodiment, the apparatus further comprises one or more sound modulation means.

In a further embodiment, one of the one or more sound modulation means comprises a means to alter the one or more air pathways, a means to change the position of the air-filled object and remain operatively associated with the air conduit, or a means to alter the tension of the wall of the air-filled object when operatively associated with the air conduit.

In yet a further embodiment, one of the one or more sound modulation means comprises one or more of a segment of an air conduit; one or more mouthpieces, tone holes, keys, valves, sliders, horn attachments, and tuning connectors; the means for positioning an air-filled object to be operatively associated with the air conduit; a means for deflating or inflating and resealing the air-filled object; fasteners operatively associated with an actuation mechanism for stretching the wall of the air-filled object; sand, styrofoam balls, and other rigid or semi-rigid structures placed inside of the air-filled object.

In another embodiment, two or more apparatuses are connected to join their respective air conduits and multiply the available air pathways.

In still another embodiment, the one of the one or more air inlets is configured to be operatively connected to a source of compressed air.

In a further embodiment, the one of the one or more air inlets is configured with a mouthpiece to receive compressed air from the lungs of a user.

In still a further embodiment, the one of the one or more air inlets is configured with a connector to receive compressed air from a pump.

BRIEF DESCRIPTION OF THE DRAWINGS

These and other features of the invention will become more apparent in the following detailed description in which reference is made to the appended drawings.

DETAILED DESCRIPTION OF THE INVENTION

Figure 1A:
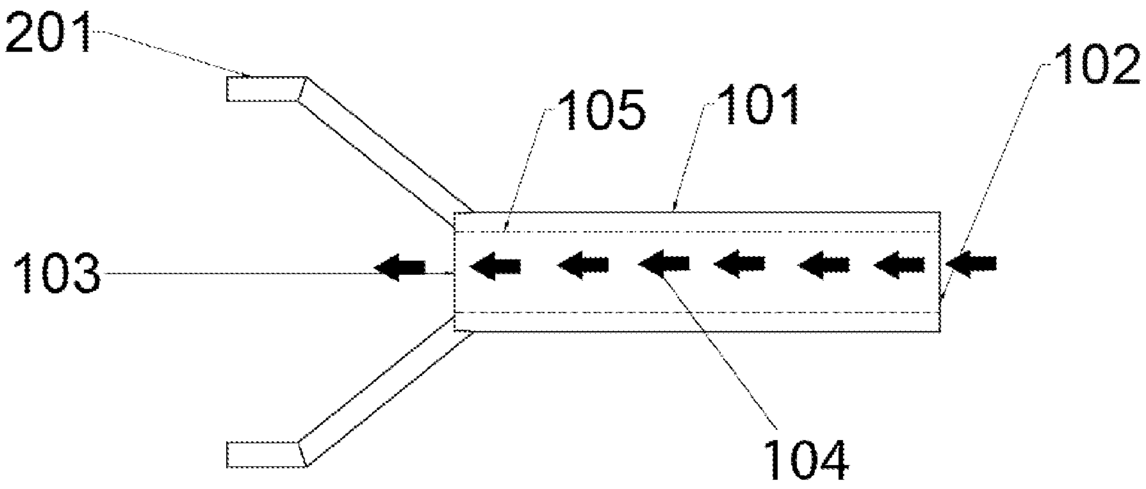
FIGS. 1A-1F: A is an embodiment of an apparatus according to the present disclosure illustrating a configuration comprising an air conduit providing an air passage, and an air-filled object holder; B is the same embodiment of the apparatus shown in A configured with a reversed air pathway; C is an exploded view of an alternative embodiment to the apparatus shown in A comprising three segments of an air conduit providing three segments of an air passage; D is an assembled view of the apparatus shown in C that features an air pathway; E is an isometric view of an alternative embodiment to the apparatus shown in D featuring a triangular prism-shaped air conduit with internal walls for positioning an air-filled object; F is a view of an alternative embodiment to the apparatus shown in A featuring an air conduit providing an air passage using a hole on its side as an air inlet.

The present disclosure provides apparatuses, systems, and methods for assembling and playing aerophone instruments configured to produce vibration, including audible sound vibration, using an air-filled object.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one", but it is also consistent with the meaning of "one or more", "at least one", and "one or more than one."

As used herein, the terms "comprising", "having", "including", and "containing" and grammatical variations thereof, are inclusive or open-ended and do not exclude additional, unrecited elements and/or method steps. The term "consisting essentially of" when used herein in connection with a device denotes that additional elements and/or method steps may be present, but that these additions do not materially affect the manner in which the recited device functions. The term "consisting of" when used herein in connection with a device excludes the presence of additional elements and/or method steps. A device described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment", "an embodiment", "another embodiment", "prototypic embodiment", "in one embodiment", and "for example" is intended to illustrate or denote aspects, embodiments, variations, elements or features relating to the invention and not intended to limit the scope of the invention.

As used herein, the terms "connect", "connected", and "connection" refer to any direct or indirect physical association between elements or features of the instrument of the present disclosure. Accordingly, these terms may be understood to denote elements or features that are partly or completely contained within one another, attached, coupled, disposed on, joined together, protruding, plumbed, or ported into, etc., even if there are other elements or features intervening between the elements or features described as being connected.

As used herein, the terms "vibration", "vibrating", and "vibrational" refer to the periodic motion of a material's particles in alternately opposite directions from a position of equilibrium when that equilibrium has been disturbed. Vibration is thus created when force impacts any material, and becomes measurable as a mechanical phenomenon above frequencies of 0 Hz. For example, in the case of using an air-filled object, vibration is expressed as the periodic motion of the air-filled object in response to the pressure applied onto the external surface of the air-filled object using compressed air as the means to induce vibration, resulting in a measurable frequency above 0 Hz.

As used herein, the term "sound" refers to a vibration that propagates as an acoustic wave through a transmission medium such as gas, liquid, or solid. This term also refers to the reception and perception of acoustic waves by the human body and brain. Measurable frequency ranges of an acoustic wave that are between about 20 Hz-20 kHz, and any decibel ranges higher than 0 dB, can be registered as audible sound by those who have little to no hearing impairment. Frequency ranges that fall below about 4000 Hz might register more as vibratory sensation than audible sound for those with severe hearing impairment (e.g. hearing loss of over about 61 dB). Decibel ranges above about 194 dB are generally not measurable, and decibel ranges above about 140 dB can be physiologically dangerous to a listener even after short term exposure, and therefore will not be considered as desirable target ranges for a listener. It should be noted that sound volume measured in decibels decreases over increased distance between a listener and a sound source, and a listener may move away or position themselves spatially within a more desirable range of sound decibels relative to the sound source, which for a listener with little to no hearing impairment may be comfortable at 40 dB-95 dB. In the present disclosure, the frequency and decibel ranges of different instrument embodiments can vary greatly depending on the configuration of components within that embodiment, and those ranges can vary further depending on how the vibration is being altered. For instance, in one embodiment of the instrument that measures about 19 inches between its longest points, and features tone holes as one might encounter on a flute, the frequency range produced might be between 200 Hz-1000 Hz. If most or all of this embodiment's holes were covered by the user's fingers, the sub-range of frequencies would become closer to about 800 Hz-1000 Hz. Most aerophone instruments which are blown by a user produce sound at about 0.001 psi to 2.5 psi above atmospheric pressure. If a user's breath was used as a means to deliver about 0.75 psi of compressed air into an instrument to vibrate the air-filled object, and the pressure within the air-filled object was about 0.7 psi, while the thickness of the air-filled object's wall was about 0.04 mm, the decibel level of the instrument might measure between about 60 dB-85 dB. If a user were to blow into another embodiment of an instrument with about 7.5 psi with alternate sources of compressed air (e.g. a manual hand or foot pump), and the air-filled object's internal pressure in that instrument measured around 7.0 psi would produce a sound decibel level in amplitude to about 70 dB-95 dB.

As used herein, the terms "elastic", "elasticity", and "elastically" refer to the physical deformation properties of materials, as well as the ability of an object or material to return to its original shape and size following deformation, such as compression or expansion. For example, at the most extreme end of deformation, air can be compressed indefinitely, and will return to its original state after the compression is removed, therefore air is an extremely elastic material. In the present disclosure it is to be understood that, while any components of the invention may be discussed with reference to these terms, there will be a primary focal emphasis on the vibrational and sound-producing capacities of enclosed air-filled objects. It is also to be understood that elasticity can refer to, and not be limited by, any number of fully or partially malleable materials, spanning a range from easily deformed or semi-rigid materials (e.g. silicone, latex, rubber) to more rigid materials (e.g. plastic, metal, carbon fibre).

As used herein, the term "tension" refers to how the physical properties of elastic materials change when they are subject to compression, expansion, pushing, pulling, repositioning, stretching, and/or squeezing when those forces are transmitted by any three-dimensional object. It is to be understood in the present disclosure that the correlation between the tension values of air-filled objects, when they are positioned in any embodiment of the instrument, and the altered vibrational and sound qualities that the instrument produces as a result of tensioning the elasticity of those air-filled objects, will be a primary focus when using any variations of the term tension.

As used herein, the term "pressure" refers to any force applied perpendicular to the surface of an object, or perpendicular to a tangent plane of a curved object's surface, as well as to a measurement from a pressure gauge relative to atmospheric pressure. For example, when referring to a measurement of 2 psi, 2 psi above atmospheric pressure is implied. The pressure of compressed air can apply force to an enclosed air-filled object's external and internal walls, which alters its vibration, elasticity, and/or tension, while the measurable quantity of that compressed air can be gauged in pounds per square inch (psi). It is to be understood in the present disclosure that pressure can refer to either the force of compressed air within an instrument's air conduit to produce vibration against the external surface of an enclosed air-filled object, as well as to the force of compressed air required inside that same enclosed air-filled object in order for it to retain an inflated form. The term pressure can also refer to the amount of force impact applied by any part of an instrument on another part of the instrument to alter compression. For example, certain embodiments in the present disclosure include a means for positioning an air-filled object where the amount of pressure applied to its external surface area can be adjusted using a threaded apparatus, resulting in increased compression.

As used herein, the terms "modulate" and "modulation" refer to any adjustment of a vibration and/or sound's frequency, pitch, amplitude, timbre, envelope, velocity, wavelength, and/or phase. For example, in the present disclosure a sound modulation means can refer to any segment of any embodiment where a user can manipulate the delivery pathway of air through the instrument (e.g. by covering holes) in such a way as to increase the audible vibrational frequency produced by the instrument.

As used herein, the term "modular" refers to any physical units of an object that are constructed with standardized dimensions to allow for flexibility and variety in use. In the present disclosure, some embodiments of the invention include modular segments that can be removed, adjusted, and/or interchanged with other similar or different parts that feature the same or interchangeable connector means in order to change the functional, sonic, and/ornamental qualities of the instrument. For example, one modular embodiment of the invention featuring a linear 7 inch cylindrical pipe segment that connects an air inlet to an air outlet can be interchanged with a nonlinear 20 inch conical pipe segment using the same connector joints, which would in turn modulate the sound-producing vibration that results when compressed air is delivered through the instrument by lowering the resulting frequency due to the increased length of the pipe, while changing its timbre due to the different shape of the pipe.

As used herein, the term "segment" refers to each of the parts into which something is or may be conceptually divided to describe various features and aspects of the apparatuses, systems, and instruments of the present disclosure. Segments and segmentation are, in other words, understood to refer to the functional delineation and/or configuration of a part, or portion of an apparatus, system, or instrument according to the present disclosure. Segments may or may not be marked by visibly discernable physical features along or on a part, or component of a structure. It is to be understood that one segment can be considered further subdivided into multiple parts with different functions. Alternatively, one segment may refer to a part that spans or straddles two visually discernible parts of the apparatuses, systems, and instruments of the present disclosure. For example, in the present disclosure, one end segment of an air conduit may include an air inlet, mouthpiece, and extended hose, all of which extend the delivery pathway of air through the air passage. Furthermore, it is to be understood that when any of these segments extend the air conduit, they extend the air passage inside of the air conduit in a corresponding manner, through which there may be one or more air pathways. For example, in the present disclosure, interchangeable segments can be used to build modular instrument systems where the total length of an air conduit is generally substantially equal to the total length of its respective air passage, and can be configured for the delivery of air through multiple air pathways, which may or may not correspond to the total length of the air passage.

As used herein, the term "interface" refers to any area, region, or space where there is a change in structure or composition from one substantially distinguishable material to another, which materials are by way of the interface operatively associated or connected and interact with one another in a system (e.g. an apparatus). The change may be a clear and sharp delineation or a phased, gradient type of delineation through an interface region. In the present disclosure, it is to be understood that this term refers to, among other things, regions that allow a user to generate and/or manipulate sound-producing vibrations with a body part (playable interface). Also included are interfaces between, or that are segments of the apparatuses, systems, and instruments. Interfaces may or may not be configured or varied by interchanging parts or using interface parts, such as new segments, connectors, hoses, valves, and the like. Interface parts may also be used to alter an instrument's vibrational qualities at its vibration gap (vibration point), or source (e.g. where the air-filled object connects with the delivery of air through a conduit), as well as segments on the instrument that can be directly modulated by the user in a manner that alters the instrument's airflow, vibration, and sound properties. For example, in certain embodiments, an air conduit segment may feature tone holes with or without additional structures that can be manipulated with a user's fingers to alter sound properties, and can be referred to as a playable interface.

It is contemplated that any embodiment of the compositions, devices, articles, methods and uses disclosed herein can be implemented by one skilled in the art, as is, or by making such variations or equivalents without departing from the scope and spirit of the invention.

While the following description and the figures detail certain embodiments to illustrate and exemplify the invention, it is to be understood that the invention is not limited by the details of the construction and specific illustration of such embodiments which follows.

Apparatus for Assembling an Aerophone Instrument

The present disclosure provides an apparatus for assembling an aerophone instrument for generating vibration using an enclosed air-filled object. The apparatus comprises an air conduit wherein air is delivered from one or more air inlets to one or more air outlets, and a means for positioning an air-filled object to be operatively associated with the air conduit to assemble an aerophone instrument.

Air Conduit

The apparatus for assembling an aerophone instrument comprises an air conduit, including a first end and a second end for delivering compressed air through the air conduit. The first end is configured with one or more air inlets for delivering at least a first volume of compressed air through the air passage to the external surface of a wall of an air-filled object, and the second end is configured with one or more air outlets for releasing a second volume of compressed air from the air passage. One or more air conduit segments correlate to one or more air passage segments as its internal counterpart, which connect the air inlet(s) to the air outlet(s) while defining air pathways for compressed air delivered from an external source. A means to modulate vibration and sound using an enclosed air-filled object can be integrated into, or otherwise operatively associated with, or connected to one or more segments of the air conduit.

Figure 13:
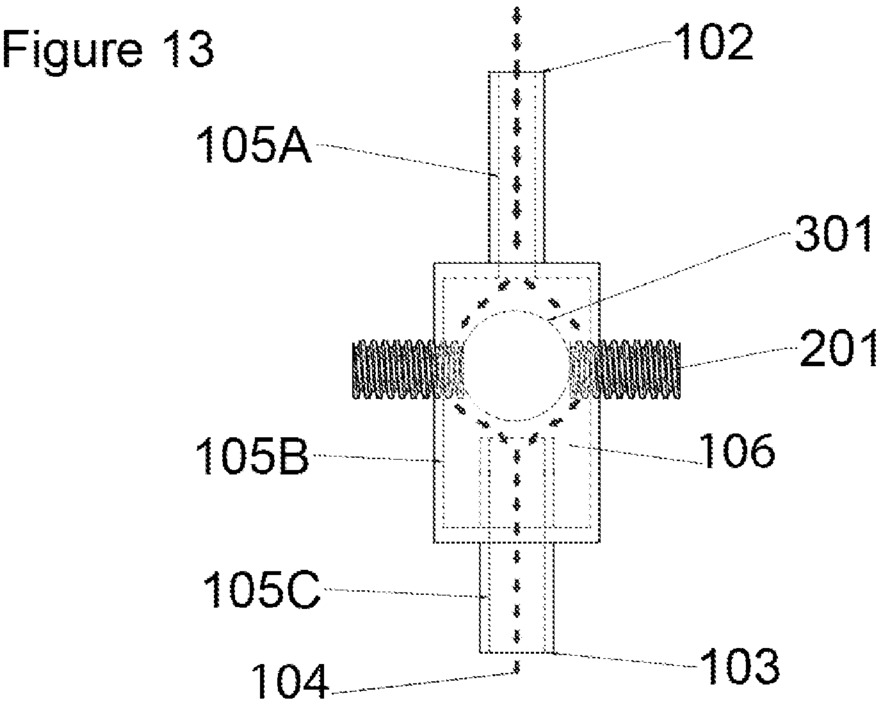
FIG. 13: An embodiment of an aerophone instrument according to the present disclosure featuring a means for positioning the air-filled object that protrudes through the outside walls of the air conduit into the air passage chamber, with the extent to which it protrudes being adjustable from the outside of the chamber segment of the air conduit.

An air conduit segment can be cylindrical, conical, polygonal, ovular, spiral, or any number of other shapes, as exemplified by various embodiments in FIGS. 3A-3G. Air conduit segments may also include any one or combination of air reservoirs, mouthpieces, valve air passages, playable interface regions, and/or chamber segments (as seen in FIGS. 13-15), and can be configured to allow for the assembly of modular apparatus and instrument systems according to the present disclosure. Additionally, any segment can be made out of any material such as but not limited to: glass, plastic, metal, wood, resin, composites, stone, and rubbers. The general size of an apparatus or apparatus assembly according to the present disclosure can range from handheld embodiments that measure about 1-20 inches at their longest points, up to hundreds of metres in all directions for large-scale installation systems. It is to be understood that these embodiments are meant to be exemplary, since the apparatuses and instruments can technically be of any conceivable size as long as there is the corresponding technical ability to deliver sufficient air pressure through the systems of the apparatuses and instruments to generate a desired vibration effect.

The air passage exists in a one to one correlation with the total length of the air conduit, and refers to the measurable internal distance that air can travel from one end of the conduit to the other. The addition or removal of any segment that lengthens, shortens, or otherwise reshapes the air conduit also changes the air passage.

The delivery and directionality of air through the air passage is referred to as an air pathway, and may or may not correspond to the full length of an air passage depending on where air inlets and outlets are positioned along an air conduit. This said, an air pathway can be similarly extended or shortened by interchanging air conduit segments. In one embodiment, an air pathway can be less than or exceed the full length of an air passage, and/or alter directionality as the air pathway moves through one or more segments of an air passage. The air pathway can be less than the full length of an air passage when compressed air is delivered through an air inlet that is not located at an end of the air conduit, or when the air passage divides into two or more segments (bifurcated, trifurcated, etc.), diverting an air pathway. Conversely, the air pathway can exceed the length of an air passage when compressed air is delivered into the instrument from a distance, or released back into the atmosphere beyond the air passage through an air outlet.

An air inlet(s) is where a first volume of compressed air (e.g. breath) begins to travel through an air passage inside an air conduit, and can be configured with a mouthpiece that facilitates the delivery of compressed air supplied from an air source. All segments of the air inlet can be rigid (e.g. plastic pipe), flexible (e.g. a corrugated plastic hose attachment), or any combination of the two. Compressed air sources other than human breath (e.g. analog or electric air pumps) can also be connected to an air inlet.

An air outlet(s) is where a second volume of compressed air is released from the air passage, and can be made from the same or different materials as the air inlet(s). Air outlets can take the form of a pipe opening, or other hole in the air conduit, and may or may not be configured with additional structures (e.g. a valve), or manipulated (e.g. by user's finger), to arrest, impede, or divert the flow of air along a given air pathway.

In certain embodiments, the air conduit comprises more than one air inlet, more than one air outlet, and/or additional segments to further extend or reduce the available air delivery pathways. When piping, tubing, and/or chambers are used to construct an air conduit, air pathways accessible from or through the air conduit may include air inlets, air outlets, and intervening segments between said inlets and outlets. These various segments may protrude into or be nested within one another. Connecting air conduit segments may be achieved using a variety of other connecting means, such as threaded, slip fit, snap fit, union, magnetic connecting means, and other segment interface parts. Modular air conduits can also be disassembled or collapsed to facilitate ease of transportation, especially when combined with flexible manufacturing materials.

Means for Positioning an Air-Filled Object to Assemble an Aerophone Instrument The apparatus for assembling an aerophone instrument comprises a means for positioning an air-filled object to be operatively associated with (connected to) the air conduit in such a way that it can securely hold an air-filled object stationary while an external surface (wall) of an air-filled object vibrates when it comes into contact with a volume of compressed air.

The function of the means for positioning an air-filled object is to hold the air-filled object's external wall about 0-10 mm away from an air conduit's opening so that vibration may occur when air is delivered through the air passage that pushes against the external wall of the air-filled object. The means for positioning an air-filled object can thus be alternately referred to as simply an object holder, since its primary function is to position, reposition, and/or hold an air-filled object securely in a desired position to be operatively associated to an apparatus of the present disclosure (e.g. more particularly, the air conduit).

Figure 6:
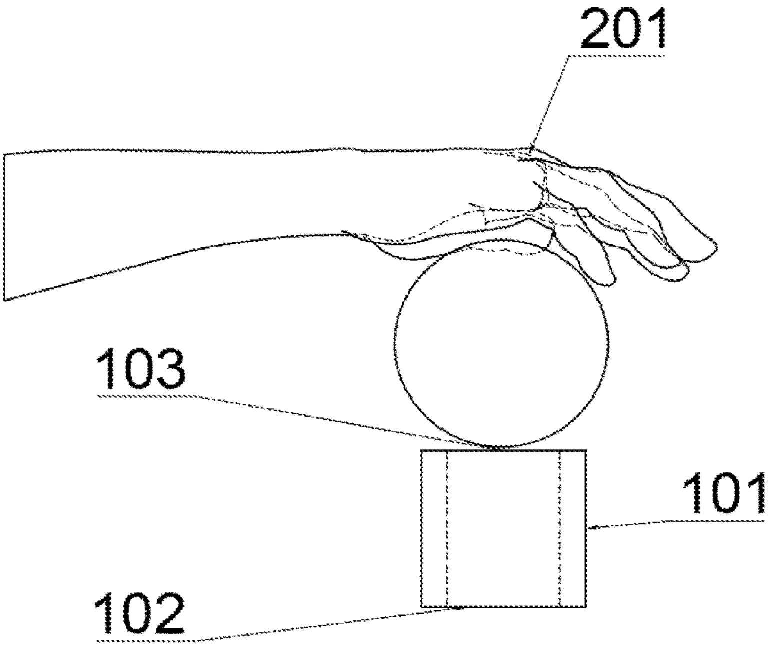
FIG. 6: Another embodiment of an apparatus according to the present disclosure illustrating how a hand can be used as a means for positioning an air-filled object along an air pathway between an air inlet and an air outlet along the air conduit.

The means for positioning an air-filled object is able to resist the force of compressed air pushing against the external wall of the air-filled object during vibration to keep the air-filled object stationary, and can be made out of any rigid or semi-rigid material, such as, but not limited to metal, plastic, wood, cement, resin, rubber, or glass, and can also be designed to include ornamental features. In certain embodiments, a user's hand and/or fingers can serve as a means for positioning the air-filled object, as illustrated in FIG. 6.

Figure 8:
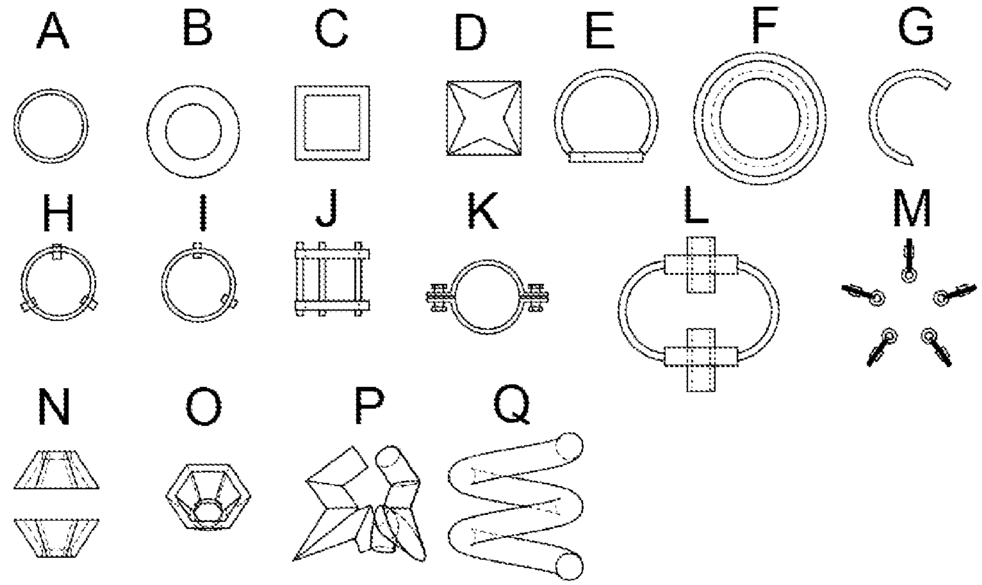
FIGS. 8A-8Q: A non-exhaustive assortment of object holding means or holder embodiments according to the present disclosure, where A is a circular (ring) object holder; B is a solid torus-shaped object holder; C is a polygonal object holder; D is a star-shaped object holder; E is a partially circular object holder with linear and curvilinear features; F is a hollow torus-shaped object holder; G is a crescent-shaped object holder; H is an object holder with three adjustable fasteners that can connect to points on the wall of an air-filled object; I is an object holder with two asymmetrically distributed fasteners along a ring; J is a front view of object holder which uses fasteners that push two or more surfaces together as a means for positioning an air-filled object relative to the air conduit of an apparatus according to the present disclosure; K is an object holder with two non-planar surfaces that clamp an air-filled object as a means to position it; L is an object holder featuring two threaded pipe segments that clamp an air-filled object against one or more pipe surfaces; M illustrates five eye bolts, which connect to the wall of an air-filled object to hold the air-filled object using compression, while pulling the object in one or more directions to increase or decrease the surface tension of the wall of the air-filled object; N is a tapered polygonal object holder which is divided into two halves; O is an isometric top view of a single tapered polygonal object holder which may hold an air-filled object; P is an isometric side view of an object holder made from differently sized and shaped pipe segments which may hold an air-filled object between the surface areas and/or vertices of its compound shape; Q is a front view of a spiral-shaped object holder.

FIGS. 8A-8Q provides an illustration of object holder variations that depict a non-exhaustive list of shapes and means to hold the air-filled object in operative association with the apparatus of the present disclosure. As seen in these figures, object holders can adopt a planar or non-planar form, and can be spherical, ovular, polygonal, spiral, bisected (e.g. FIG. 8N, wherein one 3D shape is divided into two hemispheres, which may be made out of multiple materials, and may be placed at the top/bottom or sides of the air-filled object), or be formed in any number of other shapes. Certain embodiments of an object holder may include visual markings to guide the user to correctly align and/or assemble an object holder, and insert an air-filled object into the apparatus. An object holder can also be connected to an air-filled object using friction, hooks, compression, expansion, magnetism, adhesives, a person's hand, or any method that can hold the air-filled object stationary to resist the force of compressed air as it pushes against the external wall of the air-filled object and causes said wall to vibrate.

Certain embodiments feature systems wherein the means for positioning the air-filled object involves placing the object inside a chamber of the air conduit, wherein a region of the air-filled object's exterior wall is positioned along, within, aligned with, or otherwise in fluid communication with an opening of the air conduit. In embodiments where the object holder comprises a region of an internal wall of the air conduit, air must be able to pass around the air-filled object so that the air-filled object does not completely impede airflow through the air passage. Therefore, an air conduit segment which holds the air-filled object may have a minor and major diameter, or an air-filled object may be used, which has a minor or major diameter to provide for air pathways around the air-filled object.

For example, in embodiments exemplified by FIGS. 13-15, the air-filled object may be placed within a pipe, tube, or chamber, and held on, against, or within the internal wall of the pipe, tube, or chamber using interface friction in contact with a structure that functions as an object holder 201. In these embodiments, a major diameter (vertices of the interior side) around a minor diameter (surface area flats that operate as an object holder) allows air to pass around the air-filled object, and does not completely obstruct the passage of air through the air conduit, allowing the wall of the air-filled object to vibrate and produce sound.

Figure 33:
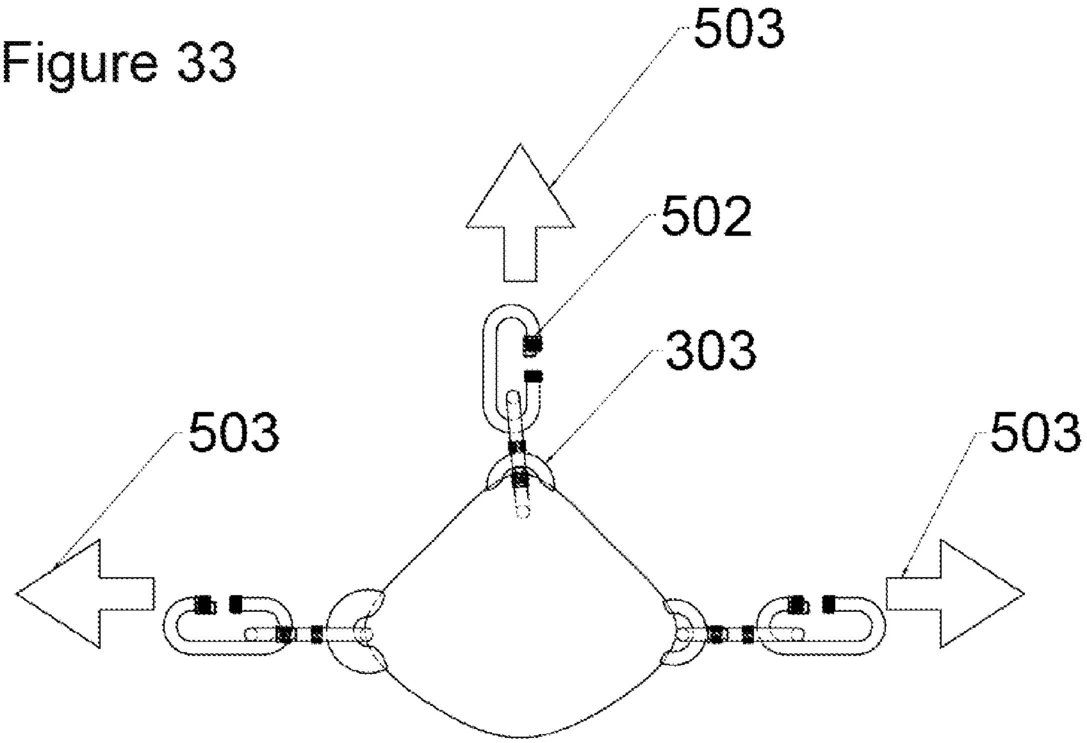
FIG. 33: A view of an embodiment of an air-filled object according to the present disclosure configured for expansion using anchor points that can connect with an object holder.
Figure 34:
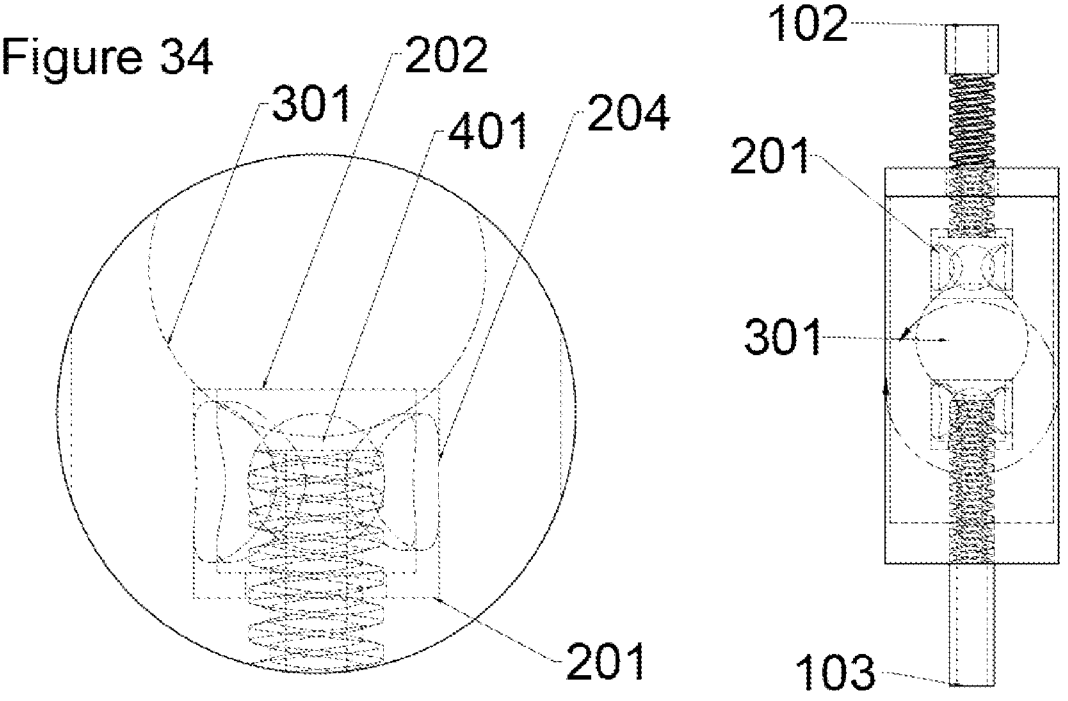
FIG. 34: An embodiment of an aerophone instrument according to the present disclosure illustrating an object holder configured with a compression interface as a tension altering means; includes a detail view highlighting the threaded tension altering means and vibration gap with respect to the main figure located on the right.

Alternative embodiments of a means for positioning an air-filled object may also feature a compression interface with threaded fasteners as seen in FIG. 34, or an expansion interface using fasteners which may grip two or more discrete points on the surface area of the air-filled object using hooks, suction cups, or clips as exemplified by FIG. 33. Another embodiment exemplified in FIG. 25D may utilize one or more rigid or semi-rigid fastening holders 201 which may connect(s) with an enclosed air-filled object in a perpendicular orientation relative to its external walls.

Vibration Gaps

The means for positioning an air-filled object facilitates the formation of a vibration gap, which is the space formed when an air-filled object is positioned in relation to an opposing surface (of an air-filled object or of the air conduit in fluid communication with an opening to the air passage, to impact airflow and enable the vibration of a compressed volume of air). As compressed air travels through the air passage to the vibration gap along an air pathway, it causes at least a portion of the external wall of the air-filled object to vibrate when it is within about 0-10 mm of an opposing surface. Even if the vibration gap is initially 0 mm, the air pressure of a compressed volume of air can displace the wall sufficiently to create a gap that is more than 0 mm and still less than or equal to about 10 mm. If the vibration gap distance exceeds about 10 mm, the external wall of the air-filled object is less likely to vibrate to a sufficient degree for audible sound to be experienced by a user or audience.

Vibration gaps can be configured or delineated along one or more points or regions of an air-filled object's external surface area using an object holder (e.g. a means for positioning an air-filled object according to the present disclosure). When vibration gaps are formed between two or more opposing surfaces (one of which is a surface of the air-filled object), the space formed between those opposing surfaces may be any number of different shapes through which compressed air may produce vibration, including but not limited to curved, angular, biconvex, or bell shapes (as illustrated in FIGS. 23-24).

An object holder will generally include two or more vibration anchor points (points of connection) that serve to delineate and position the region of the wall of the air-filled object that will be operatively associated with the air conduit in order to vibrate as compressed air is delivered through the air passage of the air conduit along a given air pathway. The vibration anchor points allow the air-filled object to be operatively associated with the air conduit when the distance between the external wall of the air-filled object is within about 0-10 mm of being in fluid communication with the closest air passage segment within the air conduit.

Certain embodiments feature a continuous surface of vibration anchor points (a vibration perimeter delineating a segment around the vibrating air-filled object wall), instead of discrete regions of contact between the air-filled object and object holder. For example, in one embodiment, the object holder may be the external wall of one or more air conduit segments, which provides a continuous surface of vibration anchor points along a vibration perimeter. One variation of this embodiment is exemplified by FIGS. 18-20, and features a hollow torus-shaped ring which can function as both an air conduit providing an air passage for the delivery of compressed air to the vibration gap, while the hole in the torus (innermost diameter) defined by the air conduit wall provides a means for positioning and holding an air-filled object.

In certain embodiments, a combination of discrete and continuous vibration anchor points can be used to configure a vibration gap. For example, as depicted in FIG. 25D, an adjustable pipe segment positioning means 204 can function as an additional segment of the object holder 201, providing additional vibration anchor points to the perpendicular threaded object holder segments, which are already holding two opposing sides of the air-filled object.

Air-Filled Object

An air-filled object may refer to an object that is filled with any gaseous substance, such as the air in the atmosphere, a noble gas, or any other gas that can be safely managed, if it were to escape from the air-filled object. Such objects remain enclosed when integrated with an apparatus of the present disclosure for use to assemble an aerophone instrument according to the present disclosure. Once the air-filled object is securely positioned to be operatively associated with an air conduit, using the object holder's vibration anchor points to define a vibration gap, a source of compressed air can be delivered through an air passage along an available air pathway, as provided by the air conduit to vibrate a region of the air-filled object's external wall, producing vibration, and allowing the apparatus to function as an aerophone instrument. It is noted that when the external membrane of an air-filled object is generally impacted, it functions as a membranophone within musical instrument classification systems, however when it is configured to produce vibration using compressed air within the instrument in the present disclosure, it functions as part of an aerophone.

An enclosed air-filled object can be described as any object in which an elastic wall surface divides an interior space from an exterior space or environment (e.g. a balloon, a ball). In order to remain enclosed during use, an air-filled object can contain pressure either above or below atmospheric pressure and may use a valve, tie, knotted ends, or an O-ring to become sealed. Multiple pieces of different materials can also be stitched, fastened, and/or fused together to form the air-filled object. When depressurized below atmospheric pressure, the object can use a rigid structure to hold its 3D form. Additionally, an air-filled object can be formed by combining elastic surfaces to a rigid structure, and can be attached to various object holders using external anchor points.

Air-filled objects can be spherical, ovular, polygonal (e.g. having four or more sides), spiral, or a hybrid combination of any of these shapes. Air-filled objects may also integrate protruding or intruding segments along the overall body of a singular enclosed object. A non-exhaustive list of air-filled object shapes are exemplified in FIGS. 12A-12J. Typical materials that might be used to make an air-filled object are rubber, mylar, plastic, metal, or composites. Wall thickness of the air-filled object nearest to the vibration gap can range from about 0.005-10 mm. Wall thickness may either be continuous throughout the air-filled object, or an object may feature a plurality of different wall thicknesses at different points. An air-filled object's size can range from 5 mm in diameter when used in relative conjunction with smaller-diameter object holders, and up to 30 meters in diameter for larger scale installation artworks.

It is to be understood in the present disclosure that the air-filled object's diameter and material durometer dictates how much air pressure would have to be applied to generate the desired vibration from the wall material of the air-filled object. The input pressure of compressed air must be sufficient to cause the wall of the object to vibrate and as a result generate vibration in the compressed air volume flowing along an air pathway as it exits an air outlet. High durometer object materials like steel and nitinol require higher input pressures to create vibration relative to lower durometer air-filled objects of the same size and wall thickness. Higher durometer materials may require an air compressor with pressures up to 5000 psi. Similar to higher durometer materials, thicker walled objects require more pressure to vibrate, and may require pressures up to 5000 psi to enable vibration. Materials like rubbers, plastics, and mylar—which are commonly used to make balloon walls measuring about 0.005-1.0 mm that can be inflated by a user's lung power—can also easily be made to vibrate by delivery of air from a user's lung power at pressures 0.001-3 psi above atmospheric pressure. Thus, the durometer of the material used in an air-filled object can be shore 00:00 to any hardness whatsoever. Depending on the air-filled object's material properties, the use of pressure values, and varying wall thicknesses, can result in the generation of different vibration properties. It is also to be understood that gases other than air (e.g. helium, sulphur hexafluoride) can be used inside of the enclosed air-filled object, which may also result in different vibration properties when played.

The enclosed air-filled object can be experienced as a three-dimensional object that produces sounds of varied tones and volumes when it vibrates, depending on properties, such as, but not limited by the air-filled object's material, size, wall thickness, internal air pressure, and shape. In order to generate audible sound (20 Hz-20 kHz) through vibration, the air-filled object must not completely obstruct passage or flow of air through the air conduit. A relationship between pressure and sound volume exists where additional air pressure inside the air-filled object requires that higher air pressure be applied to the outside of the air-filled object in order to produce vibration, which in turn emits a louder sound.

In certain embodiments, an enclosed air-filled object is interchangeable with other enclosed air-filled objects of different shapes, sizes, designs, wall thickness, and materials, provided that: a) the air-filled object can still fit sufficiently secure within the object holder as to remain stationary when operatively associated with the air conduit and in use, and b) can be positioned to define a vibration gap of about 0-10 mm using vibration anchor points.

In embodiments of an instrument according to the present disclosure, a user's lips do not directly touch the vibrating air-filled object. Therefore, no embouchure is required to play the instrument. Any learning curves associated with embouchures are eliminated, which makes the instrument user-friendly by allowing the user to immediately be able to play the instrument without specialized training. Using an enclosed air-filled object to modulate sonic qualities independently of using an embouchure broadens performative range.

Figure 18:
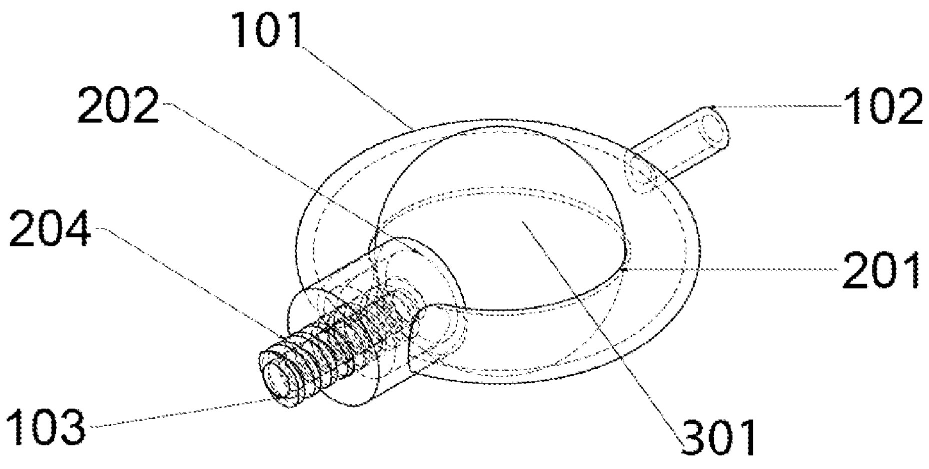
FIG. 18: An isometric view of an embodiment of an aerophone instrument according to the present disclosure with a hollow torus-shaped air conduit segment that positions the air-filled object on an opening of the air conduit that features vibration anchor points.
Figure 19:
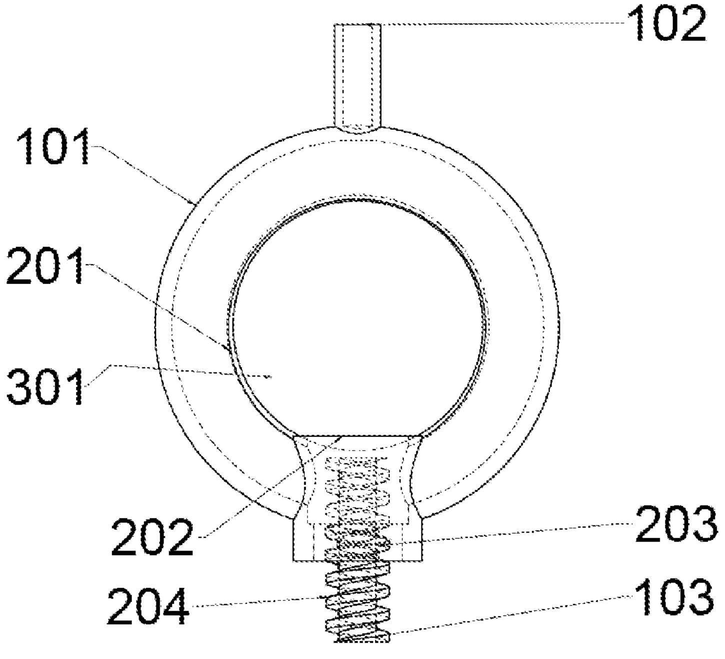
FIG. 19: Another view of the aerophone instrument shown in FIG. 18 illustrating an air pathway.

For example, in one embodiment depicted in FIGS. 18-20, placing an enclosed air-filled object inside a hollow torus-shaped ring within any orientation is the only assembly needed to configure the instrument for sound-producing vibration, which eliminates assembly barriers when compared to the intricate fasteners, pipe connections, and reed orientations found in other aerophones.

Sound Modulation Means

In certain embodiments, the aerophone instrument may include a means to modulate sound vibrations that can be manipulated by the user as a playable interface. Sound modulation means, which may be integrated into or otherwise connected to the air conduit may take the initial pitch generated at the vibration gap and modulate it using methods for increasing or decreasing resistance to the flow of compressed air out of the air conduit. Methods of modulating said resistance may include connecting one or more playable interfaces to an air conduit segment, adjusting the object holder and thereby the positioning of an air-filled object and resulting vibration gap, and any other means of modulating the resistance to a volume of compressed air exiting the air passage of the air conduit of an instrument according to the present disclosure.

Sound modulation means may include any means that effect changes to sound properties such as frequency, pitch, timbre, amplitude, or phase. For example, frequency refers to an amount of vibrations per second and is measured in Hertz. Note changes, octave changes, pitch bends, and fine-tuning, for example, change the frequency of a sound. For example, an instrument similar to a flute (illustrated in FIG. 35B) may produce different frequencies at each tone hole. Pitch refers to the perceived high or low quality of a sound, determined respectively by how high or low a frequency is. Timbre refers to various characteristics of a sound such as resonance (e.g. a vowel sound), or colorings of the sound derived from differences in vibrations using different instrument shapes or materials (e.g. mylar versus rubber). An instrument similar to an oboe (the vibration gap illustrated in FIG. 24D configured with the conical segment illustrated in FIG. 42B) may produce an identical frequency to a clarinet but has a distinct timbre due to the biconvex pipe segment nearest to its vibration gap versus the pipe segment shape of a clarinet's single reed and mouthpiece. Amplitude corresponds to sound volume measured in decibels, for example variations in supplied air pressure in an instrument may produce a relatively quiet sound at about 60 dB, or a relatively loud sound at about 90 dB. Phase refers to the timing of a vibration, for example two identical frequencies may cancel each other out or interfere with each other if they have opposing phases. For example, the instrument illustrated in FIG. 50 may produce sounds which have identical frequencies and amplitudes but variations in phase. An instrument may produce phase cancelations similar to the sound of Scottish bagpipe tenor pipe drones, which have identical frequencies that may be out of phase and produce the distinctive phase profile of phase cancellation within bagpipe music.

In certain embodiments, a playable interface may contain tone holes, keys, sliding joints, and/or valves to adjust the total resistance to vibration within the air passage, and may allow a user to modulate audible sound properties once that vibrational frequency on the surface of an air-filled object measures more than 20 Hz. For example, in embodiments featuring tone holes, if a user covers and uncovers any of the holes with their fingers, a given air pathway through the air passage of an air conduit becomes longer or shorter. Sound-producing vibration becomes lower pitched as more holes closer to the air inlet are covered, provided that the vibration's harmonic frequency remains constant.

In other embodiments, the internal diameter of the playable interface may be variable as a method of increasing or decreasing air resistance through the air passage. In one embodiment, as the diameter of the playable interface increases, the pitch may become higher. In another embodiment, as the diameter of the instrument's opening in fluid communication with the air-filled object becomes smaller, the frequency may decrease. Compressed air delivered through the aerophone instrument's air passage creates friction, which resists oscillatory movements produced from the air-filled object's vibration. In a further embodiment, as the length of the air conduit becomes longer, the pitch of sound produced as a result of vibrating a wall of an air-filled object decreases.

In certain embodiments, increased or decreased air pressure delivered through an aerophone instrument according to the present disclosure will produce different sound properties. For example, if air conduit segments are made out of flexible materials, such as, but not limited to rubbers or plastics, a segment can itself be squeezed or bent to modulate the pitch of sound produced. The use of any mechanism which alters the shape and/or other physical qualities of the air passage provided by the air conduit impacts the sound properties of the instrument, or notes that can be played using a given instrument according to the present disclosure.

In yet another embodiment, the user can change the diameters or shapes of the holes on the playable interface, including the diameter of the instrument itself as a sound modulation means. For example, openings in the air conduit may contain mechanical irises, flapper valves, spring-loaded keys, expandable rubber donuts, chucks, or any mechanism that can alter the shape of the opening during performance.

These features are similar to how mutes and plungers may be used in trumpets to modulate sounds coming from the horn.

Figure 35A:
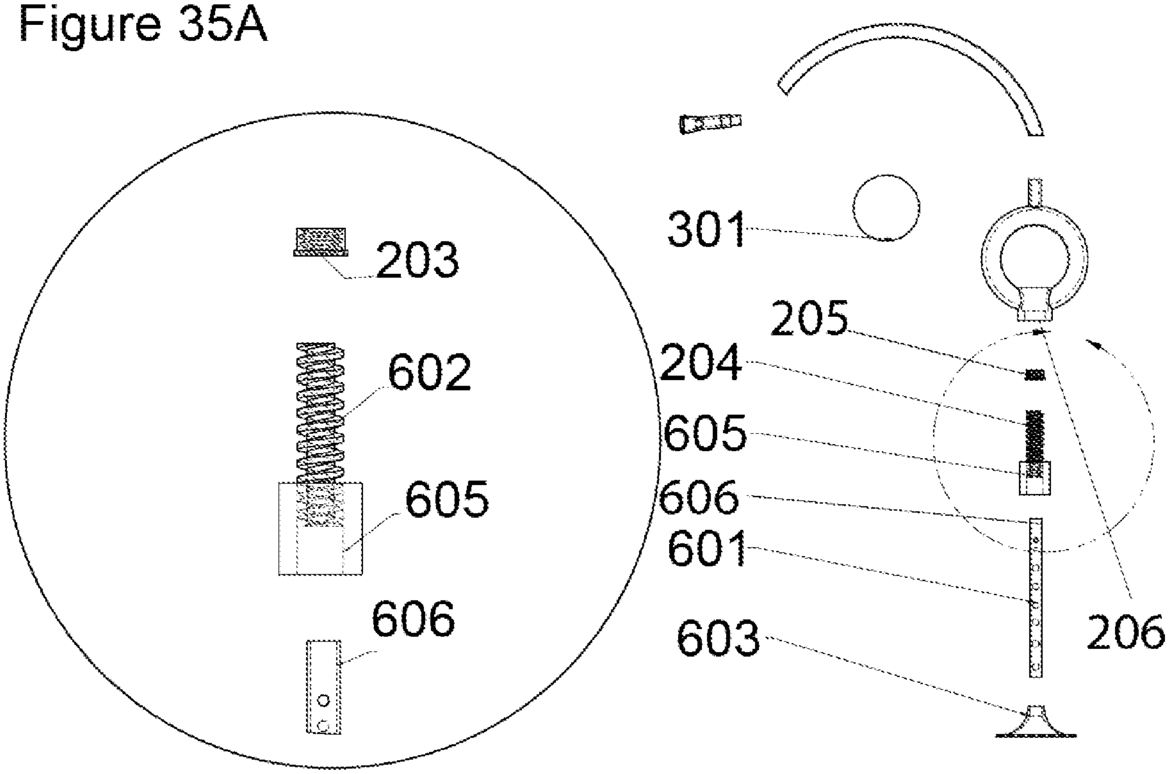
FIGS. 35A-35B: A is an exploded front view of an embodiment of an aerophone instrument according to the present disclosure configured with a sound modulation means using tone holes; includes a detail view highlighting a male slip fit connector used to tune the instrument with respect to the main figure located on the right; B is a view of the assembled embodiment of the instrument shown in A.
Figure 35B:
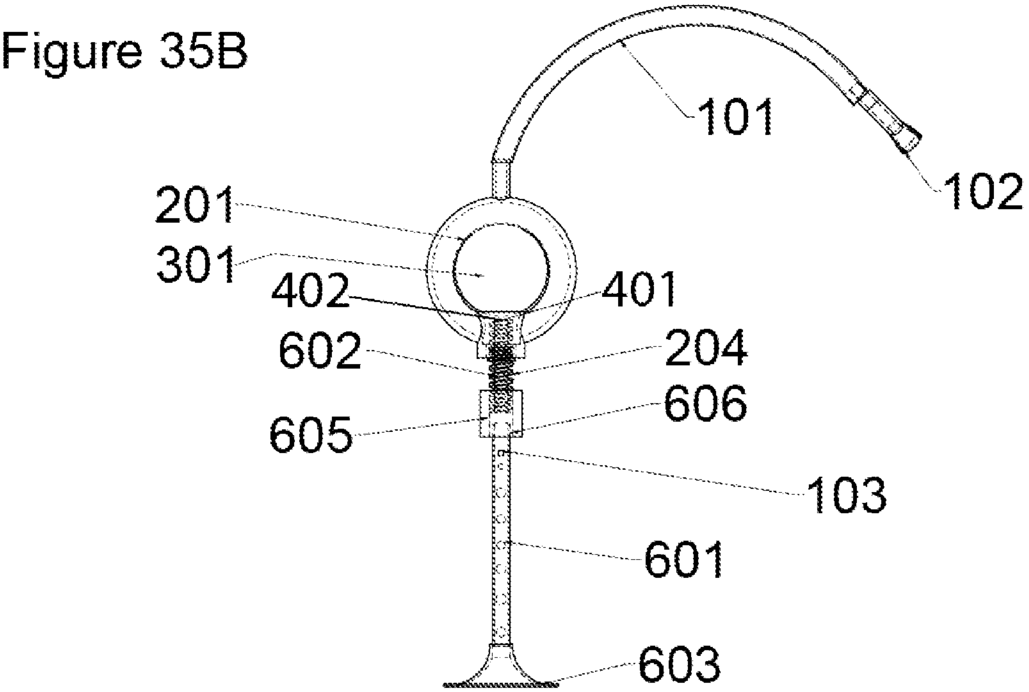
Figure 36:
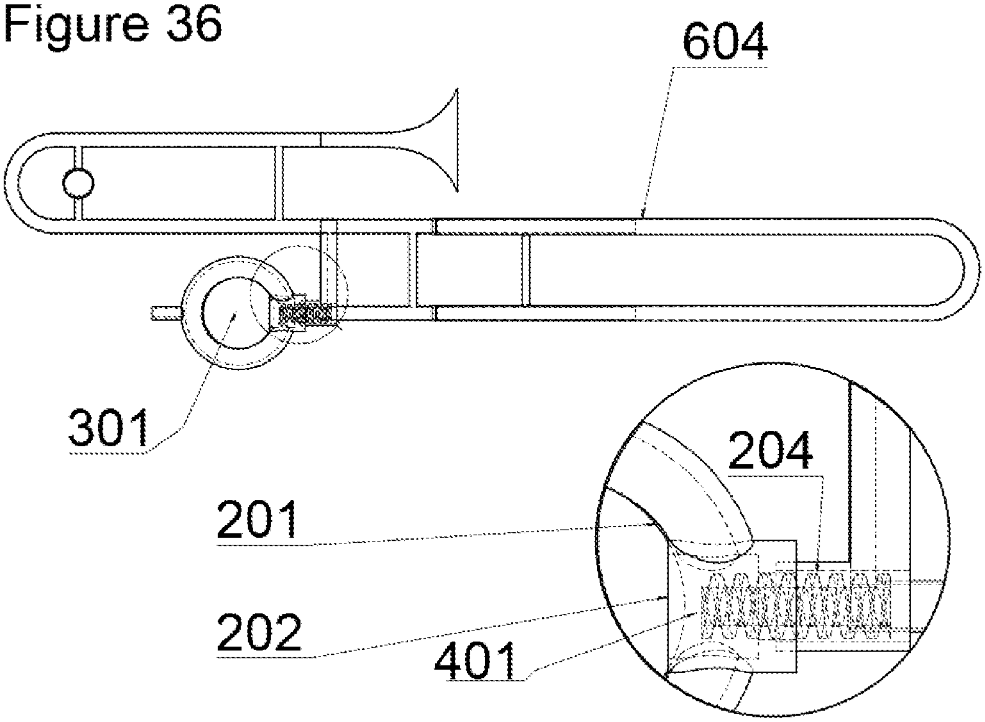
FIG. 36: An isometric view of an embodiment of an aerophone instrument according to the present disclosure configured with a means to modulate sound using a sliding joint; includes a detail view highlighting the instrument's vibration gap with respect to the main figure located above.

In other embodiments, the shape of any of the air conduit's segments, including the playable interface, can modulate sound properties. For example, FIG. 36 illustrates a trombone-shaped embodiment built from a series of air conduit segments and sliders referred to at 604 that would emulate a trombone's sliding legato tones, whereas FIG. 35A-35B include a flute with tone holes at 601 that would generate a deeper pitch as more holes are covered. As shown in FIGS. 35A-35B, horn-shaped parts at 603 can be attached to certain embodiments in order to amplify loudness while allowing an embodiment to stand by itself when not in use.

In certain embodiments, another vibration and/or sound modulating element or feature contained within the air conduit segments relates to indentations or corrugated textures found inside an air conduit's inner walls. This sound modulation means can be related to fipples in the whistle and pipe organ family of instruments, where sound is created by compressing air across or over a protruding or sharp edge. The elasticity of air passing across a sharp edge facilitates high and low oscillating pressures, which in turn creates audible vibration, and pitch alterations in the instrument. The production of a vibration from a sharp corrugated edge, or fipple within the air conduit, may in turn modulate the vibrations of the air-filled object downstream from the vibration gap (with reference to the flow of air from the air source), or vice versa.

The modular design options for the aerophone instrument according to the present disclosure allow for differently shaped and sized embodiments with expanded sonic applications and qualities. For example, an instrument with multiple air inlets makes it possible for multiple users to play the instrument simultaneously, multiple air outlets allow multiple sounds to be produced from a single instrument, and modular playable interfaces allow users to easily interchange one tuned musical key and/or playable interface style for another (e.g. switching from an interface that is tuned to the key of C using holes as a sound modulation means to an interface tuned to E flat using valves).

Tension Altering Means

Optional tension altering means can be added to embodiments which may be used to modulate sound properties by compressing or expanding the enclosed air-filled object and/or by repositioning the entire air-filled object so as to alter the vibration gap. A tension altering means can range from the hand of the player and separate structures used by the player, to features incorporated into the apparatus itself, coupled with the means for positioning the air-filled object. For example, adjusting the space or angle of the air-filled object's surface area at the vibration gap, in fluid communication with an air outlet on an aerophone instrument, can further modulate the instrument's sound properties. Tension altering means featured on the apparatus itself can be made from but are not limited to rigid or semi-rigid materials such as wood, rubber, plastic, metal, and carbon fibre.

In one embodiment, the inflation or deflation of an enclosed air-filled object may be used as a tension altering means by stretching the air-filled object's wall material. Inflation or deflation of an air-filled object may also be used as a sound modulation means by adjusting the distance between an air-filled object's external wall and an opposing surface which forms a vibration gap.

In another embodiment, compression may be used to adjust the elasticity and tension on the external surface of the wall of an air-filled object. This results in the modulation of the instrument's sound properties. The ability to change frequencies by altering the tension or position of the enclosed air-filled object simulates what trumpet and lip reed players do with their lips to alter frequencies when selecting octaves via lip tension. For example, in one embodiment of the instrument shown in FIG. 34 a rigid tension altering means is threaded through an enclosed chamber of the air conduit that can be used to apply compression to the air-filled object, which may increase the pitch of the sound vibration.

In yet another embodiment, expansion forces applied from outside of the air-filled object may also be used to stretch the external surface of the wall of an air-filled object to modulate sound. For example, in one embodiment illustrated in FIG. 33, three anchor points on an enclosed air-filled object may be pulled using fasteners that also attach to the object holder and/or air conduit. When pulled, a higher pitched sound is produced when the wall of the air-filled object vibrates.

Visual Effects Inside Air-Filled Objects

Optional liquids and/or solids can be added inside the enclosed air-filled object before it is sealed to modulate sound properties while producing visual effects. These embodiments relate to non-electric acoustical sound waves that can produce visual patterns and effects within a vibrating air-filled object that has been filled in some capacity with various liquids (e.g. water, non-corrosive oil) or solids (e.g. sand, miniature styrofoam balls).

Figure 12:
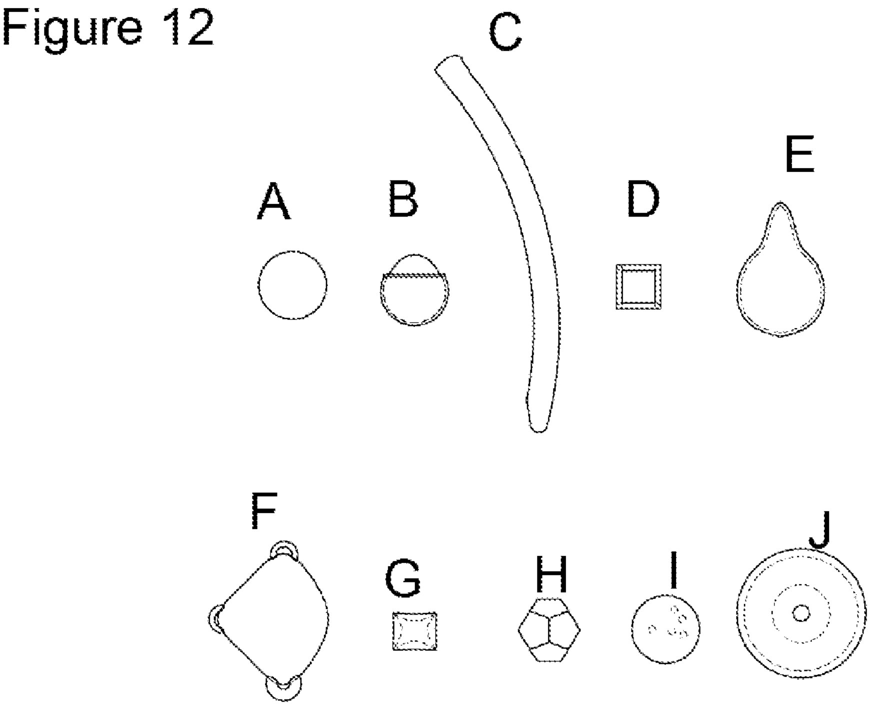
FIGS. 12A-12J: A non-exhaustive assortment of embodiments of an air-filled object according to the present disclosure, which may be connected to various embodiments of the apparatus of the present disclosure to assemble an instrument according to the present disclosure, where A is a spheroid air-filled object; B is an air-filled object made from multiple materials; C is an elongated cylindrical air-filled object; D is a side view of a polygonal air-filled object; E is an oval-shaped air-filled object featuring a plurality of different curvatures along its external surface; F is an air-filled object featuring loop mechanisms for joining the air-filled object to the object holder fasteners illustrated in FIG. 8H; G is an air-filled object which may contain less pressure than atmospheric pressure, and retains its 3D form due to a rigid or semi-rigid structure featured either inside the air-filled object, and/or connected to its external walls; H is a polyhedral air-filled object; I is an air-filled object which may have solid or liquid particles inside of it; J is a hollow torus-shaped air-filled object.

When matter other than gas is also sealed inside the enclosed air-filled object, as shown in FIG. 12I, the sound properties of a vibrating air-filled object may become modulated. The modulated sound waves inside the object then generate analog visual effects through the materials that have been placed inside the air-filled object, which respond to the vibration by creating geometric patterns or particle motion. These vibrational phenomena occur when air inside the air-filled object pushes back at about a force equal to the amount of air being compressed inward. If the force of gravity from particles or liquid inside of an object exceeds the force applied through the air passage to the external surface of the object, then vibration may dramatically change from a discernible musical tone to a squeak, and ultimately become inaudible as that amount of force increases.

Certain embodiments may feature solids and/or light effects in or around the air-filled object that can function more ornamentally. For example, the extremely lightweight nature of glitter allows for an additional visual component to be present inside of the air-filled object without drastically affecting the instrument's sound, while non-analog components such as battery or air turbine-powered LED lights can be affixed to the air-filled object, and/or any of the adjoining segments of the instruments to illuminate it. Furthermore, any mounted light or laser aimed at the vibrating surface(s) of certain air-filled objects (e.g. a transparent or semi-transparent balloon) can also generate visual patterns inside or outside of the object.

Assembly and Use of an Aerophone Instrument

A user can position an enclosed air-filled object into the object holder of an apparatus according to the present disclosure to assemble an instrument according to the present disclosure. The air-filled object held stationary by vibration anchor points connected to the object holder, defines a vibration gap, which provides the instrument functionality to generate vibrations and, more particularly, sound vibrations. In one embodiment, a user can play the instrument by first holding the instrument at one or more segments of its air conduit, and then by providing 0.001-3 psi of compressed air from a user's lungs into an air inlet of the air conduit in order to vibrate the external wall of the air-filled object at the vibration gap interface. Additional optional features of the assembled aerophone can consist of alternative sources of compressed air and advanced modular instrument systems.

Sources of Compressed Air

All aerophone instruments require a source of air to create sound-producing vibration. It is understood in the present disclosure that a source of compressed air may refer to any gas that can be safely used to power the instrument. For example, a source of compressed air may consist of atmospheric air, a noble gas, or any other gas that can be safely delivered through embodiments of the instrument according to the present disclosure. Typically, breath is the most accessible source of compressed air used in many embodiments, but other embodiments feature different sources of compressed air (modes of air delivery) that are used to power the instrument and vibrate the wall of an enclosed air-filled object.

For example, air-pumping shoes (illustrated in FIG. 52B) allow a user to use leg muscles—which are the strongest muscles in the body—to power the airflow and energy input into the instrument. This mode of air delivery reduces the learning curve associated with playing aerophones, and can also assist individuals with lower lung capacity, and/or who wish to play instruments in their older age. Using the motion of walking to generate airflow eliminates the learning curve required to blow into an aerophone (e.g. a bagpipe or a trumpet), while granting the user the added elements of mobility and physical exercise. Attaching air pumps to footwear allows a user to vocalize and walk, while simultaneously performing with one or more instruments.

Embodiments configured for sound production at volumes loud enough to be heard by an audience across a stadium-sized space, or otherwise configured to project sound (at about 85 dB at the point of listening) across about one kilometer, can be connected to powered air compressors or pumps in order to provide enough sustained air pressure to vibrate the air-filled object's external wall in order to produce louder sound. In certain embodiments, an air compressor, or air pump may be used in order to free up a user's breath, legs, and/or energy to allow a user to play (one or more) aerophones with full focus, or even to play an aerophone while moving around unencumbered.

Modular Instrument Systems

In certain embodiments, the apparatuses and instruments of the present disclosure may be configured to have interchangeable components providing for modular instrument systems. Each of the air conduit, object holder, and air-filled object components, as well as additional features can be made in interchangeable formats to readily reconfigure individual instrument embodiments and create systems of interconnected instruments with a wide variety of sound properties and capabilities with a wide variety of playable interface configurations.

Figure 39:
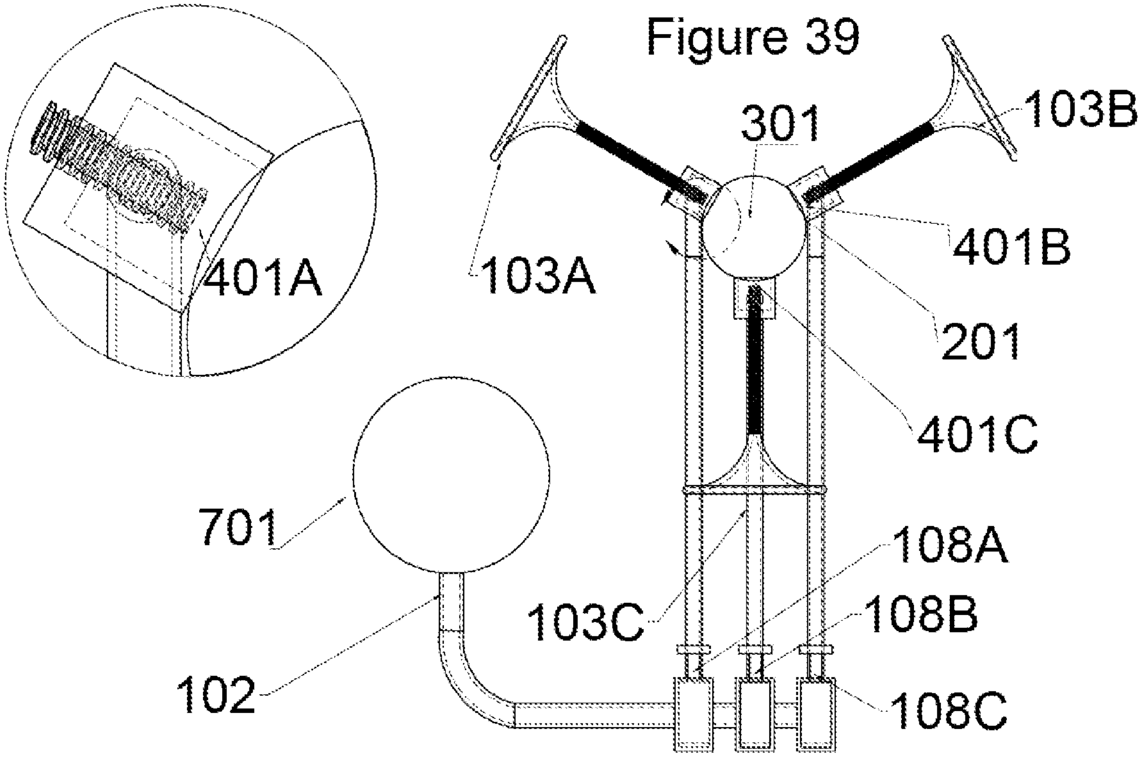
FIG. 39: An embodiment of an aerophone instrument according to the present disclosure configured with a sound modulation means using valves connected to open or close the air passage segment which lead to three vibration gaps on a single air-filled object; includes a detail view highlighting one of three vibration gaps with respect to the main figure located to the right.
Figure 50:
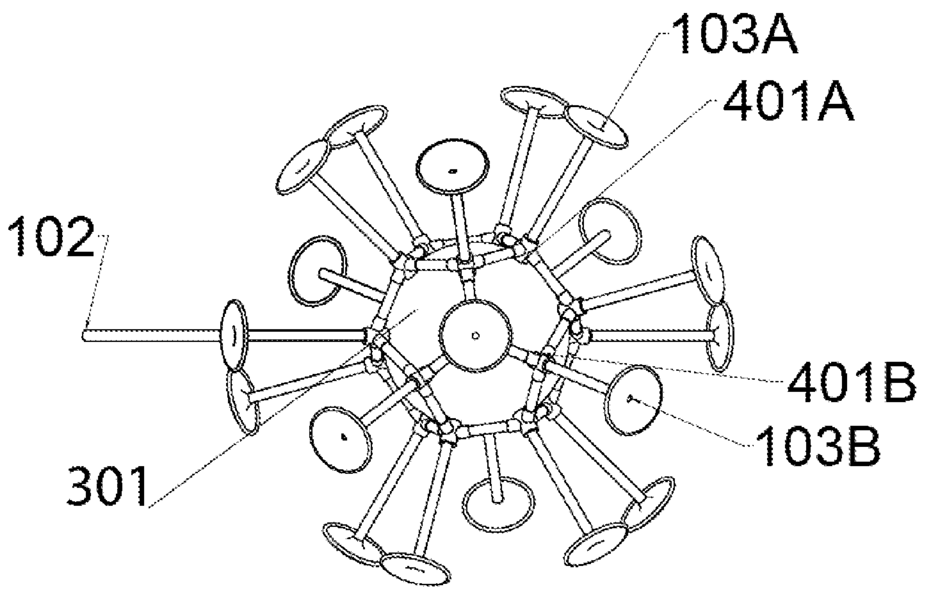
FIG. 50: An isometric view of an embodiment of an air-filled object according to the present disclosure with many vibration gaps distributed around one air-filled object.

In certain embodiments, a plurality of air conduit segments and vibration gaps are joined together with a single enclosed air-filled object. For example, when one air-filled object can become the 'reed' for a plurality of air passage segments, each air passage segment generates sound using a different section of the air-filled object's external surface area as a vibration gap, as shown in FIGS. 39 and 50. Traditional reed-based instruments such as bagpipes and reed pipe organs are difficult to tune because each reed detunes at a different rate, and needs to be assembled and tensioned separately. Using a single air-filled object to generate sound from multiple pipes may be a simpler means of tuning, assembling, and playing aerophones.

Figure 44:
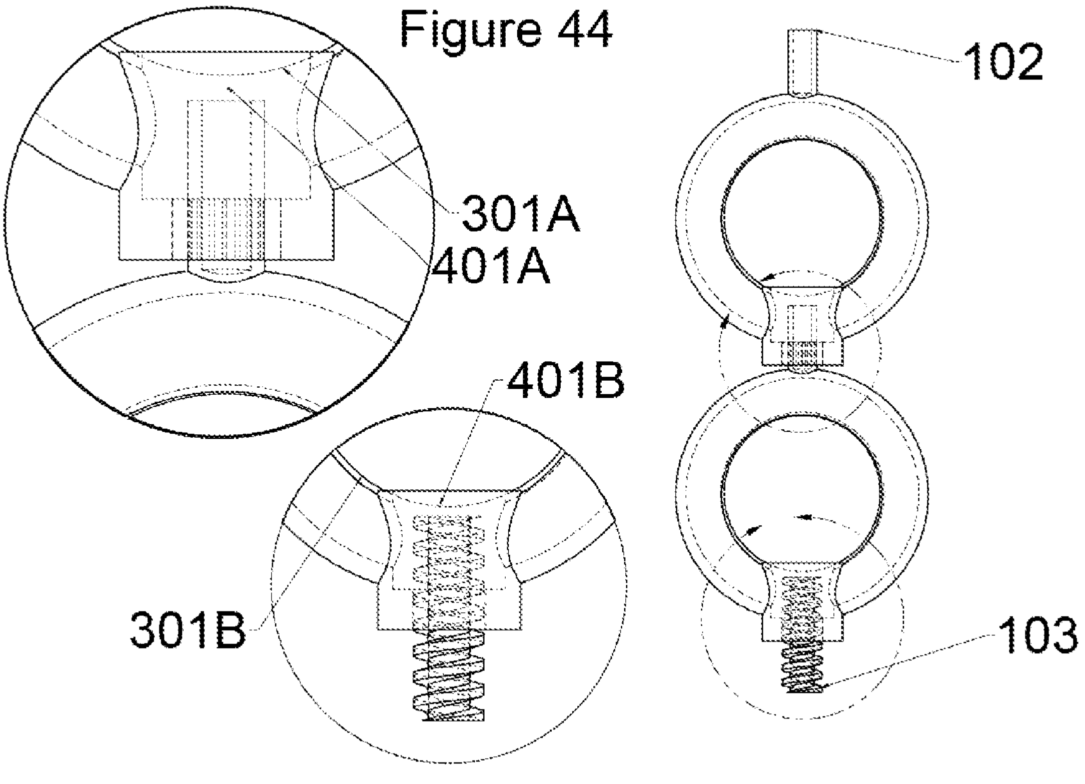
FIG. 44: An embodiment of an aerophone instrument according to the present disclosure configured with a plurality of air-filled objects highlighting in detail how the vibration gaps function in series; includes a detail view highlighting a first vibration gap configured to produce vibrations using a first air-filled object that modulates a second vibration gap, with respect to the main figure located on the right; includes another detail view of a second vibration gap configured to produce further vibrations using a second air-filled object, with respect to the main figure located on the right.
Figure 45:
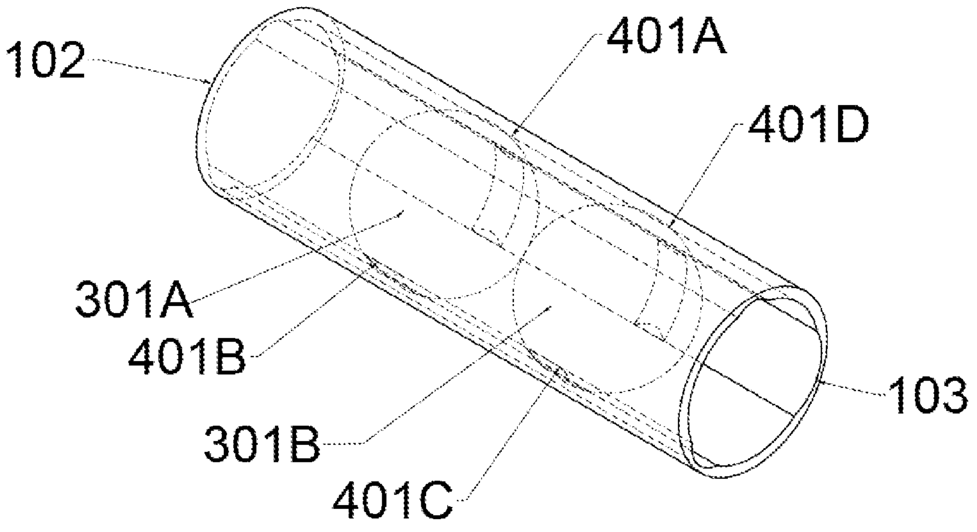
FIG. 45: An isometric view of an alternative embodiment to the instrument shown in FIGS. 43A-43B, with multiple vibration gaps configured to produce vibration using two air-filled objects.
Figure 47:
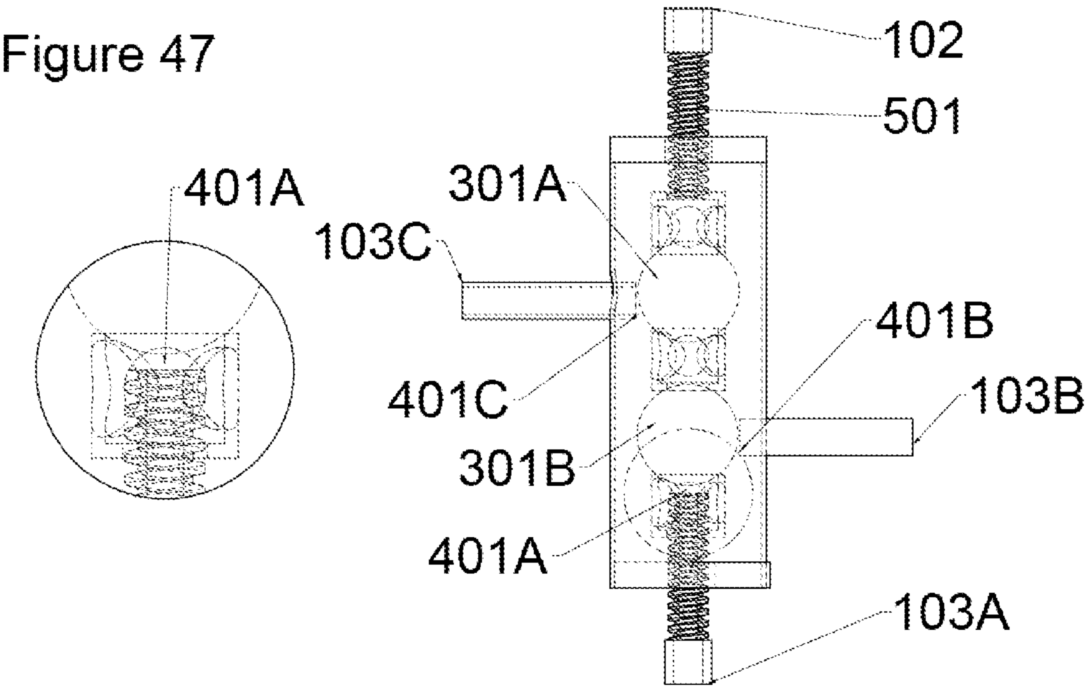
FIG. 47: A view of an alternative embodiment to the aerophone instrument shown in FIG. 46 configured with multiple vibration gaps which may produce multiple vibrations using two air-filled objects; includes a detail view highlighting a vibration gap which may produce a vibration using a second air-filled object, with respect to the main figure located on the right.

Additional embodiments relate to producing sound using a plurality of enclosed air-filled objects disposed in one playable interface, as illustrated in FIGS. 44-45, and 47. In these embodiments, the vibration gap(s) operatively associated with one air-filled object can become a means to modulate the frequency of another adjacent air-filled object's sound-producing vibration, creating subtle frequency interactions, and intricate harmonic possibilities.

Figure 48A:
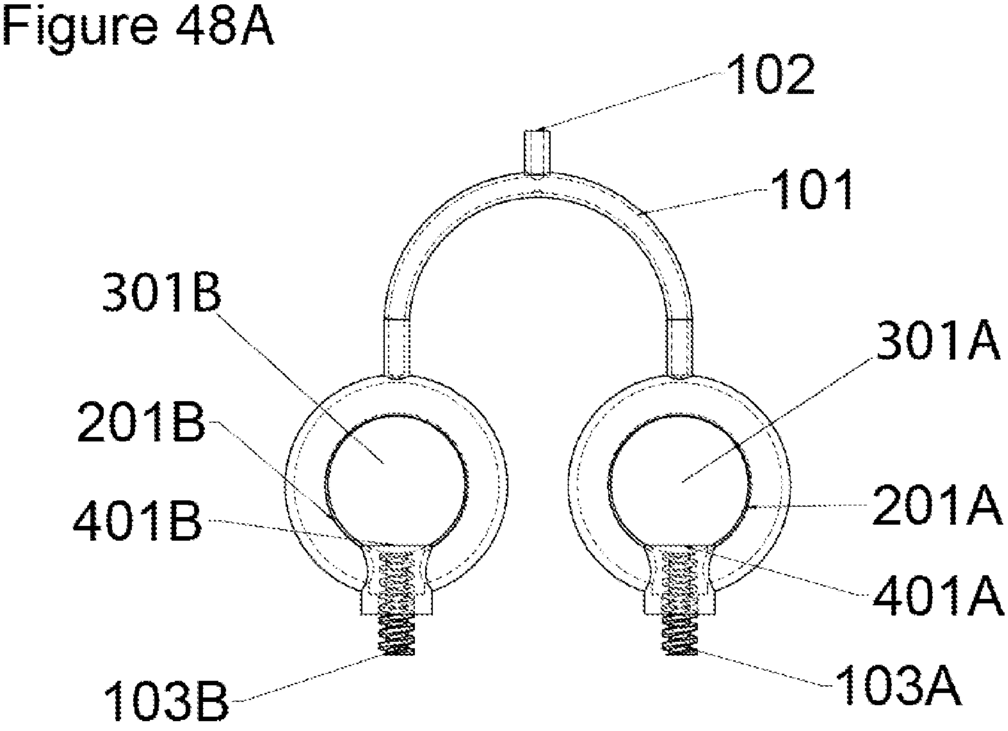
FIGS. 48A-48B: A is another embodiment of an aerophone instrument according to the present disclosure configured with two vibration gaps using two air-filled objects; B is an alternative embodiment to A with two playable interfaces attached to the aerophone.
Figure 48B:
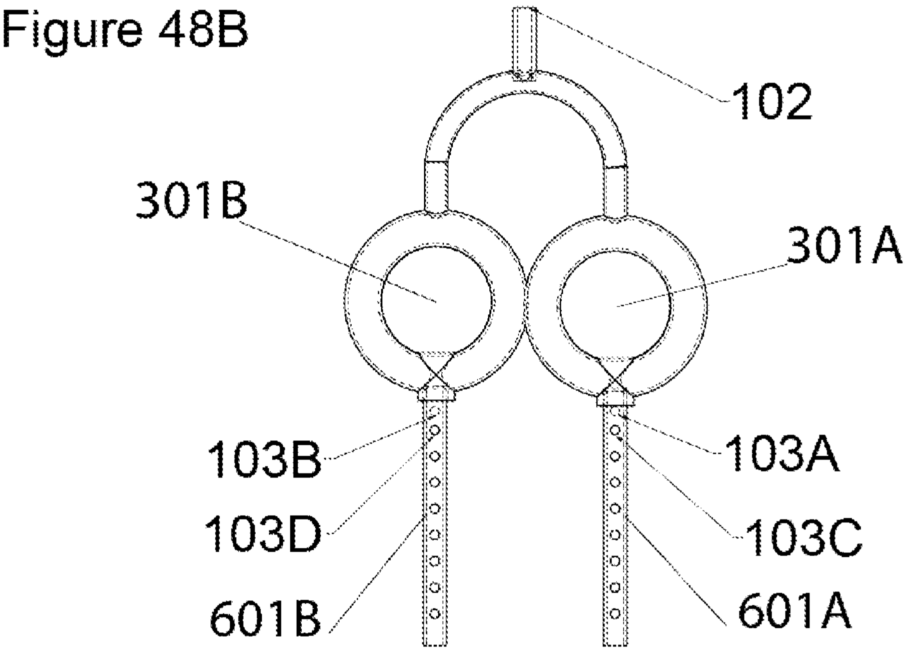
Figure 51:
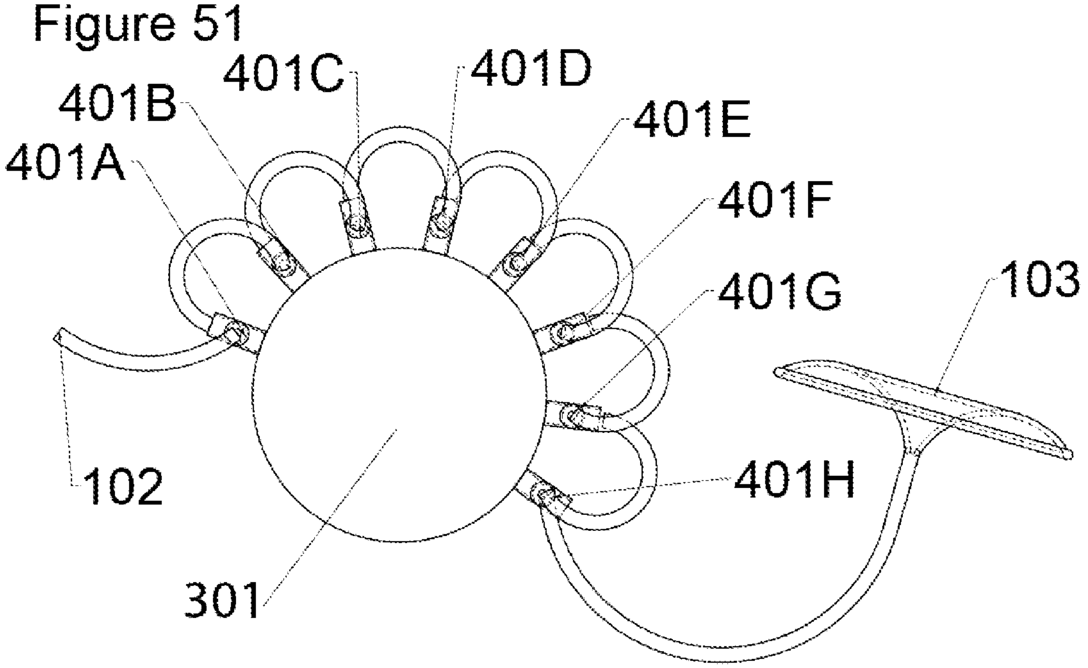
FIG. 51: An embodiment of an aerophone instrument according to the present disclosure with one air inlet, one air outlet, and multiple vibration gaps configured to produce vibrations using one air-filled object.

Additional embodiments relate to generating sound using a plurality of enclosed air-filled objects connected to a plurality of playable interfaces, as exemplified by FIG. 48B, which illustrates two playable interfaces configured to produce multiple sounds in parallel. As exemplified by FIG. 51, multiple sound-producing vibrations can also be generated in series, when sound generated from one vibration gap is plumbed and/or ported into another vibration gap on the same or different air-filled object to create a complex combination of frequencies that find audible sound through one or more air conduit outlets and/or playable interfaces.

In yet another embodiment of the present disclosure's modular aspect, latching note coverings may allow the user to actuate multiple instruments simultaneously. Latches are defined as mechanisms that allow two objects to be easily joined or separated. The use of latches can allow the player of an instrument to select a first note, and perform other actions and/or select a second note while a latch holds the instrument's first note. For example, using latches in a piano interface can allow for nearly impossible sequences of notes to be played by holding one piano key down, and freeing up fingers to press other keys. The use of latches within all aerophone user interfaces can allow a player to sequence three or more instruments with only two hands. The use of a latching hole cover system within aerophones which contain multiple playable interfaces in parallel, similar to uilleann pipes (or other types of bagpipes), allow a user to resume and maintain an ergonomic body position after selecting note changes.

To gain a further understanding of the invention and embodiments detailed herein, the following examples are set forth below. It will be understood that these examples are intended to describe illustrative embodiments of the invention and are not intended to limit the scope of the invention in any way.

Kits and Instrument Accessories

Modular instrument systems, component parts and accessories may be configured as kits for assembly of the apparatus and instrument of the present disclosure. Kits may contain interchangeable instrument or apparatus parts to allow a user to select from different combinations of various object holders, air conduit segments, air-filled objects, sound modulation means, or other accessories. Kit components may have different sizes, shapes, colors, textures, and/or be made of different materials, which allows for a wide variety of instrument assemblies as well as ornamental design elements. For example, air-filled objects and air conduit segments used within kits may visually represent or be shaped like animals, people, characters, globes, or colors. Interchangeable air-filled objects constructed out of different materials or wall thicknesses may result in the production of different sound properties that correlate with whatever visual imagery is represented on them or by their shape, as can air conduit segments of different shapes and sizes made from various materials. For example, a red air-filled object may produce a different sound when compared to an interchangeable blue air-filled object when connected to a given apparatus of the present disclosure. In another example, a chicken-shaped instrument configured for vibration using an a air-filled object that resembles an egg may produce a different sound when compared to a dolphin-shaped instrument configured for vibration using the same air-filled object.

Certain kits may contain additional accessories to the core instrument components of an air conduit (segment), object holder, and air-filled object. For example, a bellow pump can be purchased separately, or may be included with such a basic or simple instrument kit with instructions for how to assemble the instrument, and then use the pump with a hand, foot, or tool, like a toy hammer, to supply (deliver) air into the instrument. Other kits may be configured to provide for the assembly of more complex instruments by including instructions, and may also include a multitude of modular air conduit segments, which may become part of a user's larger collection, and allow said user to build and play numerous instrument configurations with different forms using multiple interchangeable air-filled objects, air conduit segments, object holders, sound modulation means, and other accessories.

Kits may be provided for use during activities like birthday parties, sports events, festivals, or other celebrations where a group of people can trade or share air-filled objects or other components of their modular instrument systems with each other to produce different sounds and/or instrument collections. For example, a backyard-sized instrument can feature playable interfaces for an entire group of people at a party, which can literally connect family members and friends to the same musical activity, and also allow for spontaneous modular instrument systems, performances, and makeshift orchestras. At a sports event, portable embodiments of modular instruments, featuring multiple mouthpieces and hoses can be assembled which would allow a group of people to motivate their favourite sports team by either blowing into individual assemblies of the instrument (each comprising an air conduit, object holder, and air-filled object), and/or by joining the hoses from their respective instruments to a single longer air conduit configured with a larger air-filled object to produce a louder sound in unison. Analogous to when sports fans have used a vuvuzela (a monotone lip-reed horn) to produce a monotone sound, the instrument according to the present disclosure allows a user to produce polyphonic sounds (the simultaneous combination of two or more tones) using their lung power and without requiring embouchure. Kits may also include plumbing fittings, pipe fittings, and/or provide instructions for everyday household items, which may be used as part of a modular instrument system. For example, plumbing fittings and/or pen shells, and or bottles, and/or straws, and/or hollow vegetables or other items may be used to create an instrument's air conduit, and be interchangeable. Other kits of different scales and sizes may contain apparatuses which may be assembled into instruments with the addition of commonly available or readily constructed air-filled objects such as beach balls, urethane balls, balloons, or using latex (e.g. gloves), bubble wrap, and plastic bags to make air-filled objects.

Kits may offer opportunities within the field of education both in STEAM (science, technology, engineering, arts, and mathematics), wherein the physics of vibration may be explored using instruments. For example, sand placed inside of an air-filled object may produce an analog visualization of a sound wave or pattern when the object vibrates, which may be educational with regards to the physics of sound production. The tactile feeling of squeezing an air-filled object, as a subjective measure of pressure, may serve as a soothing mechanism while teaching about air pressure, prior to the user placing the air-filled object into an instrument to play it, which may produce a range of other desirable mental, emotional, and educational effects, even without prior musical knowledge. The bounciness and sound properties of an air-filled object in relation to the amount of air pressure inside of the object may function as an educational game that connects the physics of air pressure to sound. Modular instrument systems featuring multiple vibration gaps in series can be used to study how one frequency interacts with, or can influence another frequency, while modular instrument systems featuring vibration gaps in parallel may be used to learn about phase cancellation. Educational instructions may also be packaged with a kit that teaches a user about the origins of materials and their properties. For example, the instructions could teach about rubber as a material, and its biodegradability within ecosystems (e.g. how gum trees in the Amazon which produce rubber also produce rubber turpentine which biodegrades natural rubber). A kit may include an air-filled object made from natural rubber (e.g. a standard rubber balloon), and natural terpenes (e.g. lemon or pine oil) so that when the air-filled object is ready to be disposed of, it may be biodegraded.

Within a kit used by a professional, interchangeable parts may be of use to jugglers, musicians, installation artists, circus artists, street performers, and fitness and exercise groups. For example, a juggler may juggle air-filled objects within a performance while producing sound using the same interchangeable objects within an aerophone instrument. A kit may include enough parts to form instruments for an entire orchestra of musicians to provide an audience with a unique audiovisual experience. Whereas common aerophones do not reveal a line of sight between the listener and the vibrating material (e.g. reed), instruments that use an air-filled object to produce vibration according to the present disclosure may feature a line of sight between the air-filled object (e.g. a semi-transparent balloon accessorized with glitter and lights) and the listener. In addition, modular instruments constructed by providing kits for professional musicians may have parts that are ornamental (e.g. carved, engraved or embossed parts), manufactured out of high quality materials, and may feature spit valves, fine-tuning mechanisms, and carrying cases. Within the field of installation arts a kit may provide parts for the assembly of large geometric structures, and may include air conduit segments with translational symmetries, rotational symmetries, and/or other modular connectors for the assembly of a wide arrangement of geometrically formed air conduits. Within a circus arts context, an acrobat may connect aerophone instruments to their arms, and wear air-pumping shoes, or use spring-loaded air-pumping stilts to do backflips as a means to deliver air for the arm-mounted aerophone instruments. Within an exercise or fitness context, a kit may include an exercise ball that may serve a dual function as an air-filled object when placed into an apparatus of the present disclosure. For example, air pumps may be connected to the pedals or crank shaft of multiple exercise bikes in a spin class to provide air to an instrument, while the person leading the spin class can be utilizing the air produced by the group to play the instrument.

EXAMPLES

The following example(s) illustrate the various aspects and embodiments of the apparatus and instrument of the present disclosure.

Example 1: Air Conduit With Object Holder (Apparatus for Assembling an Aerophone Instrument)

Figure 1B:
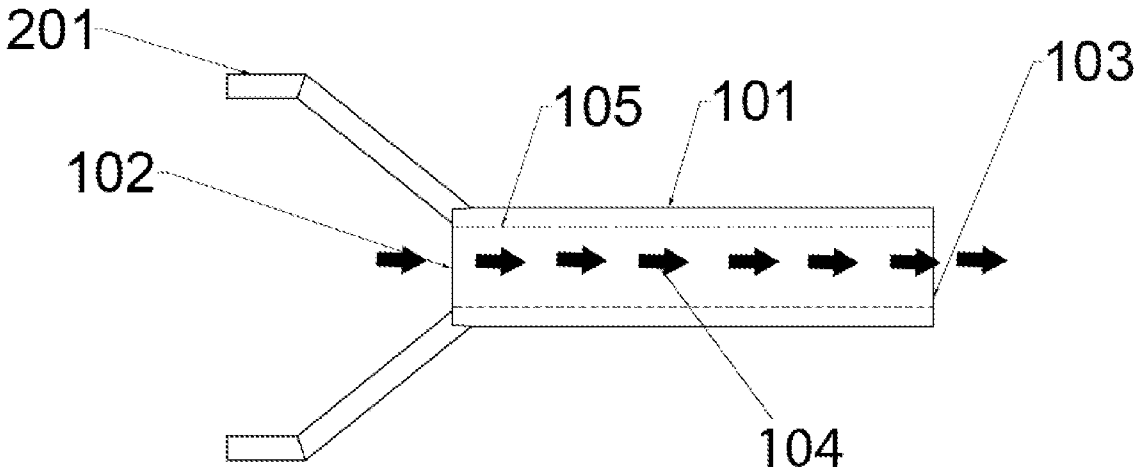

An apparatus for assembling an aerophone instrument comprises an air conduit and an object holder, which with reference to FIG. 1A, comprises an air conduit 101 providing an air passage 105, as well as an air inlet 102, an air outlet 103, an air pathway 104, and an object holder 201. The air inlet 102 is configured to deliver a first volume of compressed air through the air passage 105 in the direction of the air pathway 104, and the air outlet 103 is configured to allow for a second volume of compressed air to exit from the air passage 105, while the object holder 201 may be utilized to hold an air-filled object stationary relative to the air conduit 101. The apparatus may be configured to reverse the air pathway 104 through the air passage 105, as is illustrated in FIG. 1B. The apparatus will function as long as a volume of compressed air may enter and exit the air conduit, while the object holder 201 serves as a means for positioning an air-filled object relative to the air conduit 101. For example, within FIG. 1A the air pathway 104 and flow of air may be reversed using a vacuum to pull air through the apparatus resulting in the air pathway of FIG. 1B, as opposed to a player blowing and thereby creating pressure which pushes air through the apparatus.

Figure 1C:
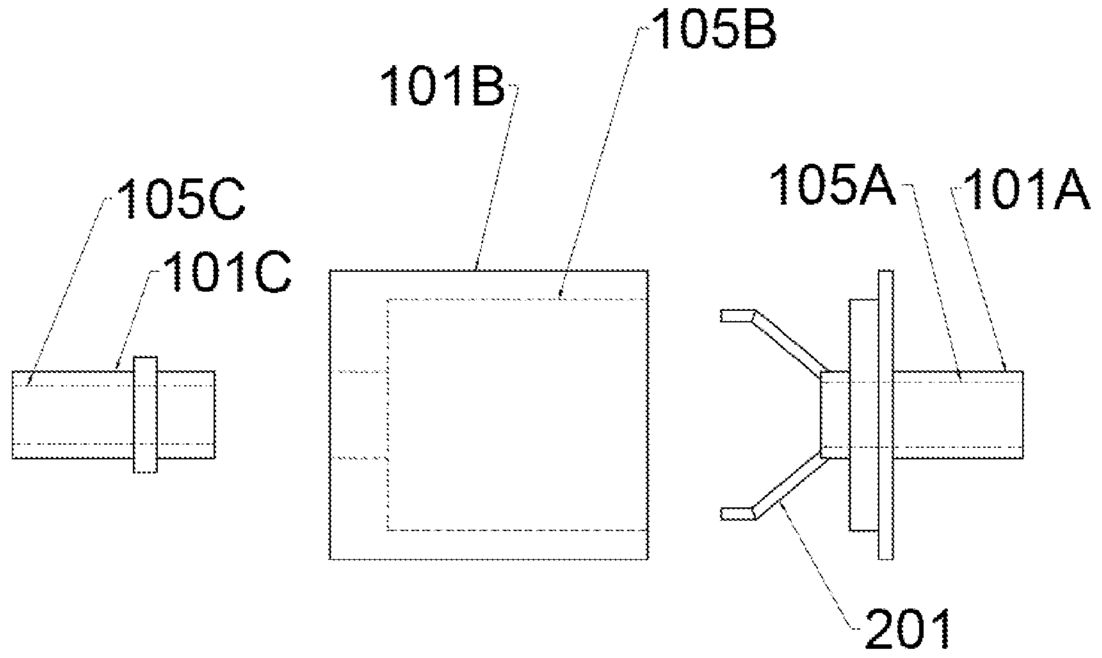
Figure 1D:
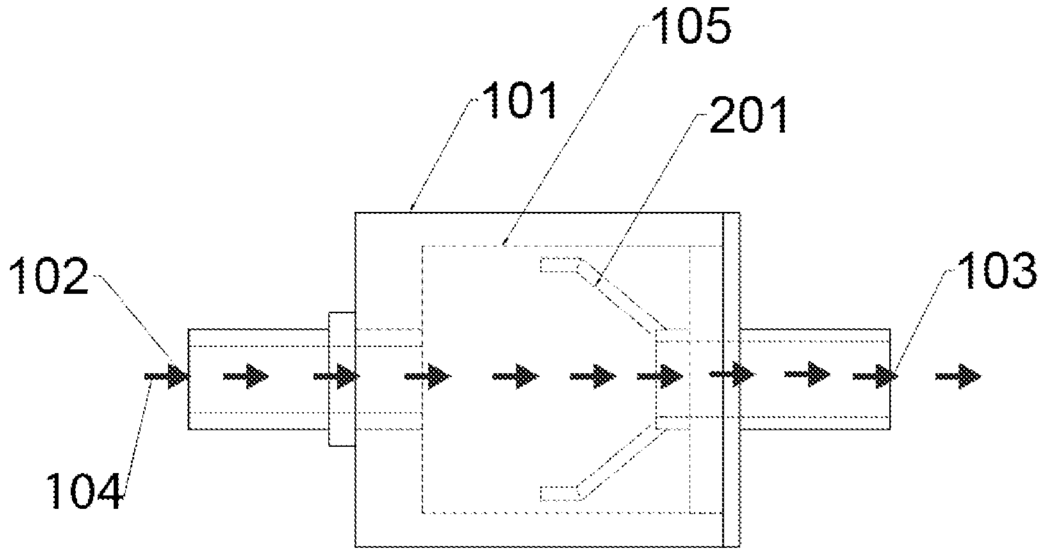
Figure 1E:
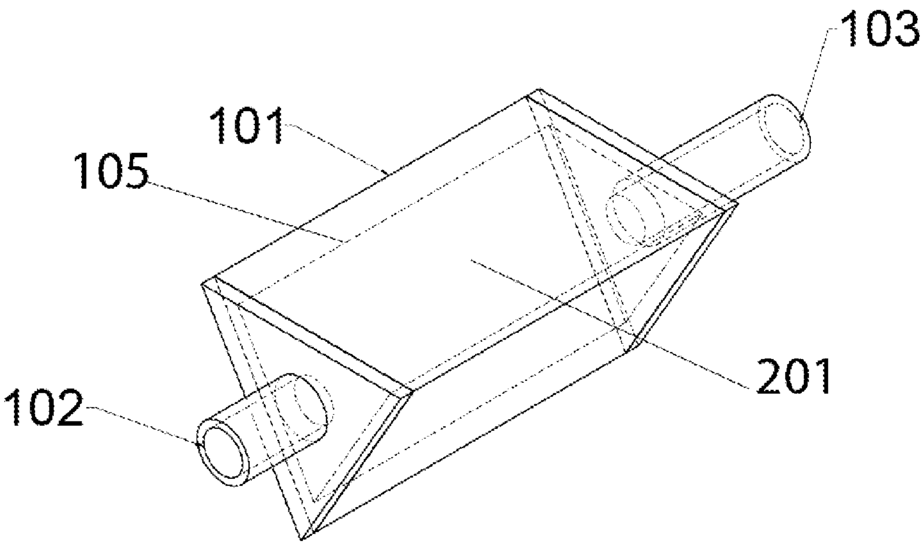
Figure 1F:
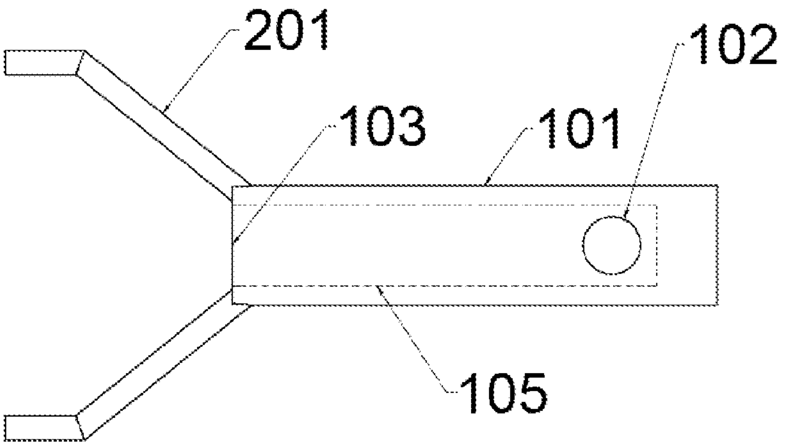

Referring to FIG. 1C, an apparatus comprising three air conduit segments (101A-101C) providing three respective air passage segments (105A-105C) illustrates how air conduit segments may protrude within other segments, and may be assembled to form the apparatus of FIG. 1D. Referring to FIG. 1D, the air conduit 101 and air passage 105 may enclose object holder 201, which may facilitate the reversibility of the air pathway 104 by providing an air passage which allows air to pass around an air-filled object, and for the air pathway to flow in either direction with only pressure, or with only vacuum. Referring to FIG. 1E, the object holder 201 may be one or more surfaces inside of an air conduit structure which may be used to position an air-filled object, where the object holder provides enough friction to resist the force exerted from the movement of air through the air conduit 101. Within FIG. 1E the object holder 201 is the nearest surface relative to a central longitudinal axis of a multi-surface air conduit. Referring now to FIG. 1F, the air inlet 102 may be located at any point on the air conduit 101, as long as a first volume of compressed air may enter the air inlet 102, travel through the air passage 105, and cause the exit of a second volume of compressed air from the air outlet 103.

Figure 2:
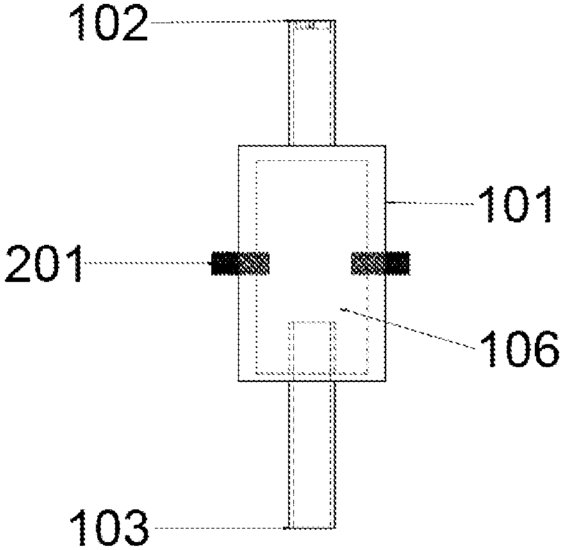
FIG. 2: An embodiment of an apparatus according to the present disclosure illustrating a configuration comprising an air conduit featuring a chamber segment as well as a threaded object holder.
Figure 3:
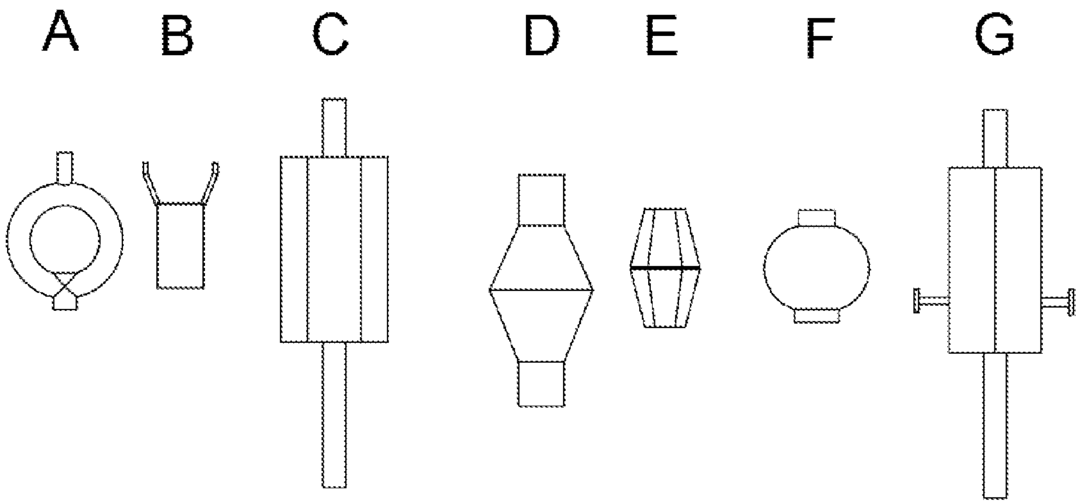
FIGS. 3A-3G: A non-exhaustive assortment of air conduit segment embodiments according to the present disclosure featuring various shapes and/or features, where A is a hollow torus; B is a cylindrical form; C comprises pipe segments with different diameters; D comprises conical segments tapering out from a circular mid-section; E comprises polygonal segments tapering out from a hexagonal mid-section; F illustrates a curved form; G illustrates a rectangular form for the chamber segment of the air conduit.

With reference to FIG. 2, the air conduit features a chamber 106 which may partially enclose the object holder 201. The object holder 201 may contain a threaded means for positioning an air-filled object which protrudes through the air conduit into the chamber 106.

Air conduit segments which comprise air inlets, air outlets, and any other segments that in turn extend or reduce the length of an air passage can be cylindrical, conical, polygonal, ovular, spiral, or any number of other shapes, some of which are illustrated in FIGS. 3A-3G.

Figure 4A:
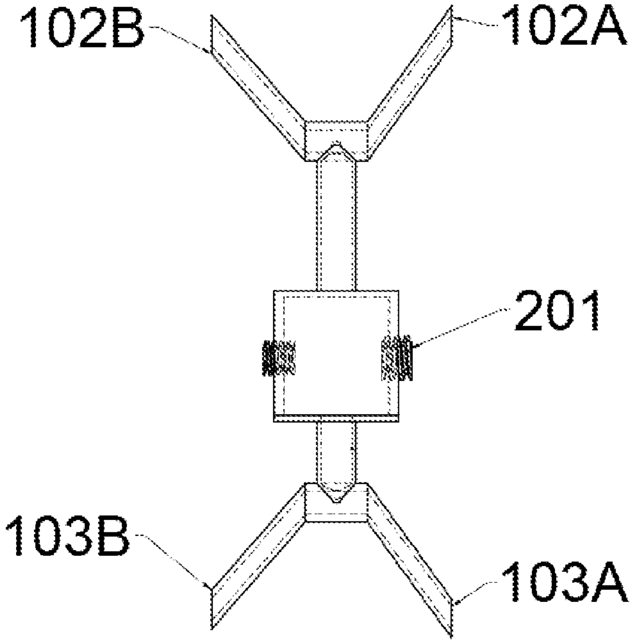
FIGS. 4A-4E: A is an embodiment of an apparatus according to the present disclosure featuring multiple air inlets and air outlets, as well as an object holder that protrudes into the air passage of the air conduit; B is an alternative embodiment to the apparatus shown in A where additional air conduit segments providing additional air passage segments allow air inlets and outlets to become joined on both ends; C is an exploded view of an alternative embodiment to the apparatus shown in B where the air passage is also bifurcated, but instead of a fully enclosed chamber, the air-filled object holder is the interior external surface of a hollow torus-shaped air conduit segment; D is an assembled view of the apparatus shown in C; E is an isometric view of an alternative embodiment to the apparatus shown in A featuring multiple air outlets that function in line.
Figure 4B:
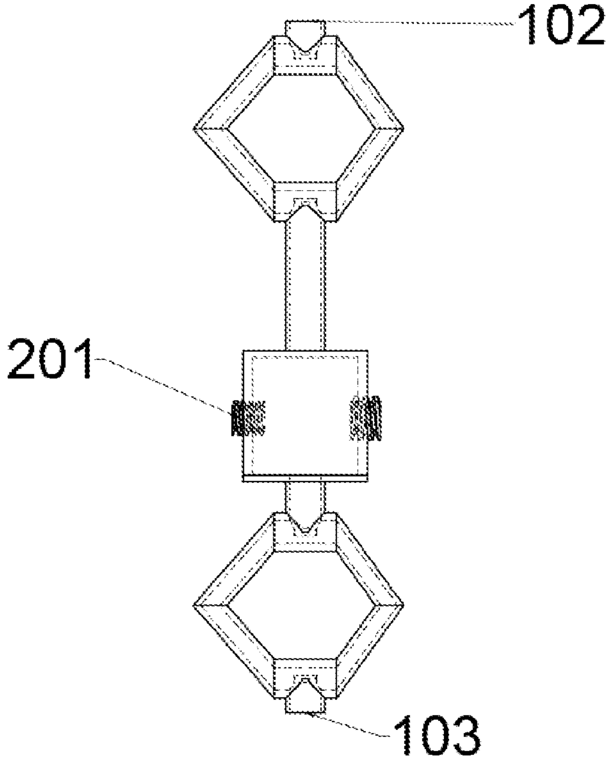
Figure 4C:
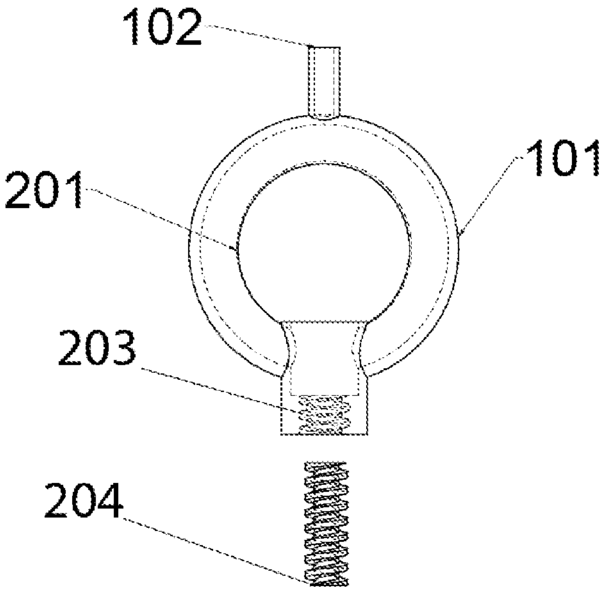
Figure 4D:
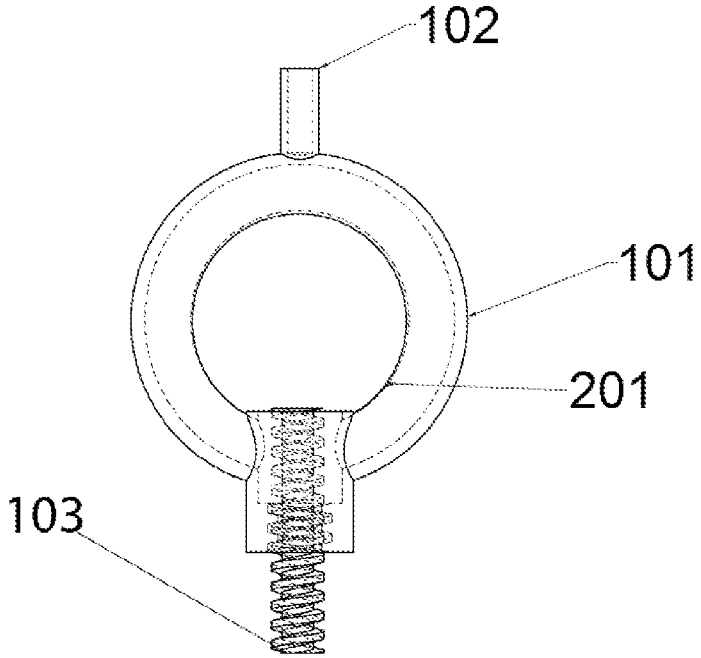
Figure 4E:
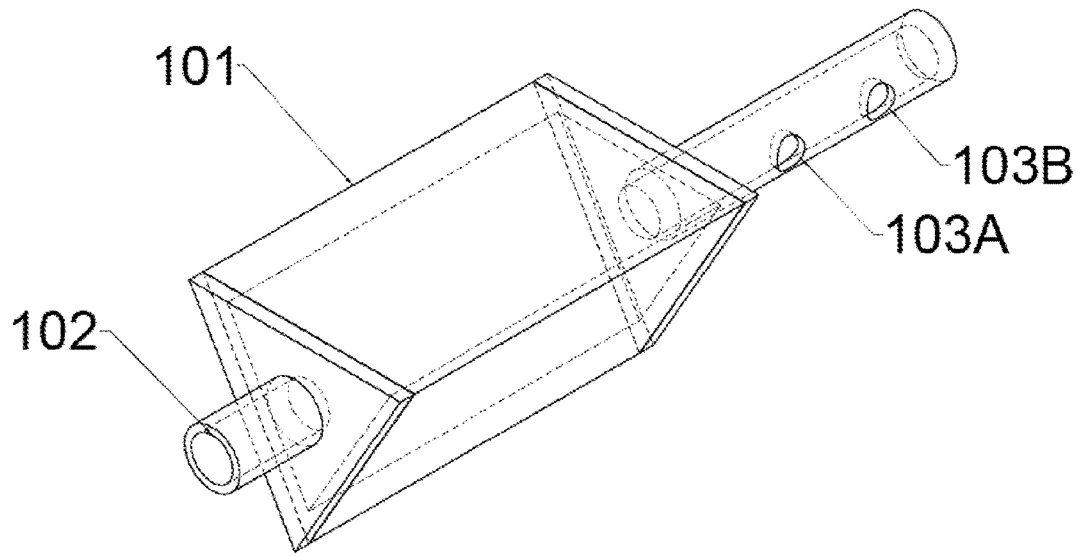

In certain embodiments, the air conduit comprises multiple (e.g. two or more) air inlets, air outlets, and/or other segments to form one or more air pathways through the air passage, which may or may not coincide with one another, as illustrated in FIGS. 4A-4B. In certain embodiments, referring to FIGS. 4C-4D, the air conduit's external surface may act as the object holder 201. The apparatus in FIG. 4C may include a pipe segment positioning system consisting of a female pipe segment positioning means 203 and a male pipe segment positioning means 204, which are threaded in this embodiment, and may be assembled to form the apparatus shown in FIG. 4D. FIG. 4E illustrates an alternative embodiment to FIG. 1E that features two air outlets (103A-103B), which may or may not be covered by a user to modify the length of an air pathway and/or the pressure of compressed air being released from an air outlet (e.g. similar to a flute). For example, if a user were to completely cover air outlet 103A with a finger, compressed air would exit air outlet 103B. If a user were to cover both air outlets 103A-103B, the compressed air would be unable to exit the apparatus, however if a user were to partially cover the air outlet 103A, some amount of compressed air would exit both outlets, and if both holes were uncovered, a greater amount of compressed air would exit the air outlet 103A with a lesser amount of compressed air exiting the air outlet 103B.

Figure 5A:
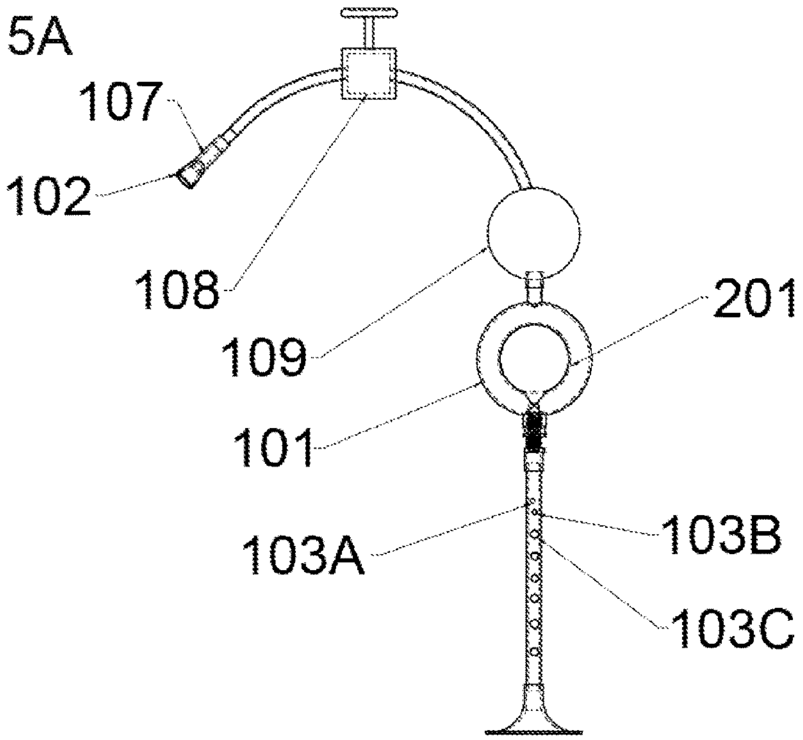
FIGS. 5A-5B: A is an embodiment of an apparatus according to the present disclosure illustrating a torus-shaped air conduit that includes an air reservoir, valve to modulate air pressure, a mouthpiece, and holes that function as multiple air outlets; B is an alternative embodiment to the apparatus shown in A featuring three valves connected to three respective air outlets.

In FIG. 5A, the air conduit comprises the air inlet 102 at a first end, which includes any number of segments or hose attachments, which may connect to the rest of the air conduit, in order to initiate the delivery of compressed air through the air passage. For example, the air inlet can include a mouthpiece 107 (e.g. a blowpipe) which a user can blow into, or a hose attachment through which air can be provided using a pump. A valve 108 may be used to adjust air resistance or act as a one-way valve, or be used as a toggle valve to initiate delivery of air to the downstream portions of the air conduit, with reference to the flow of air from the air source. An air reservoir 109, generally constructed out of an elastic material such as leather or rubber, may be used to store air and reduce variation in pressure. The air inlet 102 can be located along any point of an air conduit, and be any shape which allows air to enter into the air passage provided by the air conduit. The air inlet mouthpiece 107 may include a rubber sleeve to enable a flexible portion for a user to bite and hold with their mouth, as well as to avoid chipped teeth. Air outlets 103A-103C illustrate multiple exit points for air to exit the air conduit 101, which are determined in this embodiment by the first holes the compressed air reaches along its delivery pathway. Air outlets may be configured for releasing air by altering which holes are covered by a user's fingers, thus altering where the compressed air exits the apparatus.

Figure 5B:
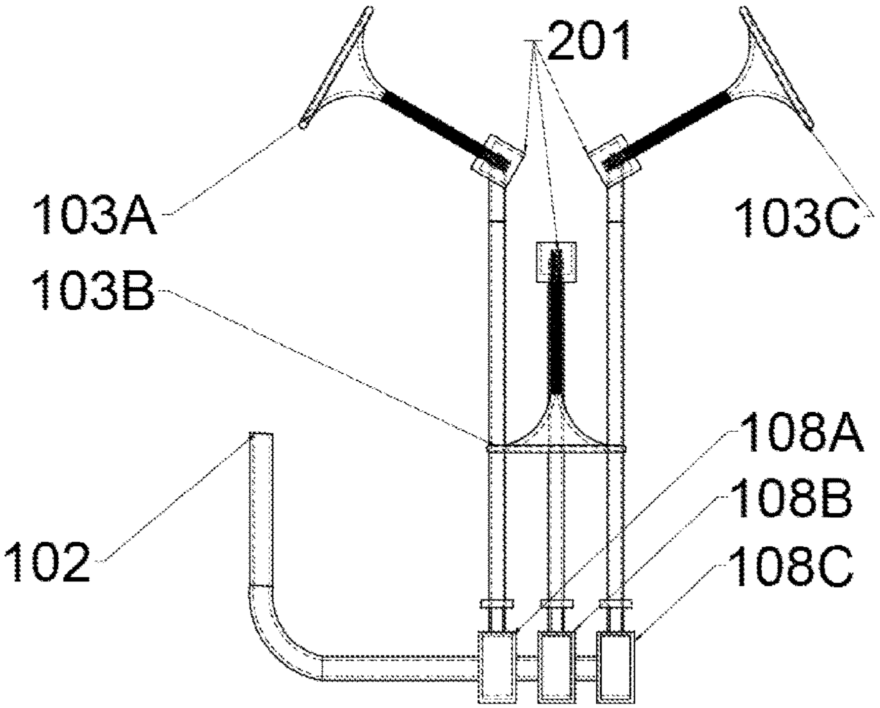

In another embodiment referring to FIG. 5B, valves 108A-108C may be in a closed state, which allows a user to adjust airflow between the air inlet 102 and one or more of the air outlets 103A-103C. Within the apparatus embodiment of FIG. 5B the object holder 201 may be one or more external surfaces of the apparatus.

In another embodiment illustrated in FIG. 6, the object holder 201 may be a structure or means that is not connected to the air conduit when the apparatus is not in use. For example, a user's hand or other body part, a wall, book, cup, or other household item can be used to position an air-filled object relative to an air passage formed by the air conduit 101.

Figure 7A:
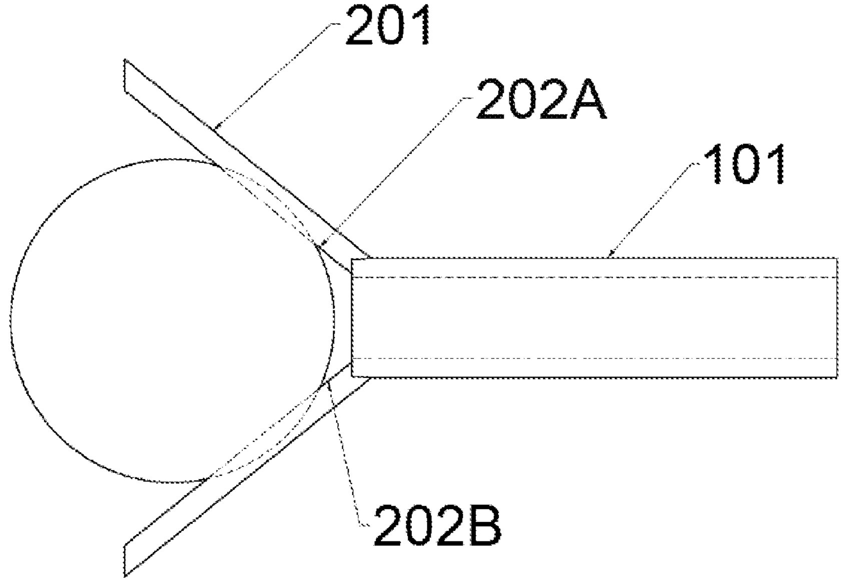
FIGS. 7A-7D: A is an alternative embodiment to FIG. 1 featuring an object holder that is anchored to the air conduit with two discrete vibration anchor points; B is an isometric right side view of an alternative embodiment to the apparatus shown in A featuring an air-filled object holder inside the air conduit providing multiple continuous vibration anchor points along its inner diameter surface; C is an alternative embodiment to the apparatus shown in B featuring air-filled object holders that protrude through the air passage of the air conduit with two discrete vibration anchor points; D is an isometric view of the apparatus shown in 4B featuring a continuous series of vibration anchor points located around the inner diameter of its torus shape.
Figure 7B:
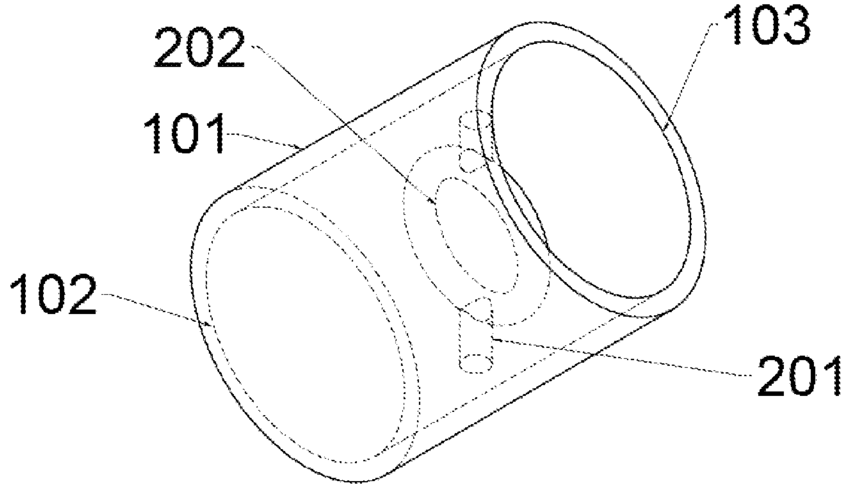

In yet another embodiment illustrated in FIG. 7A, the object holder 201 is permanently or semi-permanently secured to the air conduit 101. Object holder 201 may essentially be anything that can hold the air-filled object in a sufficiently stationary position to partially impede the passing of compressed air through the air passage provided by the air conduit.

Figure 7C:
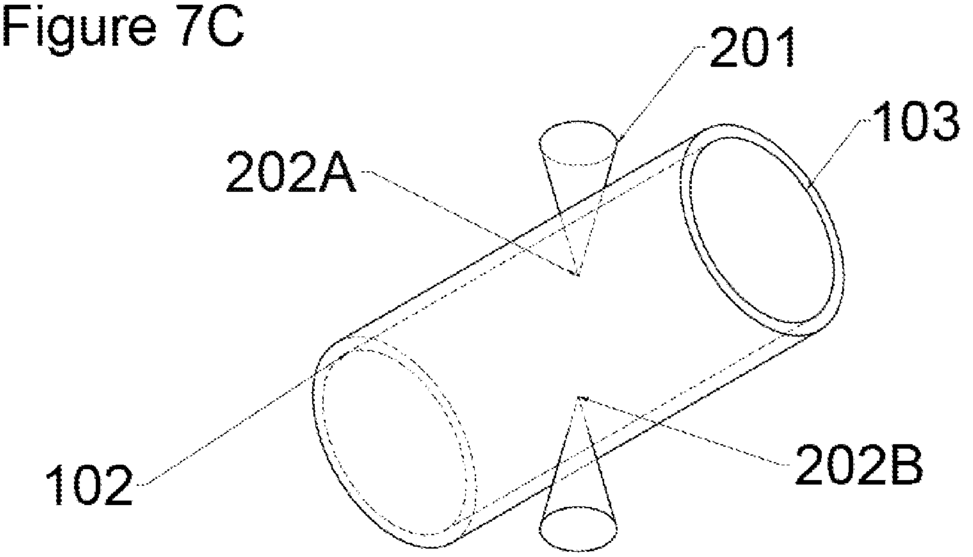
Figure 7D:
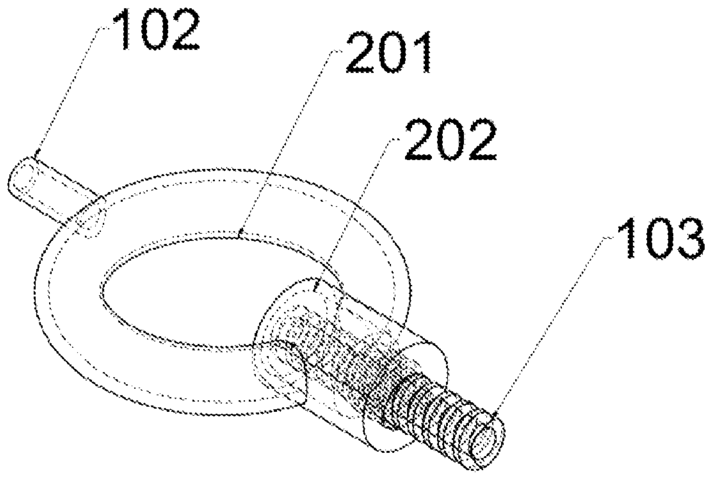

FIGS. 7A-7D illustrate that two or more discrete (7A and 7C) or continuous (7B and 7D) points of connection between an air-filled object's external wall and the object holder are referred to as vibration anchor points 202. Vibration anchor points restrict the motion of the air-filled object's external wall within a finite region, and may be configured to produce vibration if compressed air impacts the external wall of the air-filled object. Referring to FIG. 7C, the vibration anchor points are the tips of each conical structure, which can also function as the object holder 201 for an air-filled object. When using air-filled objects with 0.01-0.5 mm wall thickness, the air-filled object's longevity may be extended when using an embodiment with continuous vibration anchor points, as featured in the circular shapes of FIGS. 7B and 7D.

In FIGS. 8A-8Q, a non-exhaustive variety of object holder shapes are shown in various views. Illustrations 8A-8G show various embodiments which may hold an air-filled object using friction created when the surface of an object holder and a wall of an air-filled object connect. The means for positioning an air-filled object shown in FIGS. 8H and 8I illustrate how fasteners (tension altering means) may be used to adjust the degree of friction and/or compression, and also function as an object holder to position an air-filled object relative to the air passage provided by the air conduit. FIGS. 8J-8L may compress an air-filled object using fasteners while holding it in the desired position when connected to the apparatus. FIG. 8M may hook on to an air-filled object with a chain link or other mechanism and furthermore position the air-filled object using eye bolts or other types of similar fasteners. FIGS. 8N and 8O may hold an object in a tapered polygonal interface configuration to allow for air to pass around the air-filled object when connected to the apparatus. FIG. 8P may hold an air-filled object between the surface areas and/or vertices of apparatuses with compound shapes made from different pipe segments that protrude into one another. FIG. 8Q may hold an air-filled object between multiple surface areas of a spiral-shaped object holder.

Example 2: Assembly of an Aerophone Instrument Using an Air-Filled Object

Figure 9A:
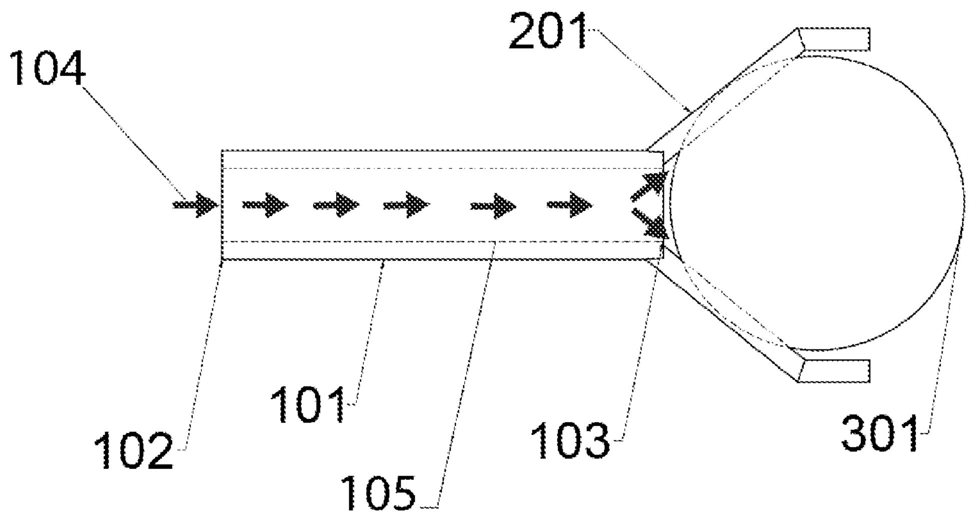
FIGS. 9A-9B: A is an alternative embodiment of the apparatus shown in FIG. 1A that features the addition of an enclosed air-filled object; B is the same embodiment of the apparatus shown in A configured with a reversed air pathway.
Figure 9B:
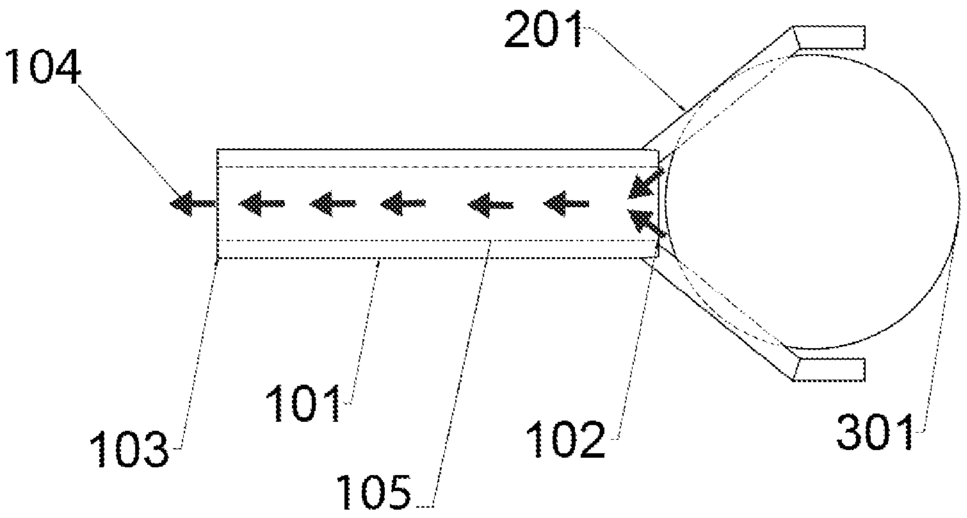

FIG. 9A illustrates how an air-filled object 301 is secured to the object holder 201 using a friction interface. Compressed air may enter the air inlet 102 in the direction of the air pathway 104, pass through the air passage 105 provided by the air conduit 101, impact the external wall of the air-filled object 301 which is positioned using the object holder 201, and may exit the air outlet 103. As was the case between correlating FIGS. 1A and 1B, airflow in FIG. 9A may be reversed, which is illustrated in FIG. 9B.

Figure 10:
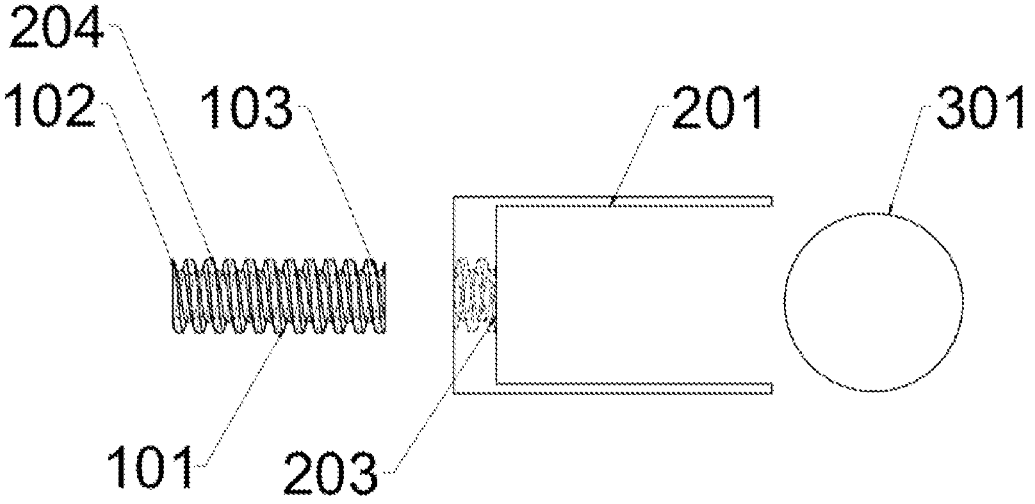
FIG. 10: An exploded view of an embodiment of an aerophone instrument according to the present disclosure illustrating a configuration comprising a threaded air conduit, an open-ended rectangular object holder, and an air-filled object.
Figure 11:
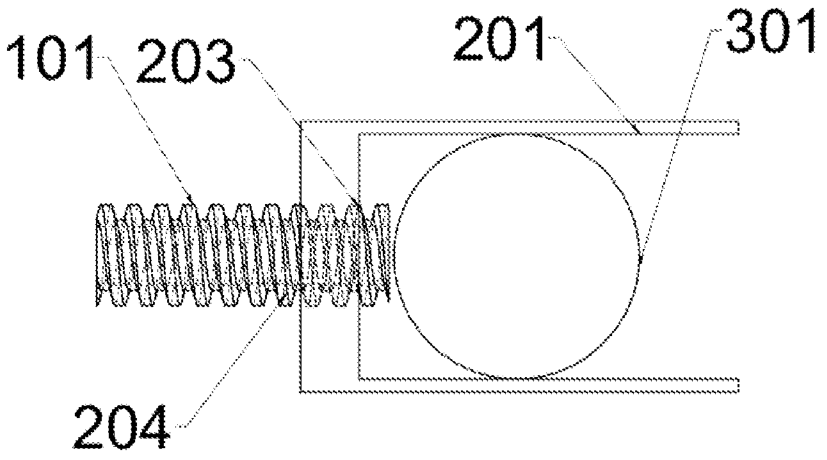
FIG. 11: An assembled embodiment of the aerophone instrument shown in FIG. 10.

FIG. 10 illustrates an exploded side view of an aerophone instrument (e.g. a pipe musical instrument), and includes a female pipe segment positioning means 203, which in FIG. 10 is a threaded interface for receiving a pipe segment integrated into the object holder 201. Female pipe segment positioning means 203 allows for precision assembly of an aerophone instrument when a male pipe segment positioning means 204 is threaded into it to configure a pipe segment positioning system. FIG. 11 illustrates the assembled version of FIG. 10 which properly aligns the air conduit 101 with the object holder 201 for the assembly of the aerophone instrument and the positioning of the air-filled object 301.

FIGS. 12A-12J illustrate a non-exhaustive assortment of embodiments of air-filled objects which may be connected to various apparatus, instrument, and aerophone embodiments of the present disclosure. The wall of an enclosed air-filled object fully divides an inside space from an outside space, which allows air within the object to act as an air spring. The wall thickness of the air-filled object may be 0.001-10 mm, specifically within the surface area(s) which may be configured to vibrate. Air-filled objects may take on any geometrical form. For example, FIG. 12A shows a spherical air-filled object, FIG. 12C is an elongated air-filled object, FIG. 12D is a polygonal air-filled object, and FIG. 12E is an ovular air-filled object with one or more curvature profiles which in one embodiment may be a balloon. Wall thicknesses of any range may be utilized as part of a multi-material air-filled object, which may also include multiple thickness and stiffness profiles along its surface. For example, FIG. 12B illustrates one embodiment of an air-filled object which contains seams or joinery between two or more materials.

Air-filled objects may be inflated to pressures above atmospheric pressure while others may be stretched or expanded by the use of anchor points as tension adjusting means, as is the case in FIG. 12F. Deflating an air-filled object to lower than atmospheric pressure is also possible, as is the case in FIG. 12G, which may use a rigid structure to maintain a 3D form while containing lower than atmospheric pressure. Referring to FIG. 12H, certain embodiments of an air-filled object feature multi-surface profiles which may be used to port air around the object within a cylindrical air conduit. Any embodiments featuring multiple wall thicknesses for different areas of an air-filled object's surface may be distinguished by different colors, faces, protrusions, and/or indentations. An air-filled object may have particles of solids and/or liquids inside, as is the case in FIG. 12I. For example, some particles that may be used inside an air-filled object in such a way as to be visible from the outside include sand, styrofoam balls, liquids, and/or magnetic fluids. An air-filled object may be a hollow torus shape, or other shapes which allow air to pass through them, as is the case in FIG. 12J.

In another embodiment, referring to FIG. 13, the air-filled object 301 may be held by the object holder 201 inside of the chamber 106, which holds the air-filled object 301 relative to the air pathway 104, and which may allow for variable friction between the outer wall of the air-filled object 301 and the object holder 201. Methods to produce variable friction between the outer wall of the air-filled object 301 and the object holder 201 include but are not limited to: fasteners, cams, linear connections, set screws, clamps, and other methods of achieving relative motion with fastening. Fasteners may port or protrude through the air conduit wall to allow a user to fasten or unfasten the friction connection between the object holder and the air-filled object.

Figure 14A:
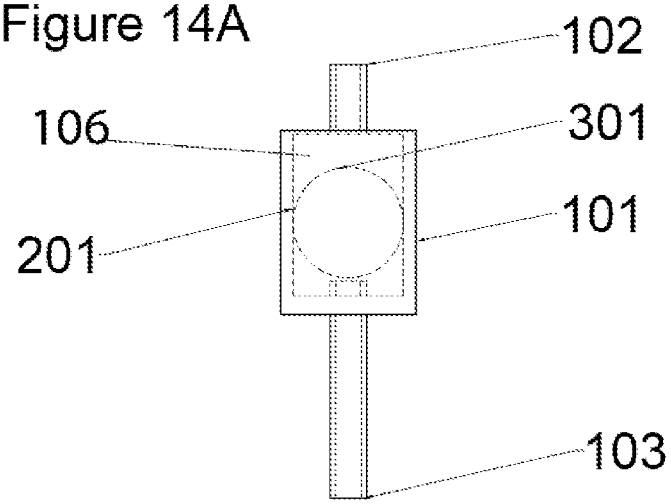
FIGS. 14A-14B: A is an embodiment of an aerophone instrument according to the present disclosure where an air-filled object is placed inside of a polygonal chamber segment of the air conduit, and uses a major and a minor diameter (e.g. polygon-shaped, star-shaped, oval-shaped, or other non-circular shaped air conduit segments) of different segments as a means for positioning the air-filled object; B is a top view of a similar embodiment to A which utilizes friction to hold the air-filled object within a chamber segment of the air conduit.
Figure 15:
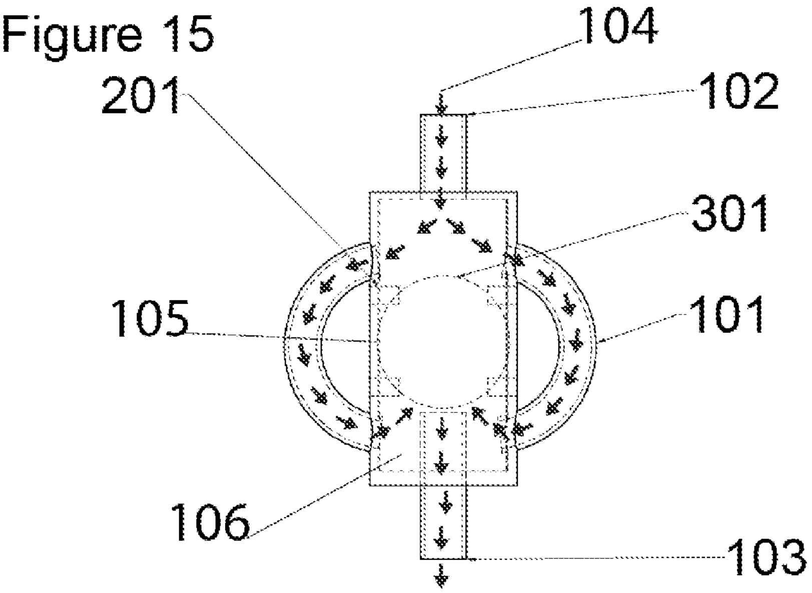
FIG. 15: An embodiment of an aerophone instrument according to the present disclosure featuring multiple air pathways within air passage segments.

In one embodiment illustrated by FIG. 14A, the object holder 201 is a friction interface between an air-filled object 301 and the internal walls of the air chamber 106. In embodiments where the object holder 201 is the nearest surface to a central point, or central axis of the air conduit 101 (specifically, in the present embodiment of FIG. 14A, the flats of polygonal chamber 106), even if the air pathway is impeded by a friction interface, air should still be able to pass around the air-filled object, so that the air-filled object does not completely block the air passage provided by the air conduit. Therefore, an air conduit segment which holds the air-filled object, such as the chamber 106, may have a major and minor internal diameter that is created when the air-filled object is in position. This can be achieved using any shape that features some surfaces which are closer to a central point in the air conduit, and other surfaces which are further away that allow air to move around the air-filled object.

Figure 14B:
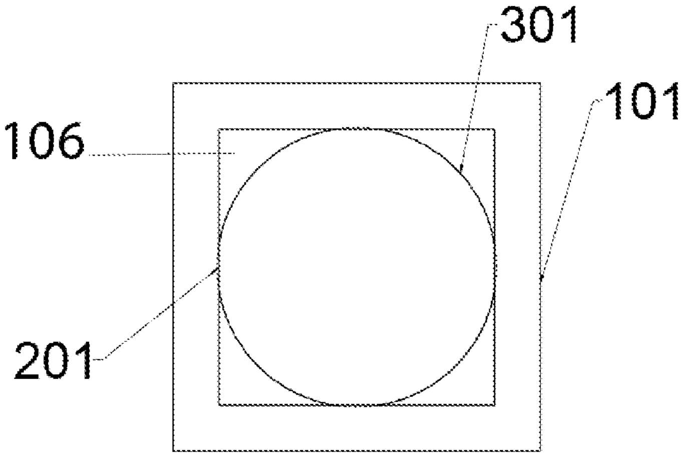

For example, FIG. 14B illustrates a top view of an alternative embodiment to FIG. 14A which utilizes friction between the nearest surface of the object holder 201 (also functioning as a segment of the air conduit 101) and an air-filled object 301. Within FIGS. 14A and 14B, the air-filled object 301 divides the air passing through the air chamber 106 into multiple air pathways. However, in another embodiment illustrated in FIG. 15, an air-filled object may fully block one segment of the air passage 105, so long as one or more alternate air pathways exist through the air passage to allow air to pass from an air inlet 102 to an air outlet 103.

Figure 16:
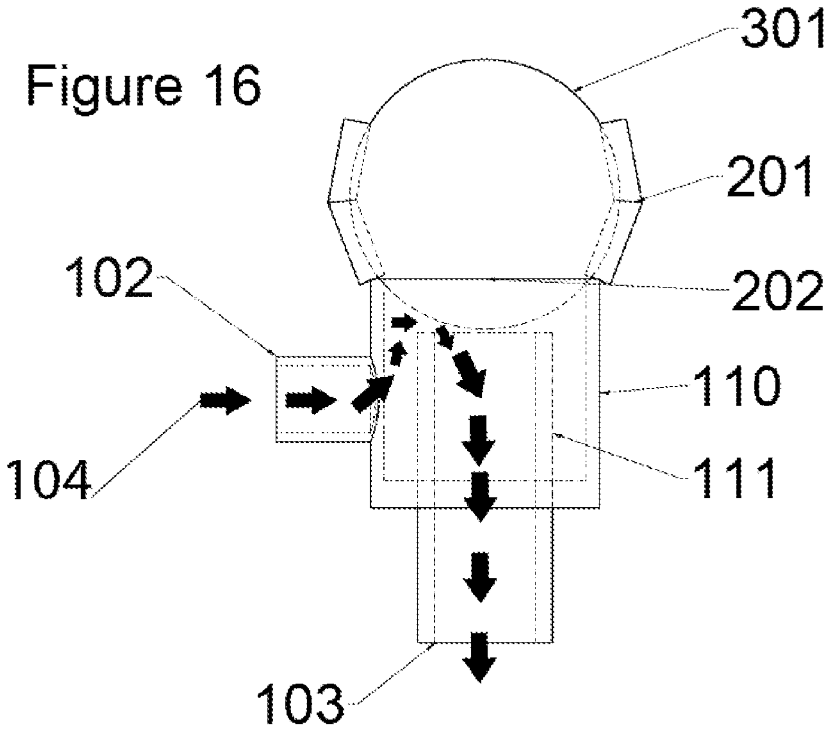
FIG. 16: An embodiment of an aerophone instrument according to the present disclosure in which the air-filled object's external wall is positioned on an opening of the air conduit that features vibration anchor points, with the air pathway moving from an outside pipe air conduit segment to an inside pipe air conduit segment.
Figure 17:
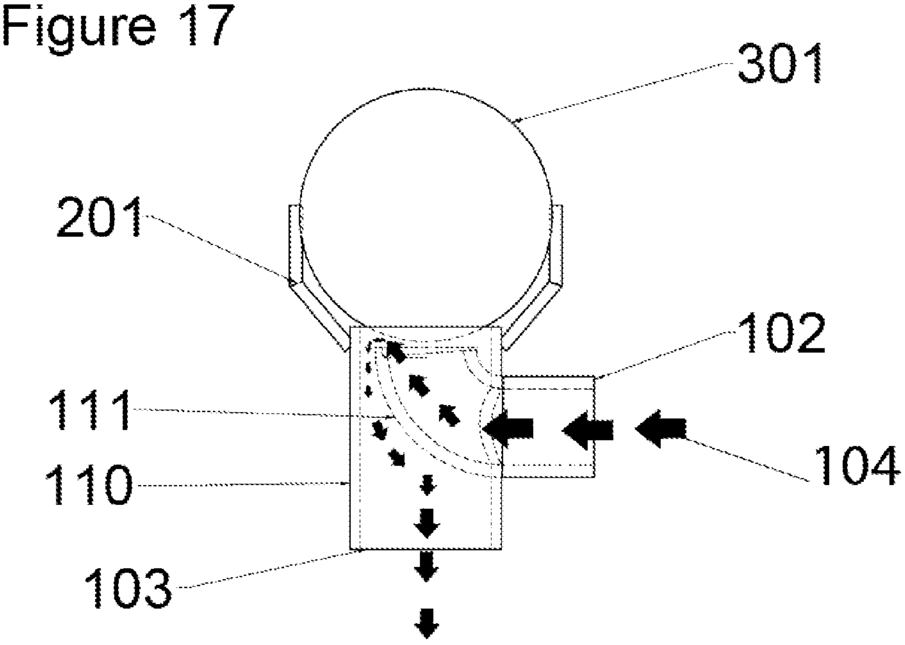
FIG. 17: An embodiment of an aerophone instrument according to the present disclosure in which the air-filled object's external wall is positioned on an opening of the air conduit that features vibration anchor points, with the air pathways moving from an inside pipe air conduit segment to an outside pipe air conduit segment.

In other embodiments, the object holder may position the air-filled object with the purpose of resting it on an opening of the air conduit. FIG. 16 illustrates an object holder 201 wherein a user may place an air-filled object over an opening in the air conduit 101 to position the air-filled object across two or more vibration anchor points 202. The vibration anchor points function as a holder for an air-filled object and the vibration that may occur on the external wall of the air-filled object. In FIG. 16, air enters air inlet 102, travels through air conduit 101, and exits air outlet 103. The air pathway 104 in FIG. 16 can be described as moving through the air passage segments by being delivered from an outside pipe segment 110 into the air passage segment of an inside pipe segment 111 by moving through an interstitial space between those two parts. FIG. 17 shows, respectively, that the air pathway 104 can be described as moving from the inside pipe segment 111 to an outside pipe segment 110.

In another embodiment illustrated in FIG. 18 the object holder 201 may be the exterior wall of the air conduit 101. FIG. 19 illustrates the front view of the instrument shown in FIG. 18, where air is supplied to air inlet 102, passes through the torus-shaped air conduit 101 to the vibration anchor points 202 and the air-filled object 301, and then exits the air outlet 103 as shown by the air pathway 104.

Figure 20A:
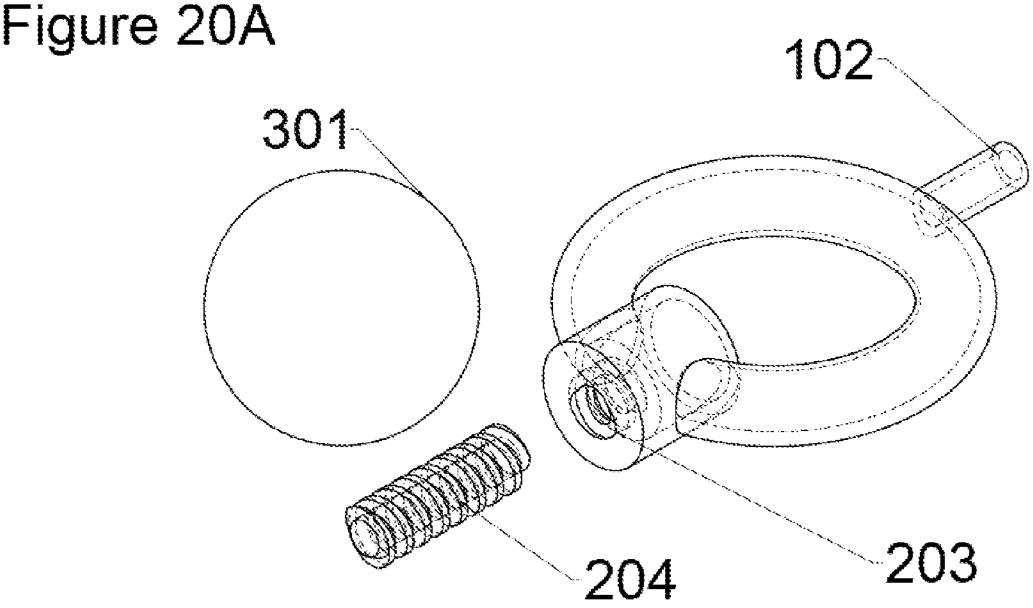
FIGS. 20A-20B: A is an exploded isometric view of the aerophone instrument illustrated in FIGS. 18 and 19, featuring a threaded pipe segment positioning system; B is an alternative embodiment to A featuring a male slip fit insert which contains a female thread.
Figure 20B:
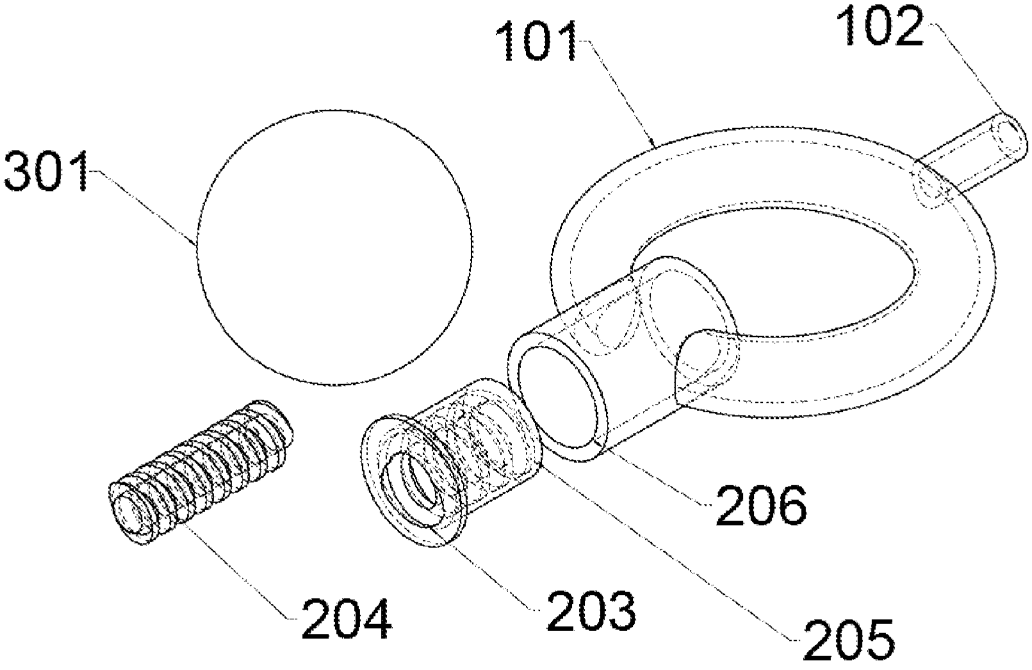

To assemble an aerophone instrument a user connects an air-filled object to an object holder which acts as a means for positioning the air-filled object relative to the air conduit and the air passage. As illustrated in FIG. 20A, like FIG. 11, certain embodiments of an aerophone instrument may utilize a system for precision positioning of a segment of the air conduit 101 using the pipe segment positioning means 203 and 204, which in this case is threaded. The torus-shaped air conduit may be manufactured using rotational moulding or blow moulding. To overcome manufacturing limitations, the embodiment which is illustrated in FIG. 20B may utilize an insert which contains a threaded female pipe segment positioning means 203 and may join to the torus-shaped air conduit using a male/female connection 205 and 206, respectively.

Figure 21:
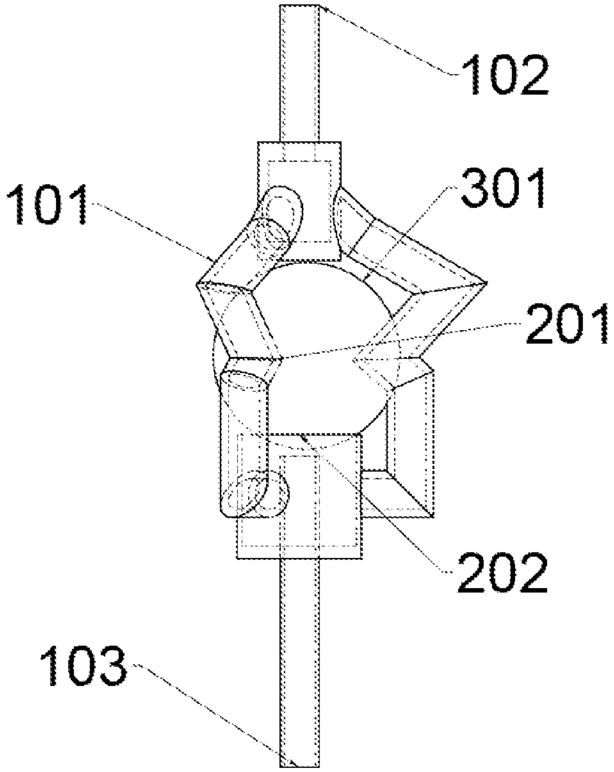
FIG. 21: An isometric view of an embodiment of an aerophone instrument according to the present disclosure in which the air-filled object is positioned on an opening of the air passage using the surface areas and vertices of the air conduit's compound shape as an object holder.

Other embodiments of the apparatus and instrument in the present disclosure may feature a combination of differently sized and shaped air conduit segments, which may create a compound form that is symmetrical or asymmetrical. FIG. 21 exemplifies this modular quality, and illustrates an asymmetrically shaped instrument featuring an air conduit 101 that is divided into differently sized pipe segments that also function as an object holder 201, which in turn provides vibration anchor points 202 to hold the air-filled object 301.

Example 3: Exemplary Vibration Gaps

Figure 22A:
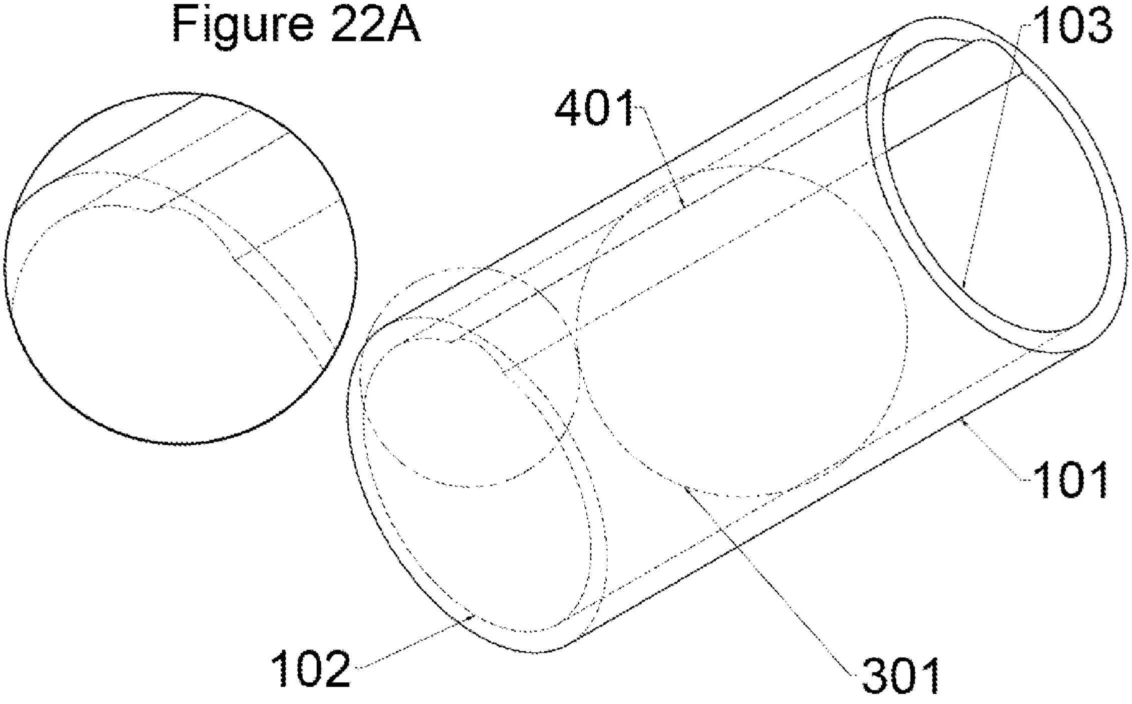
FIGS. 22A-22D: A is an isometric view of an embodiment of an aerophone instrument according to the present disclosure that is configured to produce a vibration upon delivery of compressed air to a vibration gap that is formed when the curved indentation in the air conduit contacts the air-filled object; includes a detail view highlighting the curved indentation in the air conduit with respect to the main figure located on the right; B is a top view of the instrument shown in A; C is a side view of the instrument shown in A; D is a top view of a similar instrument shown in A featuring a vibration gap distance between two opposing surfaces (where one of the surfaces is the external wall of the air-filled object) that exceeds 10 mm, and is therefore not configured to produce a vibration.
Figure 22B:
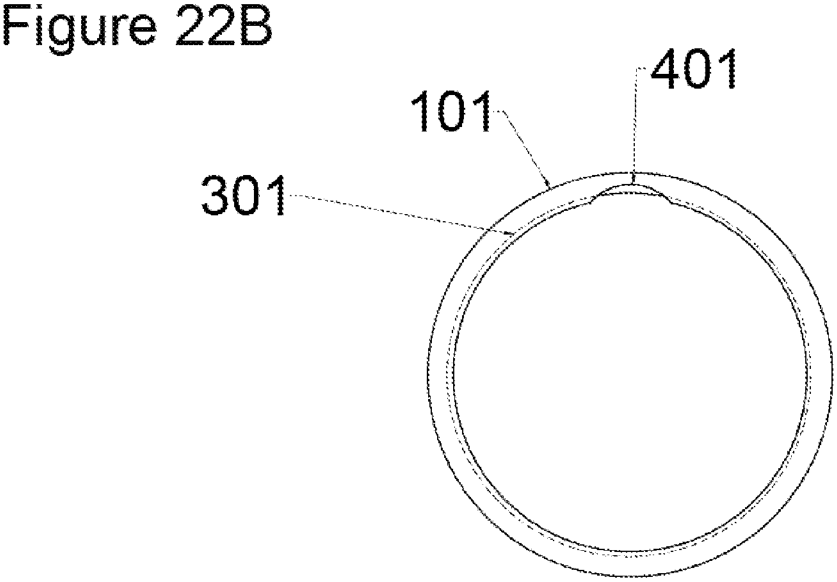
Figure 22C:
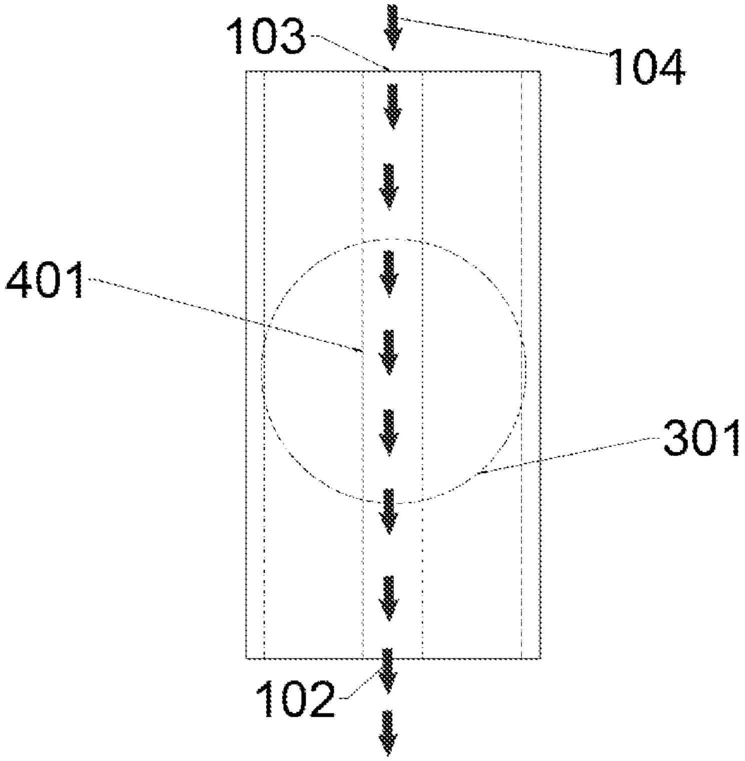
Figure 22D:
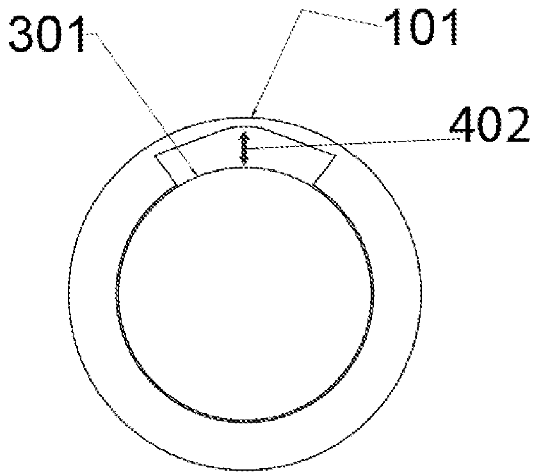

The vibration gap is formed by a narrowing of the air passage that occurs when two opposing surfaces of an aerophone instrument (see Example 2) are positioned within about 0-10 mm of each other, wherein one or more of the surfaces is a wall of an air-filled object. Referring to FIG. 22A, air passes through the air conduit 101, which has an indentation along its inner wall, and a vibration point 401 where the indentation is in proximity to the air-filled object 301. FIG. 22B illustrates a top view of the vibration gap 401 shown in FIG. 22A, while a side view is illustrated in FIG. 22C which features an air pathway 104. A vibration gap may be any shape that is formed between the external surface of the air-filled object when it is positioned to be operatively associated with one or more segments of the air conduit. Vibration may be produced in the instrument shown in FIGS. 22A-22C if the surface of an air-filled object is positioned within about 0-10 mm from the indentation along the air conduit's inner wall. In FIG. 22D, a vibration gap distance 402 depicts the 0-10 mm distance threshold required between a surface of an air-filled object, and an opposing surface of the air conduit in order to produce vibration. In this manner, provided that air pressure moving past, through, or by the vibration gap 401 is sufficient, the aerophone instrument will produce a vibration.

Referring to FIGS. 23A-23H, the vibration gap may be any shape so long as the surface of the air-filled object 301 is positioned to be operatively associated with an opposing surface of the air conduit that is within about 0-10 mm. FIGS. 23A-23E illustrate how the surface of an air-filled object and the internal surface of an air conduit form a narrowed air passage, wherein if the vibration gap distance 402 is between about 0-10 mm, a vibration gap is created between two or more opposing surfaces.

Figure 23A:
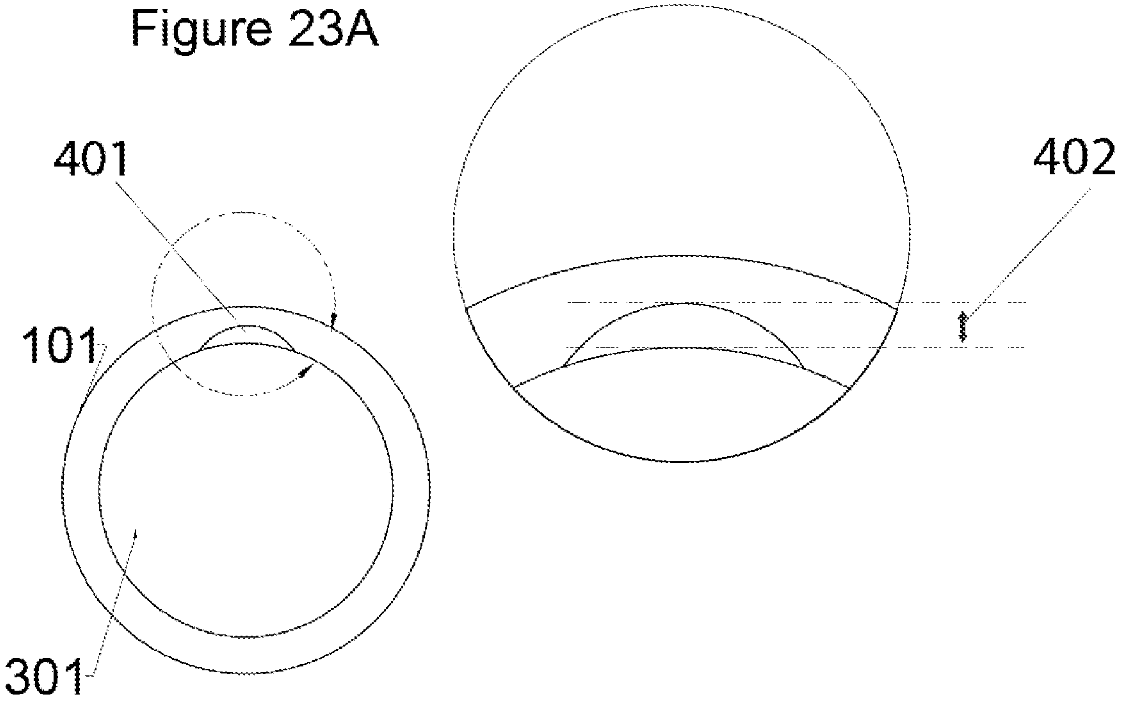
FIGS. 23A-23H: Various embodiments of differently shaped means to generate vibration in an aerophone instrument according to the present disclosure by forming or not forming indentations into the inner wall of a dual function structure used as an air conduit segment and object holder. When an air-filled object is inserted into the object holder, differentially shaped vibration gaps and vibration gap distances are formed between the air-filled object and the instrument, where A is a curved indentation forming a corresponding curved vibration gap, including a detail view highlighting the vibration gap distance with respect to the vibration gap featured in the main figure located on the left; B is an angular indentation forming a corresponding angular vibration gap, including a detail view highlighting a vibration gap distance with respect to the vibration gap featured in the main figure located on the left; C is the same vibration gap as B illustrating another vibration gap distance between the air-filled object and the air conduit's internal wall, including a detail view highlighting a vibration gap distance with respect to the vibration gap featured in the main figure located on the left; D illustrates a plurality of curved indentations forming a plurality of curved vibration gaps, including a detail view highlighting a vibration gap distance with respect to the vibration gap featured in the main figure located on the left; E illustrates a biconvex vibration gap arising from the shape of the air-filled object, including a detail view highlighting a vibration gap distance with respect to the vibration gap featured in the main figure located on the left; F illustrates a biconvex vibration gap formed between two or more opposing surfaces of one air-filled object, and also vibration gap distances between an air-filled object and the internal surface of an air conduit; G illustrates a biconvex vibration gap formed within a hole at the center of a torus-shaped air-filled object, including a detail view highlighting multiple vibration gap distances with respect to the vibration gap featured in the main figure located on the left; H illustrates a plano-convex vibration gap formed between opposing surfaces of one or more air-filled objects.
Figure 23B:
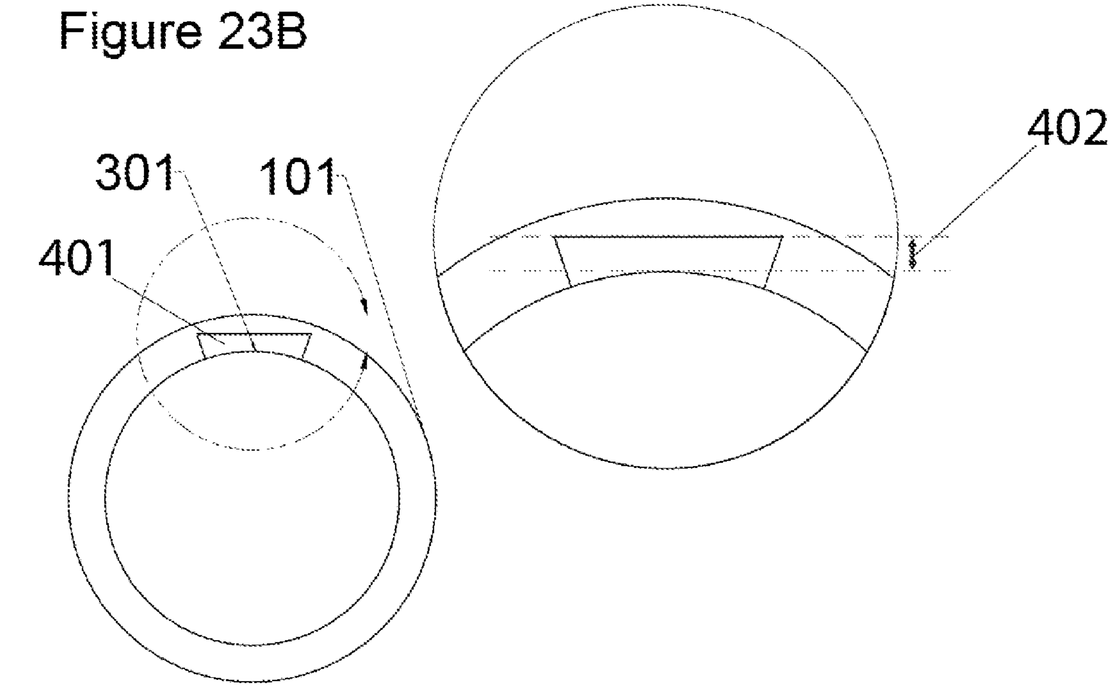
Figure 23C:
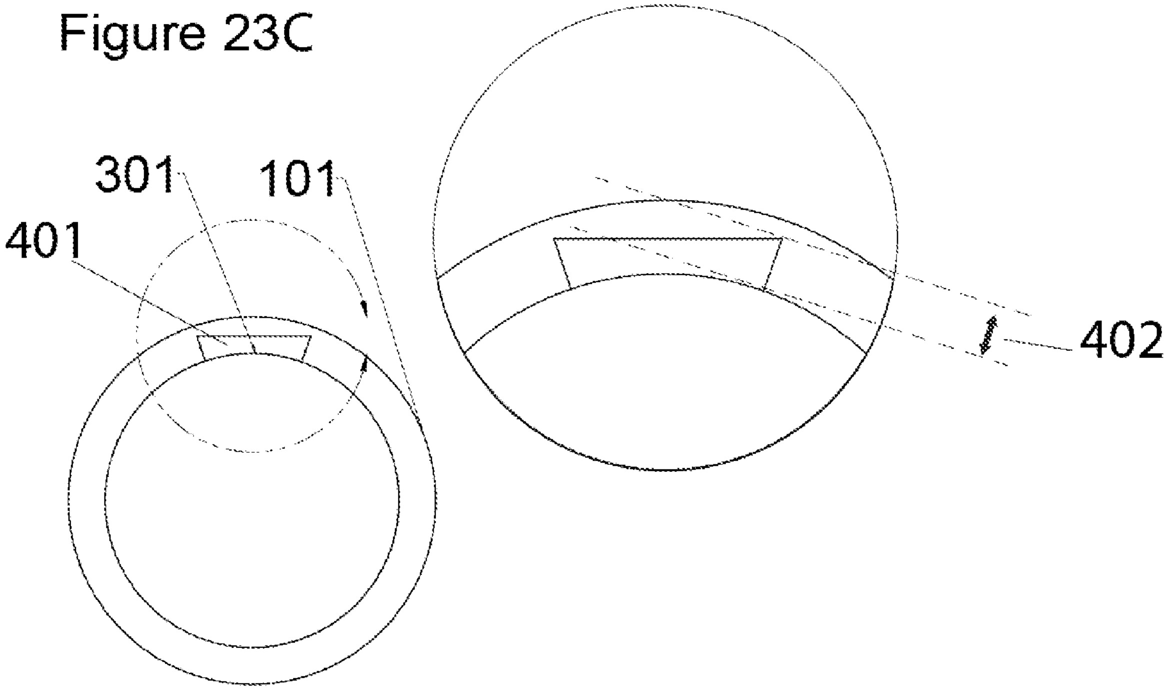
Figure 23D:
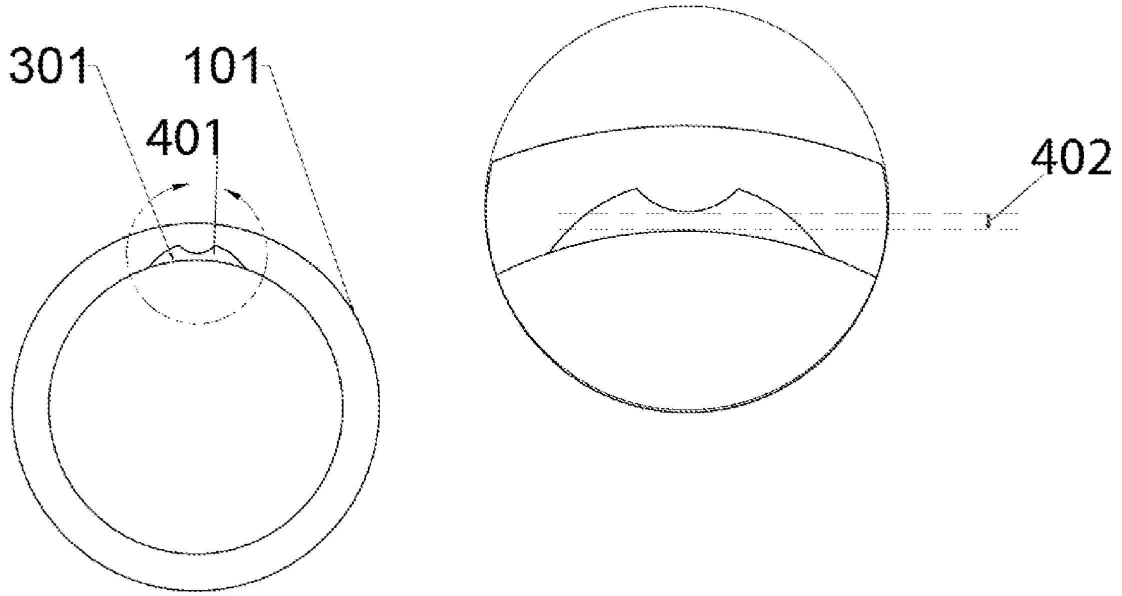
Figure 23E:
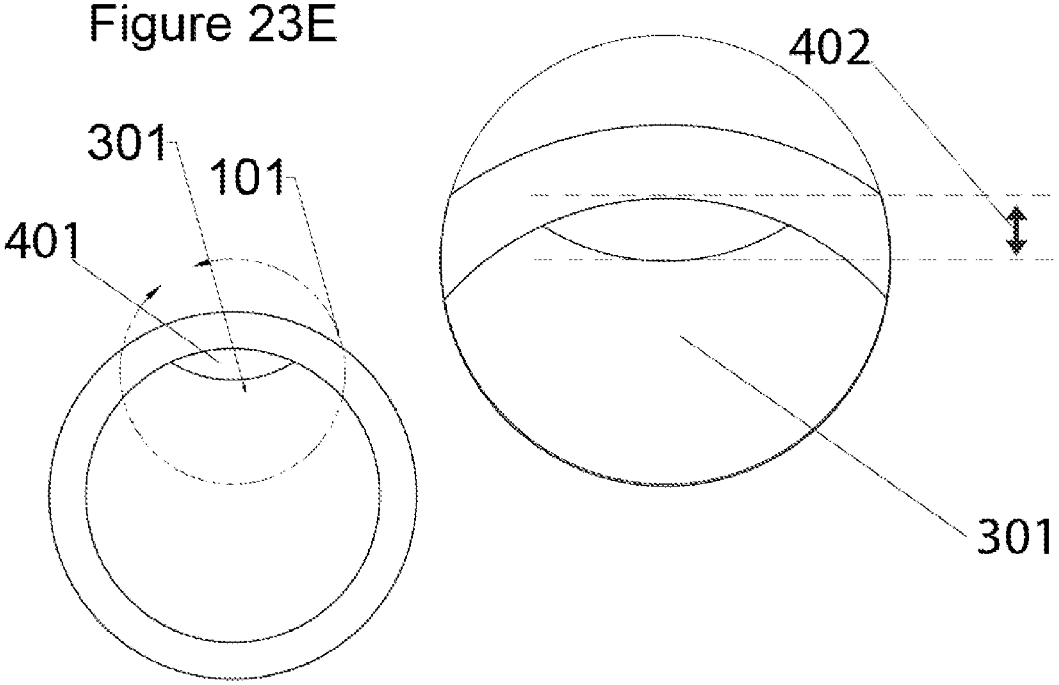

Referring to FIGS. 23A-23E, a vibration gap may be formed between a surface of the air conduit 101 and the air-filled object 301. FIGS. 23A-23D illustrate vibration gaps formed from a surface of a spherical or ovular air-filled object in combination with an air conduit containing an indentation, while FIG. 23E illustrates a cylindrical air passage, and a non-spherical air-filled object which may form a vibration gap, provided that the vibration gap distance 402 is between about 0-10 mm.

Figure 23F:
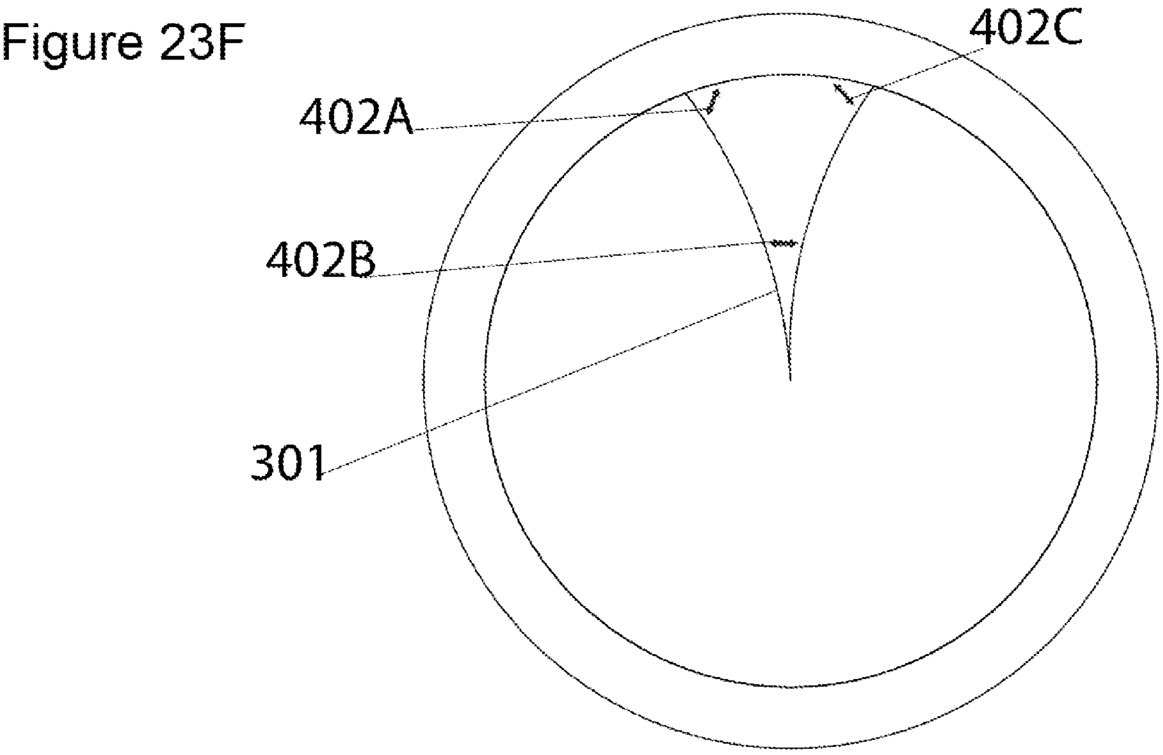
Figure 23G:
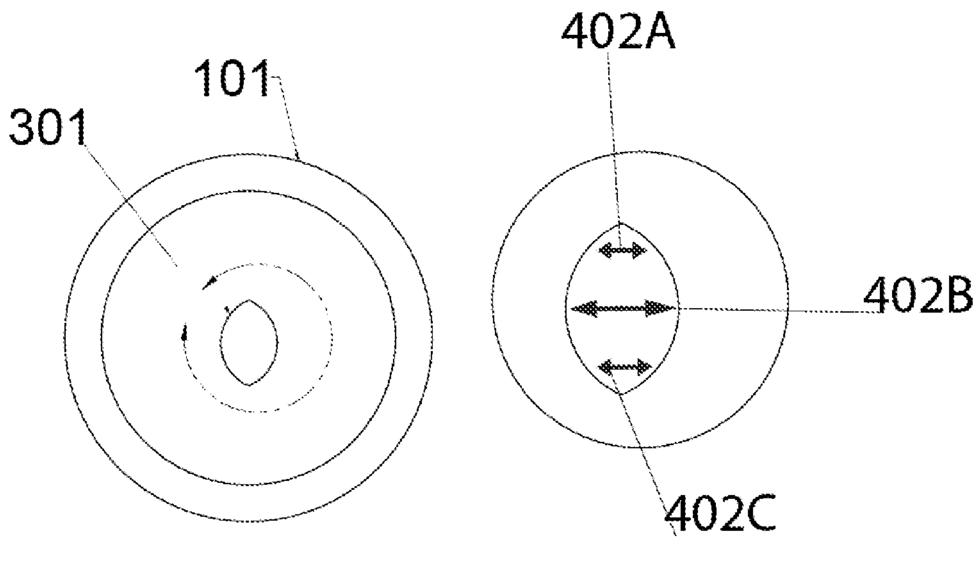
Figure 23H:
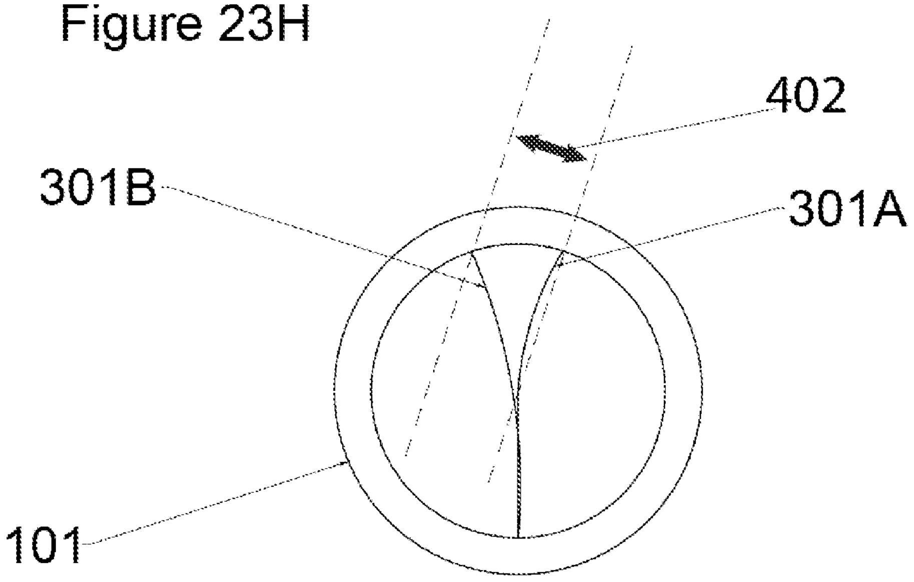
Figure 24A:
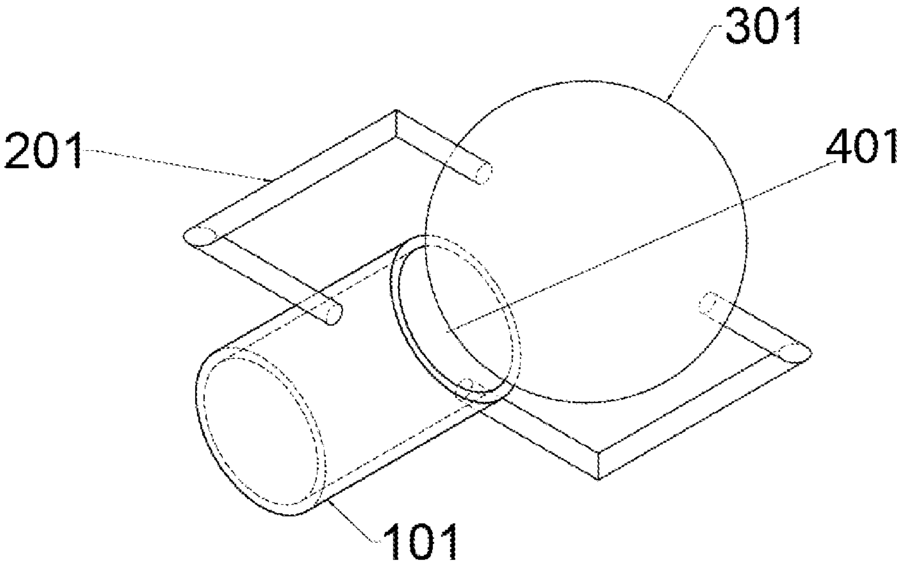
FIGS. 24A-24F: Various isometric views of embodiments of an aerophone instrument configured with differently shaped vibration gaps according to the present disclosure, where A is a circular vibration gap; B is a side view of the instrument shown in A featuring an air pathway; includes a detail view highlighting the vibration gap and vibration gap distance with respect to the main figure located on the right; C is an alternative embodiment of the instrument shown in A and B; D is an alternative embodiment to the instrument shown in C featuring a biconvex vibration gap; E is an alternative embodiment to the instrument shown in C featuring an angular vibration gap; F is an alternative embodiment to the instrument shown in C featuring a bell-shaped vibration gap.
Figure 24B:
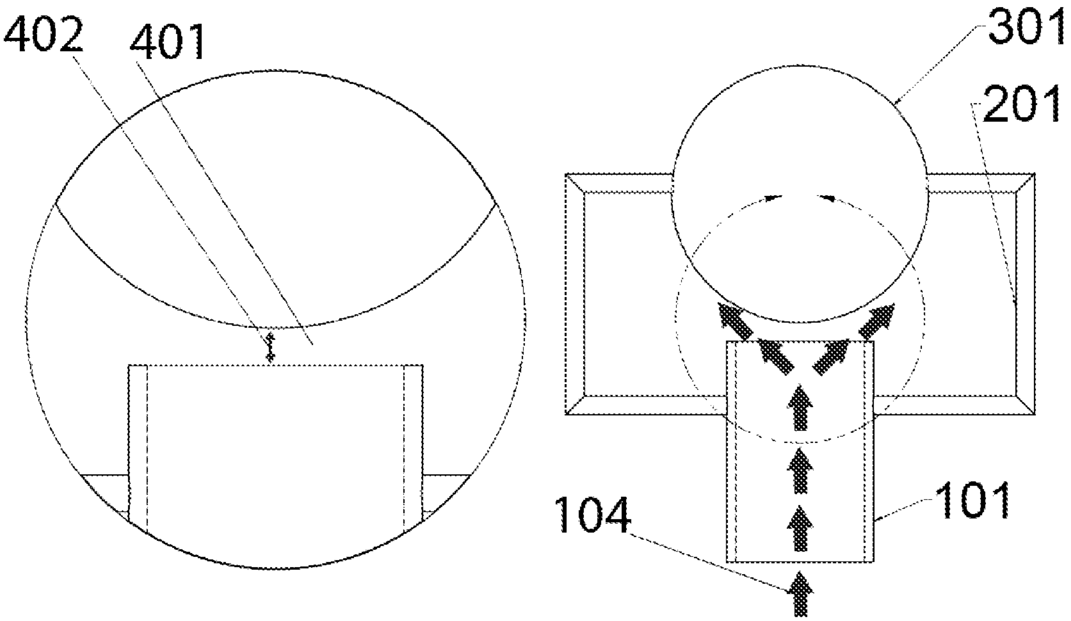
Figure 24C:
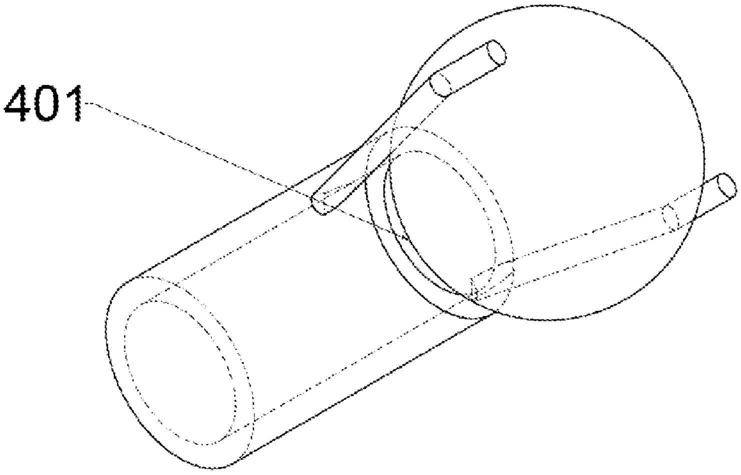
Figure 24D:
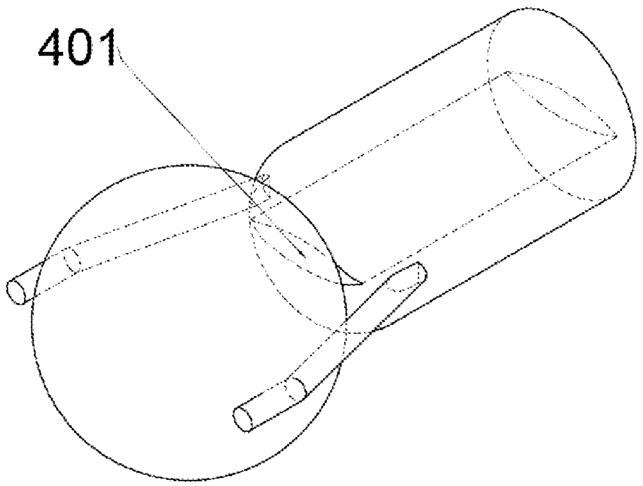
Figure 24E:
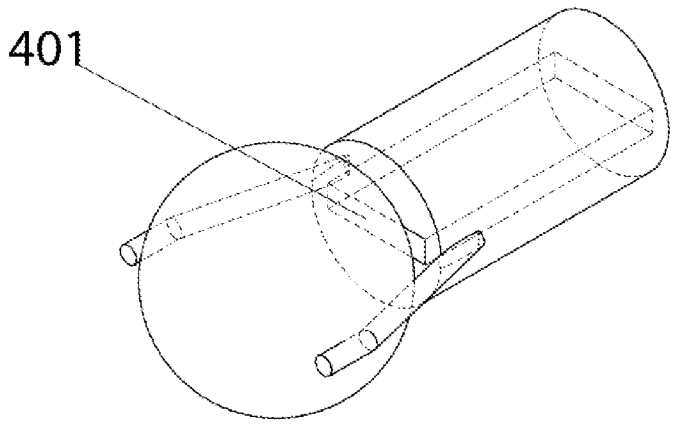
Figure 24F:
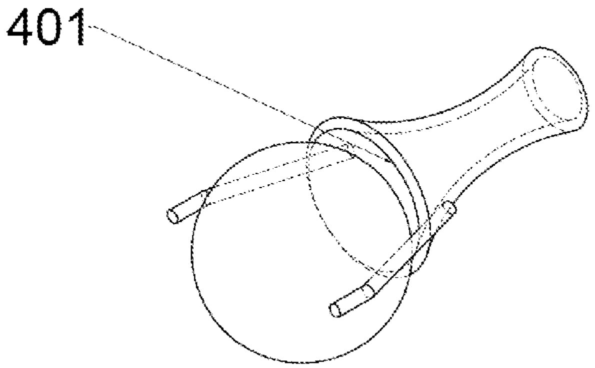

Within a vibration gap, once vibration of the wall of an air-filled object is initiated through the delivery of compressed air, the distance between a vibrating portion of the wall of an air-filled object and an opposing surface of an air conduit may exceed 10 mm. Varying the shape of the vibration gaps may change the frequency, tone, and/or other sound properties of the vibration. Referring to FIGS. 23F-23G, a vibration gap may be formed by one or more opposing surfaces of an air-filled object, or surfaces between an air-filled object and an air conduit's inner wall. For example, FIG. 23F illustrates three vibration gap distances 402A-402C between three surfaces where if any of the vibration gap distances are between about 0-10 mm then a vibration gap may be configured to produce vibration. Within the illustration of FIG. 23G, which features the air-filled torus object of FIG. 12J, a vibration gap may be formed by a narrowing of the air passage through the air-filled object, provided that any vibration gap distances 402A-402C between two or more opposing surfaces is between about 0-10 mm. Referring to FIG. 23H, two or more air-filled objects may create a vibration gap between two or more opposing surfaces.

FIGS. 24A-24F illustrate examples of differently shaped air passages within assembled aerophone instrument embodiments, and exemplify how a vibration gap may be present between any surface of the air-filled object 301, and any opposing surface of the air conduit 101 along an air pathway 104 (referring to FIG. 24B) provided that the vibration gap distance 402 is between about 0-10 mm. FIGS. 24C-24F illustrate how differently shaped air passages may be configured within an instrument. Differently shaped air conduits and passages create different tonal qualities from the sound that is produced at the vibration gap.

Figure 25A:
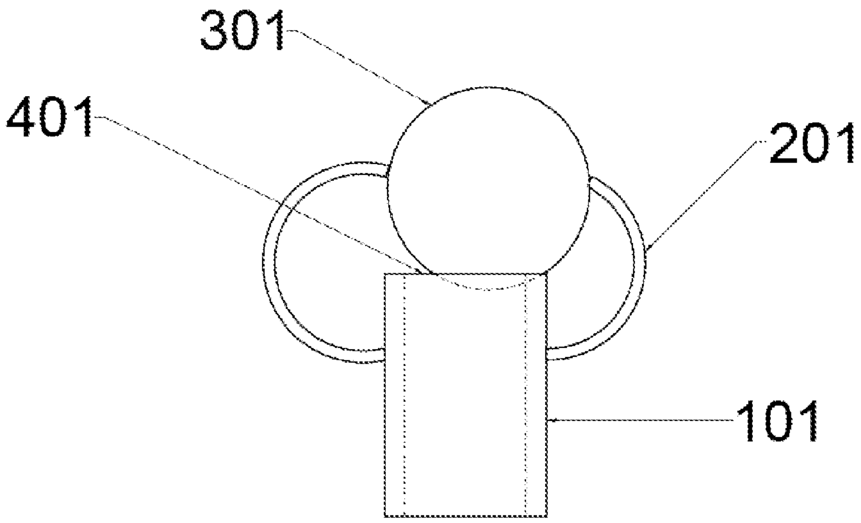
FIGS. 25A-25D: A is another embodiment of an aerophone instrument according to the present disclosure that is configured to produce a vibration upon delivery of compressed air, where the air-filled object can be positioned to a side of the instrument; B is an alternative embodiment to the aerophone instrument shown in A featuring threaded object positioners which provide placement options for an air-filled object over an opening of the air conduit to modulate the vibration; C is an alternative embodiment to the aerophone instrument shown in B featuring an adjustable threaded pipe segment positioning system that is not configured for producing a vibration; D is the embodiment shown in C that is configured to produce a vibration upon the delivery of sufficient amount and pressure of compressed air.
Figure 25B:
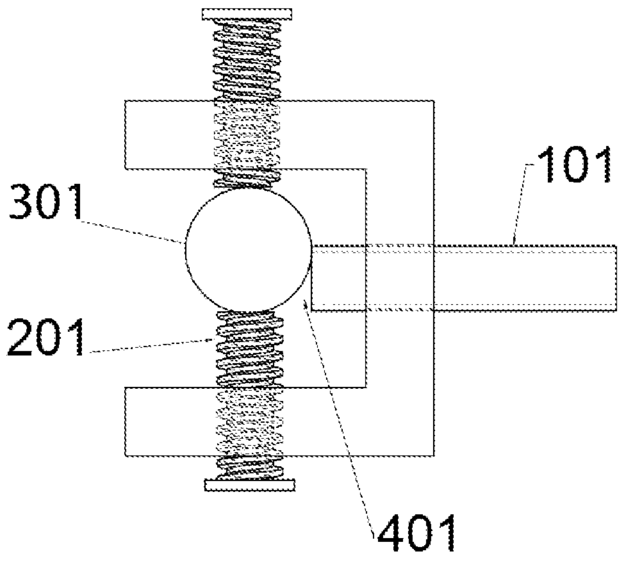

Referring to FIG. 25A the vibration gap 401 is slightly to one side of an air-filled object and an air conduit 101, which does not impede the function of the aerophone instrument, so long as air is restricted to about a 0-10 mm size gap between the surface of an air-filled object and an opposing surface of the air conduit which contains an opening to the air passage. FIG. 25B illustrates that a threaded object holder 201 may facilitate the placement of the air-filled object 301 to one side of an air passage, or to create about a 0-10 mm distance between an air-filled object and an opposing surface of the air conduit which contains an opening to the air passage.

Figure 25C:
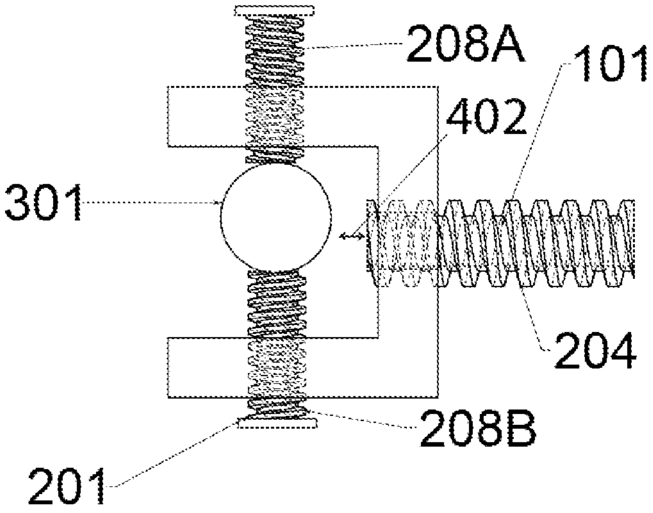
Figure 25D:
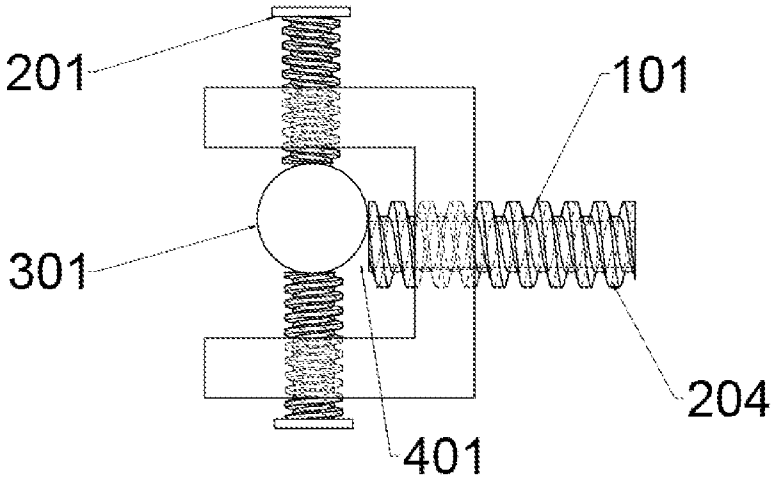

Referring to FIG. 25C, an embodiment of the aerophone instrument may contain a threaded male pipe segment positioning means 204 which may facilitate the creation of a vibration gap by adjusting the vibration gap distance 402. For example, FIG. 25D is the instrument of FIG. 25C, where the end of the pipe segment positioning means 204 has been positioned about 0-10 mm away from the surface of the air-filled object 301.

Figure 26:
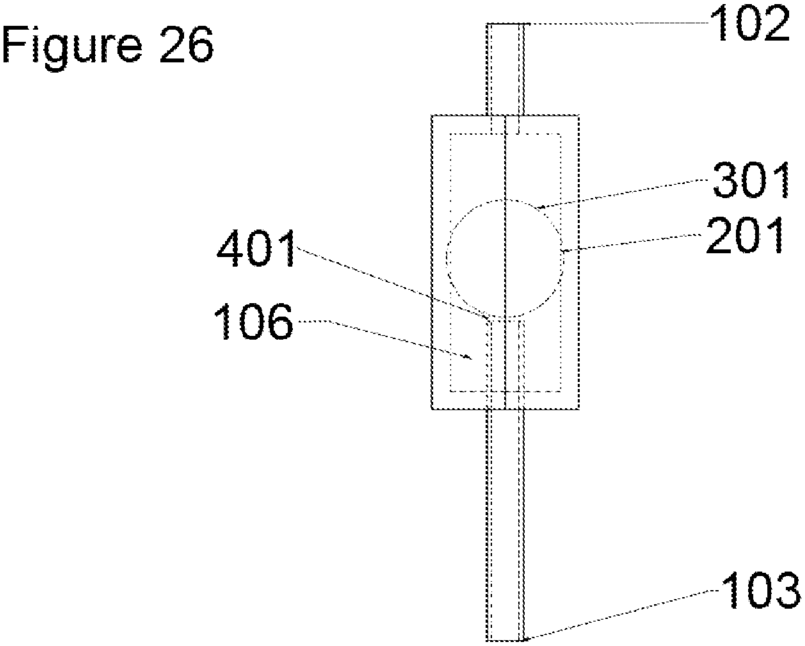
FIG. 26: An embodiment of an aerophone instrument according to the present disclosure that is configured to produce a vibration upon the delivery of sufficient amount and pressure of compressed air. The air-filled object is positioned using the inner surfaces of the chamber segment of the air conduit closest to the air-filled object, while allowing air to flow around the air-filled object through the air passage spaces between the wall of the air-filled object and the remaining inner surfaces that do not come into contact with said wall, being further away from the air-filled object.
Figure 27:
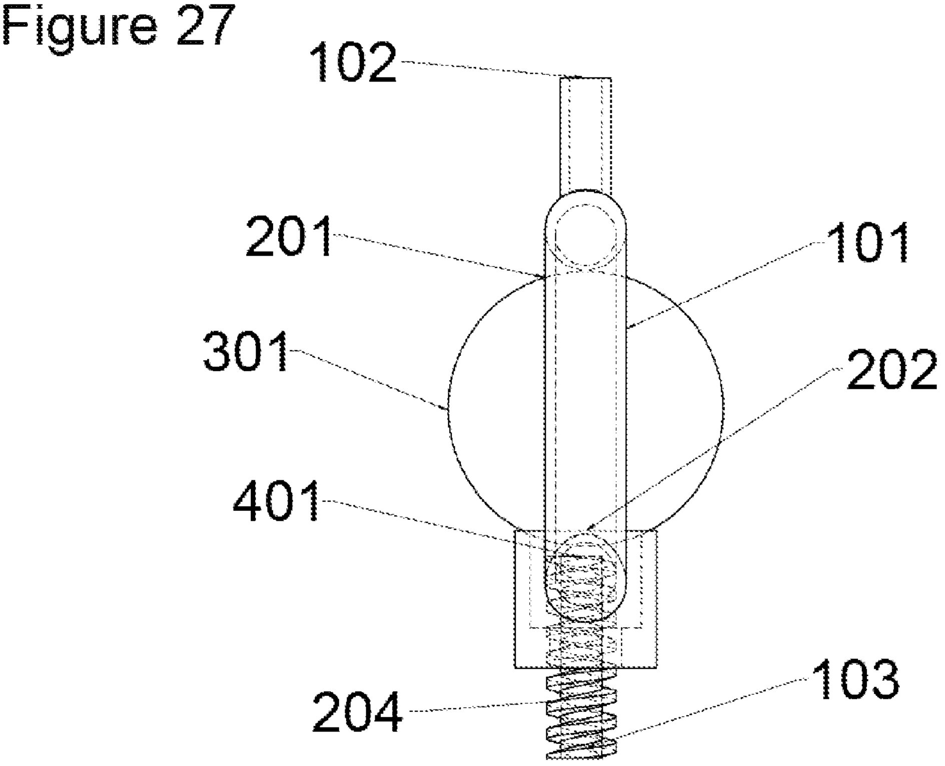
FIG. 27: A side view of the torus-shaped aerophone instrument shown in FIGS. 18-20 illustrating how the instrument is configured to produce a vibration upon the delivery of sufficient compressed air.
Figure 28:
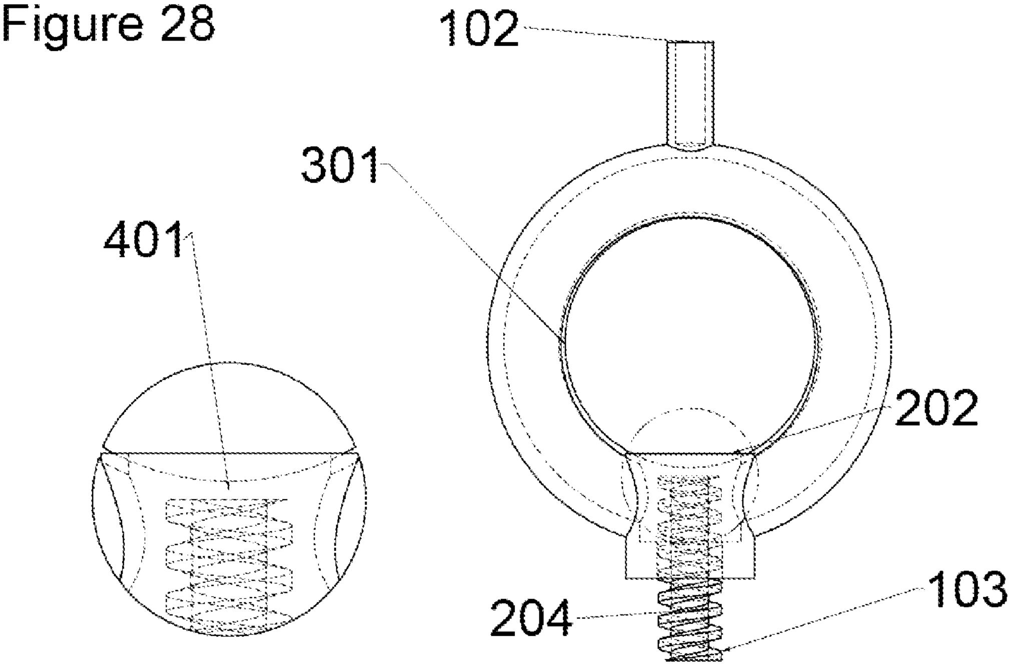
FIG. 28: A is an alternative front view of the aerophone instrument shown in FIG. 27 illustrating how this exemplary prototypic embodiment of the instrument is configured to produce a vibration upon the delivery of compressed air in a sufficient amount and at a sufficient pressure; includes a detail view highlighting the instrument's vibration gap with respect to the main figure located on the right.

Referring to FIG. 26, the vibration gap may be within a pipe segment which protrudes within the chamber segment 106 of the air conduit. An embodiment of the instrument may include a method for reducing or expanding the vibration gap size, such as a slip-fit friction connection between the pipe segment and the air-filled object, and/or a user may reposition the air-filled object to expand or shorten the vibration gap distance. As is illustrated in FIG. 27 by pipe segment positioning means 204, a threaded pipe segment may be used to create a vibration gap 401. FIG. 28 shows a variation of the torus-shaped instrument featured in FIG. 19, and illustrates a detail view of a threaded method for lengthening or shortening the gap between a surface of the air conduit and the opposing surface of the air-filled object. In both FIGS. 27 and 28, the vibration anchor points 202 provide stability for the vibrating surface of the air-filled object 301.

Figure 29:
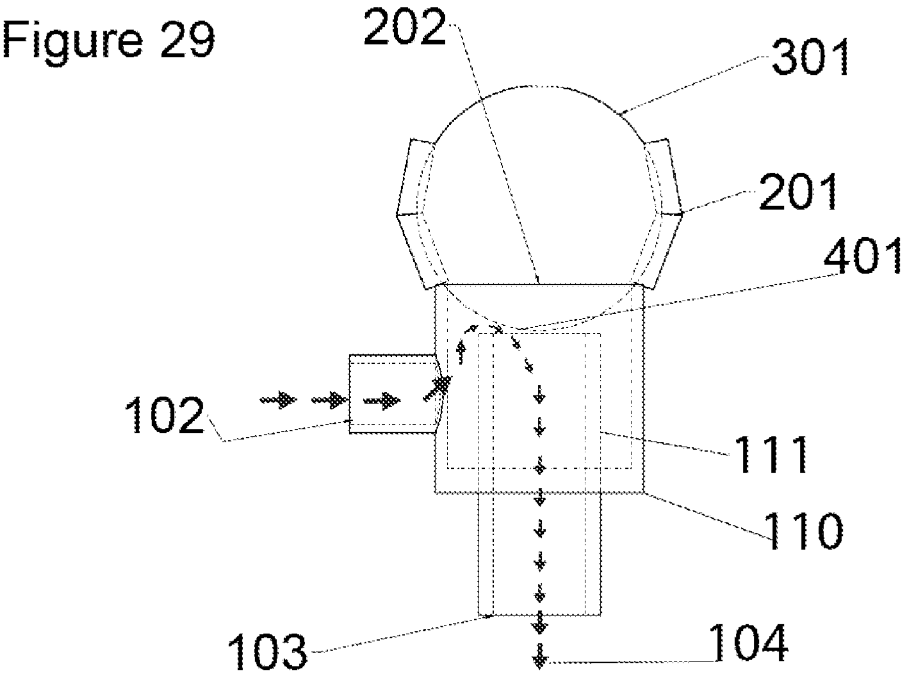
FIG. 29: Another view of the instrument shown in FIG. 16 configured to produce a vibration.
Figure 30:
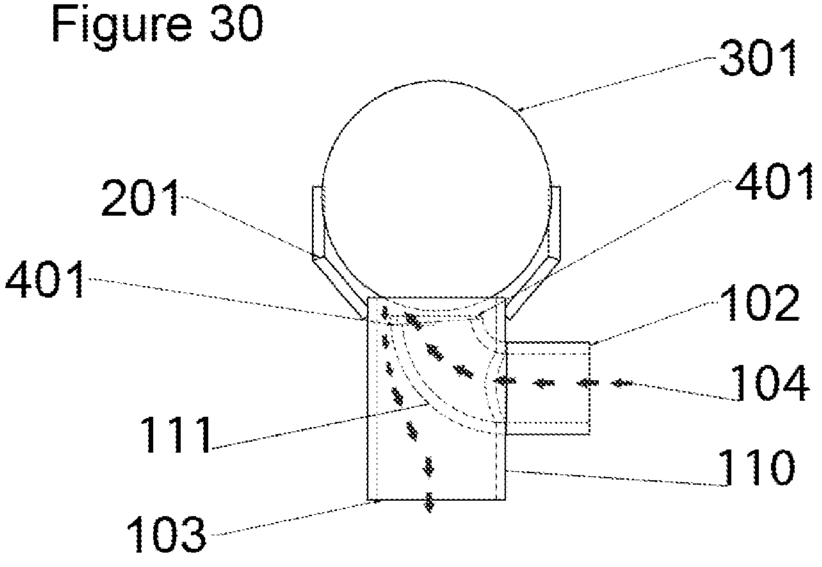
FIG. 30: Another view of the instrument shown in FIG. 17 configured to produce a vibration.

Referring to FIG. 29 the vibration gap 401 may exist between any opposing surface of the air conduit and the air-filled object, regardless of whether the air pathway 104 travels from an outside pipe segment 110 to an inside pipe segment 111, or from an an inside pipe segment 111 to an outside pipe segment 110 (referring to FIG. 30).

Example 4: Exemplary Tension Altering Means

Air-filled objects may be differentially inflated or tensioned as a means to alter their surface area tension.

Figure 31:
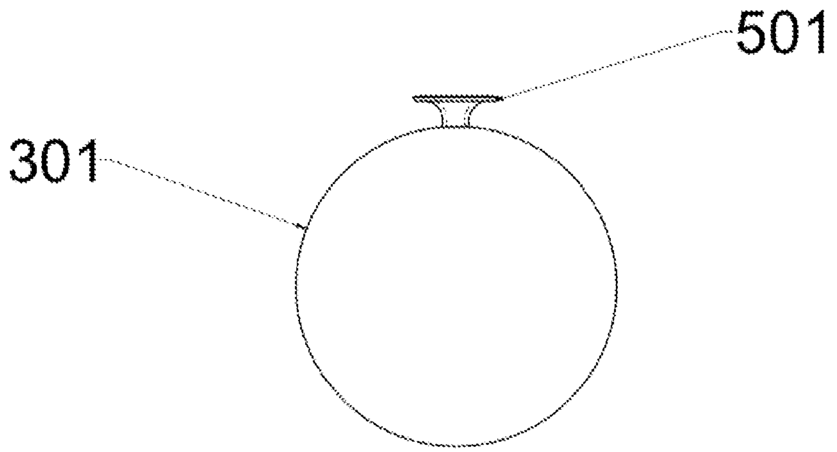
FIG. 31: A view of an embodiment of an air-filled object according to the present disclosure configured for inflation using a method for sealing air.

Referring to FIG. 31, the air-filled object 301 may use a method for sealing air within an air-filled object 501, which in one embodiment is a valve. In other embodiments, the method to seal the air-filled object is a knot, a clip, an O-ring, a plug, glue, adhesives, stickers, or any other method to seal the air-filled object.

Figure 32:
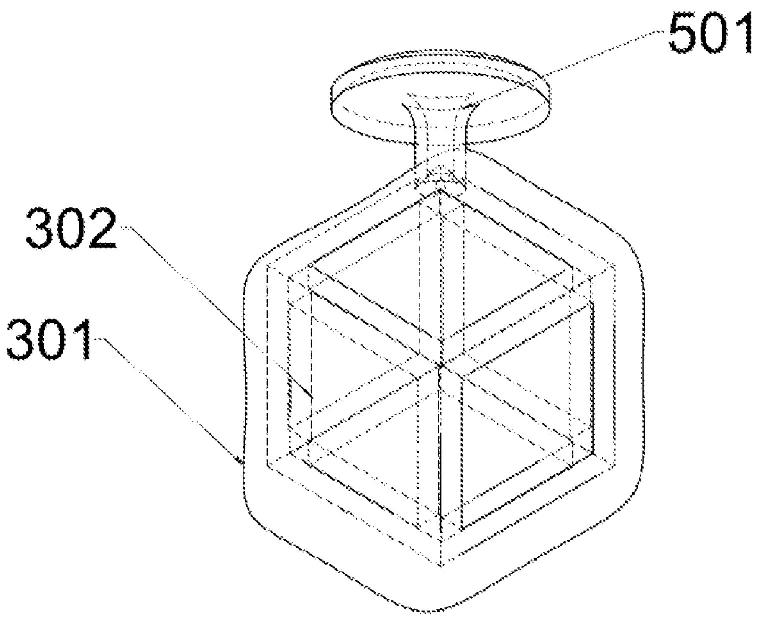
FIG. 32: An isometric view of an embodiment of an air-filled object according to the present disclosure configured for deflation using a method for sealing air.

By inflating an air-filled object, the surface tension of the air-filled object's wall is increased. It is also possible to deflate an air-filled object using a rigid structure within the object to increase surface tension of the object (for example the air-filled object in FIG. 12H). Referring to FIG. 32, which is a similar embodiment to the air-filled object of FIG. 12H, a rigid structure 302 may be placed inside of, or joined to material to create a structural component which resists structural collapse while sealing less than atmospheric pressure within the air-filled object. An air-filled object may enclose argon, or other noble gasses to create plasma effects within the air-filled object under lower than atmospheric pressure. Although the air-filled object of FIG. 32 has a rigid structure inside of the air-filled object, a multi-material air-filled object may be sewed, adhered, fastened, or joined together in order to create a vessel which holds lower than atmospheric pressure.

Air-filled objects may contain anchor points 303, as illustrated in FIG. 33, which may act as part of a tension altering means by expanding the air-filled object, or otherwise stretching the wall of the air-filled object using fasteners 502, and applying expansion forces 503 which may be actuated with mechanisms such as, but not limited to cams, lead screws, and rope clutches.

Referring to FIG. 34, compression of the air-filled object may serve as a tension altering means using positioners such as but not limited to threads, slip fit connections, and cams. FIG. 34 illustrates a threaded object holder which may be adjusted to compress the air-filled object 301.

Example 5: Exemplary Sound Modulation Means

Sound may be modulated within the aerophone instrument using methods which adjust air resistance, which in turn may adjust sound properties of the air-filled object. FIGS. 35A-35B illustrate an aerophone instrument configured with four separate sound modulation means; tone holes 601; a pipe segment sound modulation means 602 (which serves a dual function as pipe segment positioning means 204); a horn attachment 603; and female/male tuning connectors 605 and 606, which may shorten or lengthen the air conduit for the purpose of fine-tuning frequencies produced by the aerophone instrument. Tone holes 601, which also function as air outlets, may lengthen or shorten the air pathway within an air passage formed by the air conduit, in order to modulate the frequency of vibration that can be produced using the instrument, and simultaneously alter the point(s) at which compressed air exits the instrument. For example, if all tone holes are covered, a horn attachment 603 may amplify the lowest note on the aerophone instrument as compressed air exits the instrument from the horn attachment's opening. By covering tone holes 601 as a sound modulation means in FIGS. 35A-35B, the aerophone instrument may also produce different frequencies of sound. The aerophone instrument in FIG. 35A uses the torus-shaped air conduit shown in FIG. 8F, which may be joined to a male connection 205 where internal threading inside the part may function as the female pipe segment positioning means 203, in order to overcome the limitations of rotational moulding and blow molding manufacturing processes. By adjusting the length of the air conduit using the female tuning connector 605 and the male tuning connector 606, the frequency of the aerophone may be fine-tuned. A detail view to the left of the main figure in FIG. 35A illustrates that a male pipe segment positioning means 204 may also be configured to serve a dual function as a sound modulation means 602 by adjusting the distance between two or more surfaces of the vibration gap, which alters the vibration gap distance 402. The assembled version of the instrument in FIG. 35B illustrates that by increasing the vibration gap distance 402, and using pipe segment positioning sound modulation means 602 to modulate the sound produced at the vibration gap 401, the instrument may produce different sounding timbres, tones, and/or harmonics.

Referring to FIG. 36, another means of sound modulation is a sliding joint 604, which can lengthen or shorten an air passage, and which may change the sound properties of an aerophone instrument, specifying instruments which are similar but not limited to trombones and slide didgeridoos.

Figure 37:
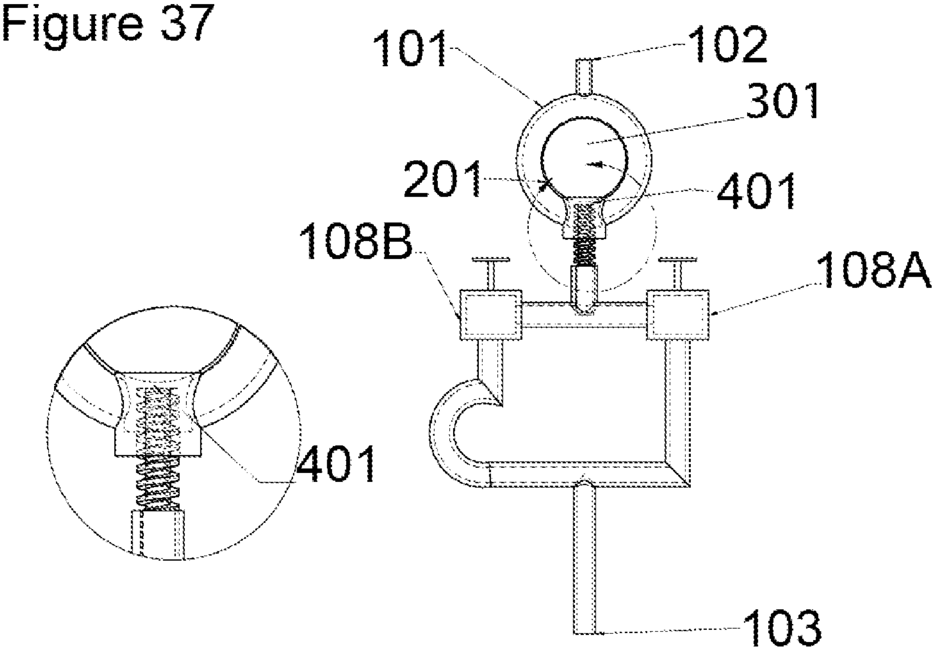
FIG. 37: An embodiment of an aerophone instrument according to the present disclosure configured with a sound modulation means using tone holes and valves downstream of the air-filled object with reference to the flow of air from the air source; includes a detail view highlighting the instrument's vibration gap with respect to the main figure located to the right.

Within the aerophone instrument of FIG. 37 one or more valves 108 may be used to lengthen or shorten an air passage, which may modulate sound properties produced by an aerophone instrument, specifying instruments which are similar but not limited to trumpets and tubas.

Figure 38:
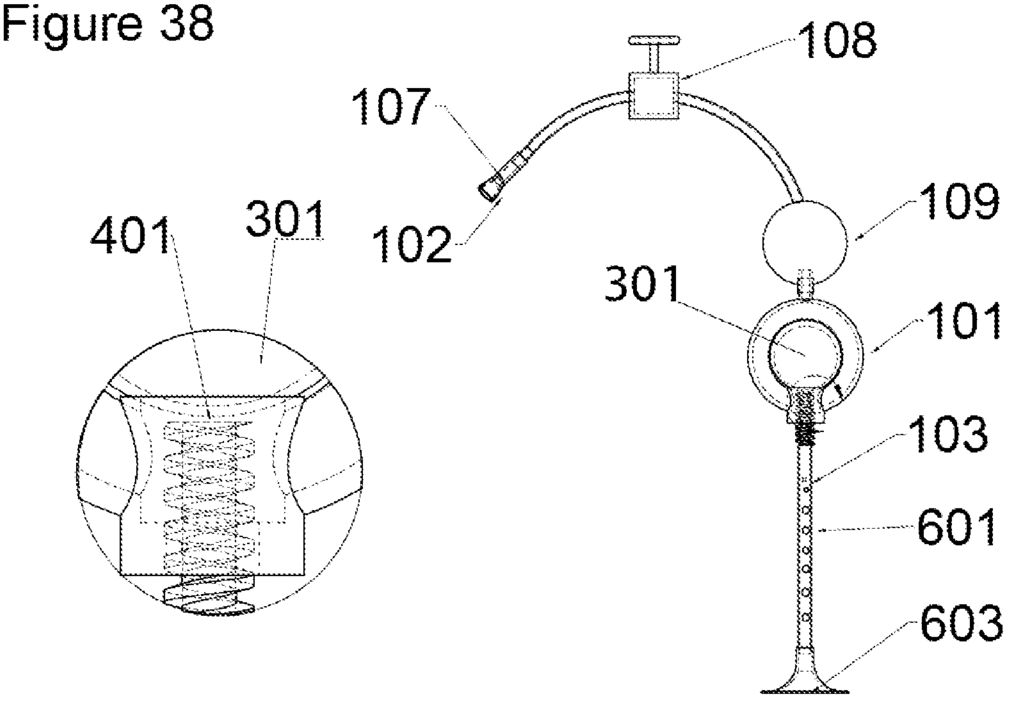
FIG. 38: An embodiment of an aerophone instrument according to the present disclosure configured with a sound modulation means using a valve upstream of the air-filled object with reference to the flow of air from the air source; includes a detail view highlighting the instrument's vibration gap in proximity to the air-filled object and threaded connection interface, with respect to the main figure located to the right.

Sound may be modulated by adjusting air pressure within the air conduit upstream of the vibration gap 401 with reference to the flow of air from the air source. For example, in FIG. 38 valve 108 may be used to limit the amount of air, or increase the amount of air supply, which may act as a modulation means for fine-tuning the instrument, or in other embodiments for turning the instrument on or off. It should be noted that valve 108 may be any type of method to increase or decrease pressure within an air conduit, for example a valve may include the bending of flexible tubing, ball valves, piston valves, and rotary valves. Within the aerophone of FIG. 38, tone holes 601 can be used to further modulate sound. In another embodiment illustrated in FIG. 39 the air-filled object may use valves 108A-108C to provide air to air conduits from an air source 701, and ultimately, deliver air to one or more vibration gaps 401A-401C. The aerophone instrument illustrated in FIG. 39 may use a plurality of valves and vibration gaps in an assembly similar to a pipe organ.

Figure 40:
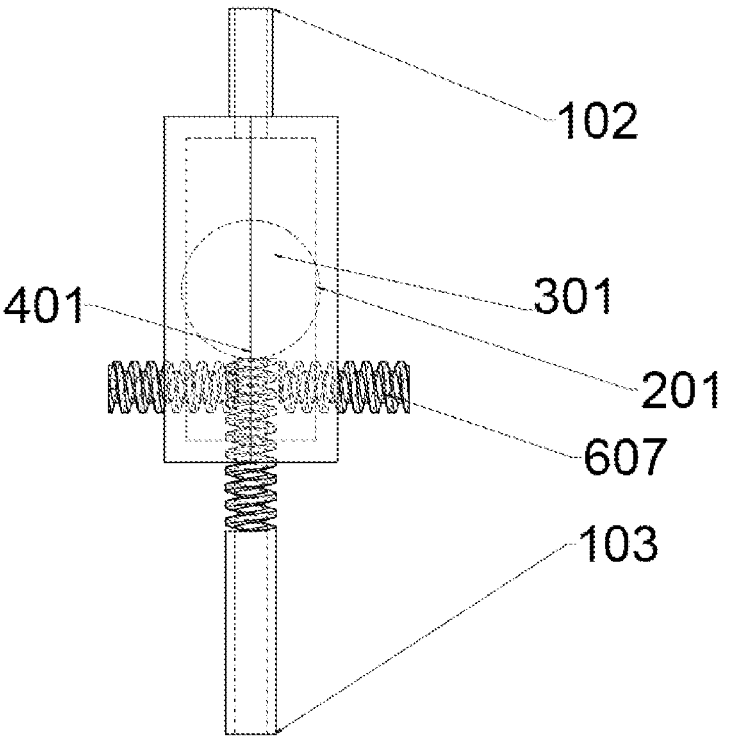
FIG. 40: An embodiment of an aerophone instrument according to the present disclosure configured with a sound modulation means by repositioning the air-filled object relative to an opening in the air conduit.

The specific shape of the air passage(s) nearest to the vibration gap may modulate the sound properties of the aerophone instrument. For example, FIGS. 24A-24F illustrate various pipe segment shapes in relation to vibration gaps which may influence vibration properties. Referring to FIG. 40, the vibration gap may be adjusted using a sound modulation means, such as a vibration gap positioner 607, which may push or pull a flexible, rigid, or semi-rigid pipe segment and thereby adjust the shape of the vibration gap to achieve a modulation of sound properties. For example, vibration gap shapes which are circular or ovular may sound similar to the linguistic vowels of "O" or "U", while crescent shaped vibration gaps may sound similar to the vowels of "I" or "E". The vibration gap positioner 607 allows for the production of specific tones by adjusting the vibration gap's shape between one or more air-filled objects and one or more pipe segments, and may be actuated using positioning systems like threads, cams, slip fit joints, latches, rack and pinions, or other systems. Variation of the air-filled object's position, as depicted in FIGS. 25A-25D may also result in tonal, timbral, volume, and harmonic changes.

Figure 41:
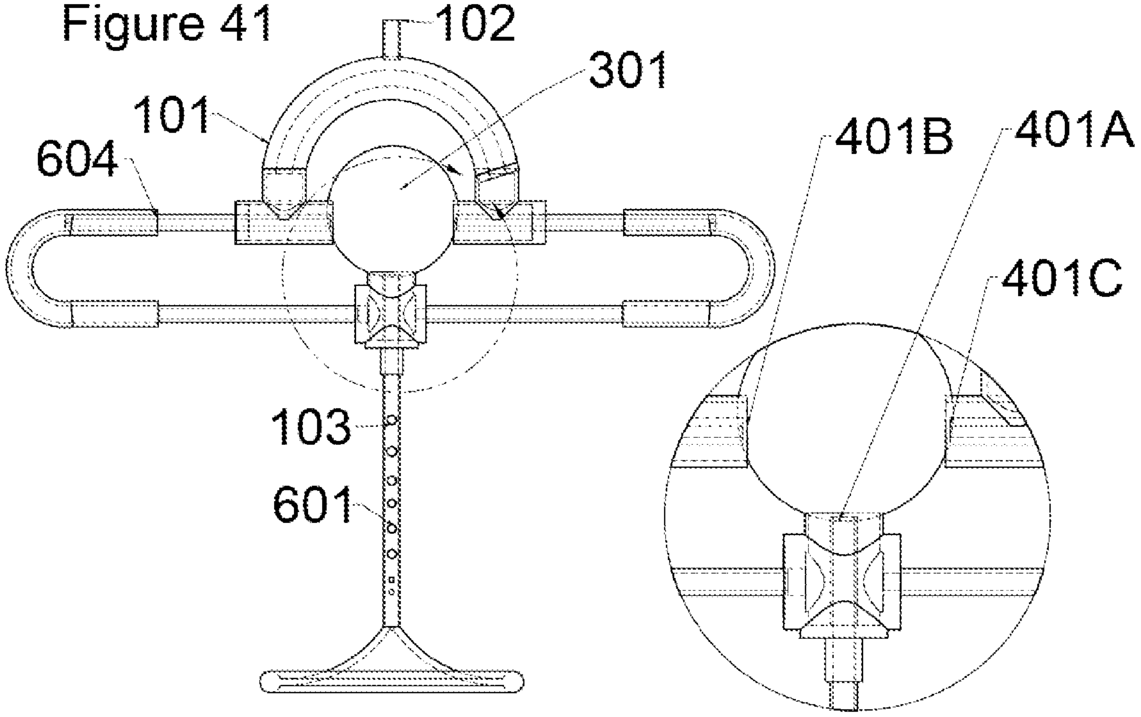
FIG. 41: An embodiment of an aerophone instrument according to the present disclosure configured with a sound modulation means using sliders and tone holes; includes a detail view highlighting a first and a second vibration gap, which may produce vibrations that modulate a third vibration at a third vibration gap, with respect to the main figure located on the left.

The configuration of the instrument leading to the generation of sound produced from a first vibration lead to the modulation of a second vibration (through the manipulation of volumes of compressed air) and may emulate the sounds of a didgeridoo, or the rolled linguistic "R" (e.g. an alveolar trill). For example, within the embodiment illustrated in FIG. 41, a first vibration produced at vibration gap 401B and a second vibration produced at vibration gap 401C may modulate a third vibration produced at vibration gap 401A. Within the embodiment of FIG. 41 the frequencies produced at vibration gaps 401B and 401C can be modulated using sliding joints 604, prior to traveling through the air passage to vibration gap 401A to dynamically modulate the vibration produced at vibration gap 401A, which may be further modulated using tone holes 601.

Figure 42:
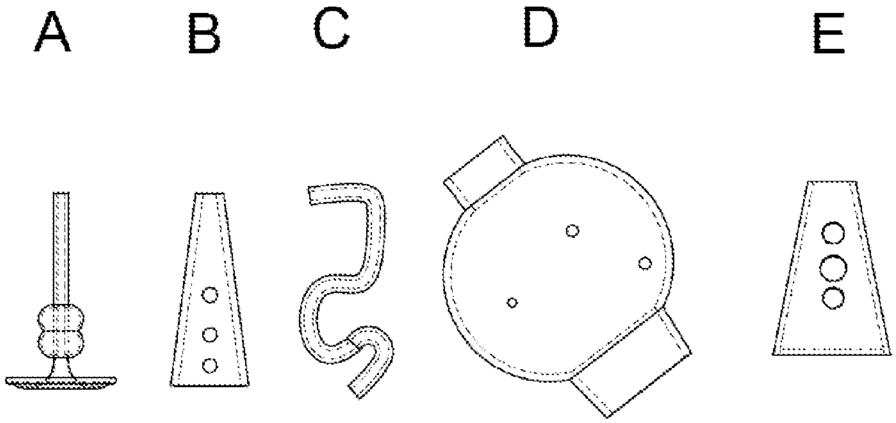
FIGS. 42A-42E: Various embodiments of sound modulation means according to the present disclosure using various air conduit segment shapes and/or playable interfaces where A is a pipe with a resonating bulbous form; B is a conical segment form with tone holes; C is a nonlinear pipe; D is a curved form with tone holes; and E is a pyramidal segment form with tone holes.

Another means for modulating sound may be interchanging pipe (air conduit) segments by adding or subtracting pipe segments to an instrument. Examples of pipe segments which may be interchanged to modulate sound are illustrated in FIGS. 42A-42E. Referring to sound modulation pipe segments illustrated in FIGS. 42A-42E, the shape of a pipe segment upstream or downstream of the air-filled object with reference to the flow of air from the air source may change vibration properties, and may be interchanged, or added to the air conduit. In general, a more bulbous-shaped pipe segment will change the vowel sound to an "O" or "U", whereas narrow shaped segments may change the vowel sound to resemble an "E" or an "I". Conical bore pipe segments, as illustrated in FIG. 42B, may produce a sound similar but not limited to a bagpipe chanter, a saxophone, or an oboe.

Example 6: Modular Instrument Systems

Figure 43A:
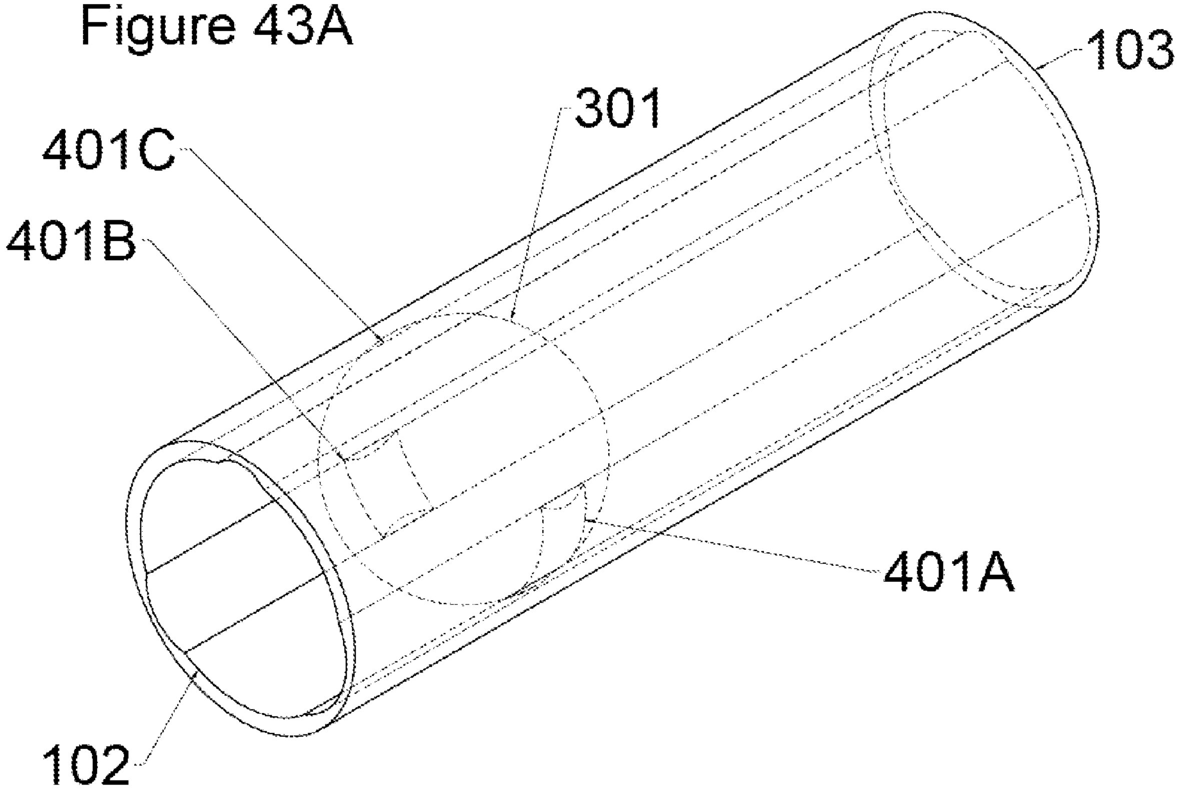
FIGS. 43A-43B: A is an isometric view of an alternative embodiment to the aerophone instrument shown in FIG. 22A, configured with a plurality of indentations in the inner wall of the air conduit segment to provide for a plurality of vibration gaps formed in between the air-filled object and the inner wall of the air conduit; B is a top view of A from the perspective of looking through the air passage in which the air-filled object is placed.
Figure 43B:
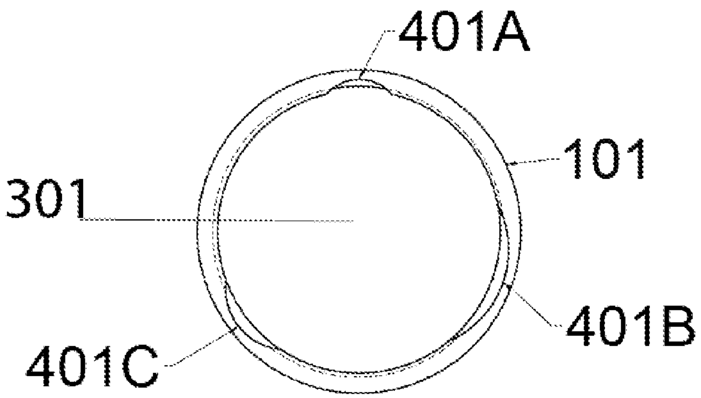

With reference to FIG. 43A a single air-filled object 301 positioned within the air conduit 101 may create one or more vibration gaps 401A-401C. A top view of the same instrument is illustrated in FIG. 43B in which vibration gaps 401A-401C may produce different frequency vibrations and/or tones and/or timbres.

In one embodiment, referring to FIG. 44, the aerophone instrument may contain one or more air-filled objects (301A-301B), and one or more vibration gaps (401A-401B). In another embodiment, referring to FIG. 45, an aerophone instrument may contain one or more air-filled objects, and one or more vibration gaps on each object, referring to 401A-401D.

Figure 46:
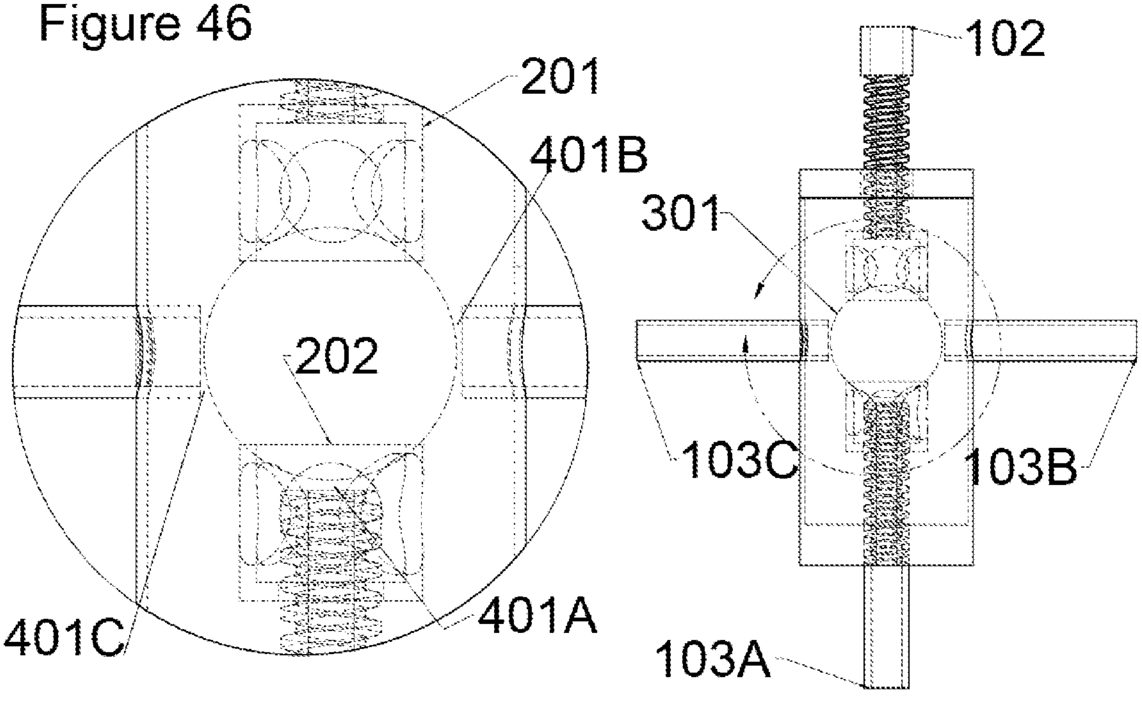
FIG. 46: An embodiment of an aerophone instrument according to the present disclosure configured with multiple vibration gaps which may produce multiple vibrations using one air-filled object; includes a detail view highlighting the instrument's three vibration gaps around one air-filled object, with respect to the main figure located on the right.

In yet another embodiment, referring to FIG. 46, a single air-filled object may host one or more vibration gaps 401A-401C within an air conduit featuring one or more air outlets, while in FIG. 47 an air conduit may host one or more air-filled objects (301A-301B), as well as one or more vibration gaps (401A-401C) featuring one or more air outlets 103A-103C.

Figure 49:
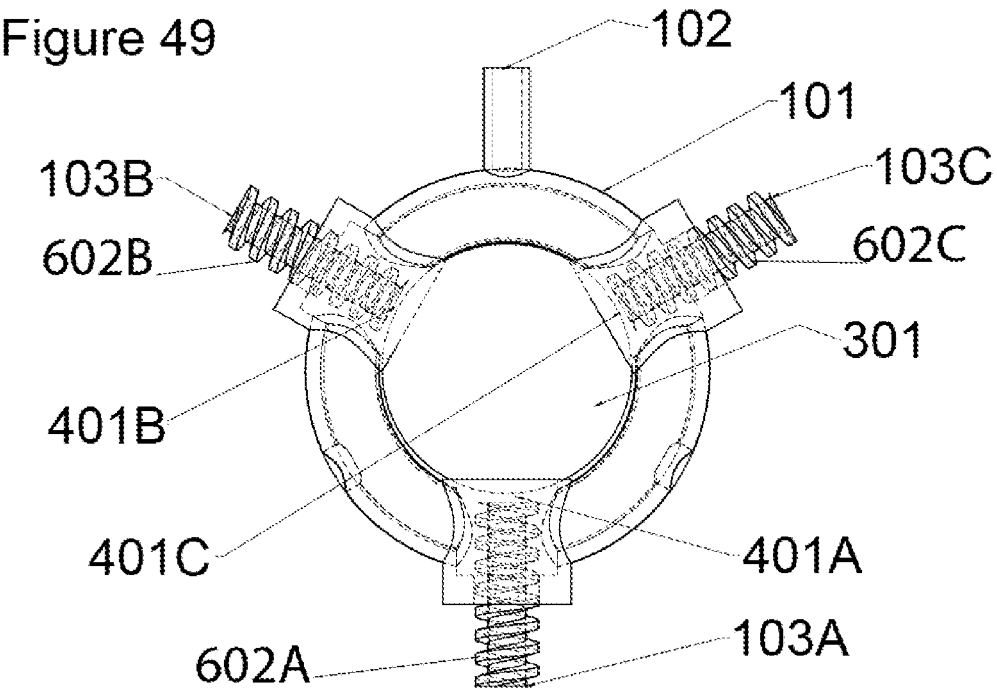
FIG. 49: An isometric view of another embodiment of an aerophone instrument according to the present disclosure configured with multiple vibration gaps which may produce vibrations using one air-filled object.

With reference to FIG. 48A, an embodiment may use one or more air-filled objects to define one or more vibration gaps 401A-401B, and feature one or more air outlets 103A-103B. FIG. 48B is a similar embodiment to the instrument of FIG. 48A, illustrating that an embodiment may contain more than one means for sound modulation, as illustrated by two interfaces featuring tone holes 601A and 601B. As illustrated in FIG. 49 an aerophone instrument may incorporate multiple vibration gaps 401A-401C, which may produce a tone through each of its respective air outlets 103A-103C, and may utilize threaded pipe segment 602A-602C as a means for modulating sound from vibration gaps 401A-401C.

Referring to FIG. 50, an aerophone instrument may contain one air-filled object 301 defining one or more vibration gaps and one or more air outlets distributed within a 3D form, where the air-filled object may be inflated while remaining within the object holder. Alternatively, referring to FIG. 51, an aerophone instrument may utilize a single air-filled object 301 with one or more vibration gaps 401A-401H to produce multiple vibrations through an air conduit utilizing a single air outlet 103.

Figure 52:
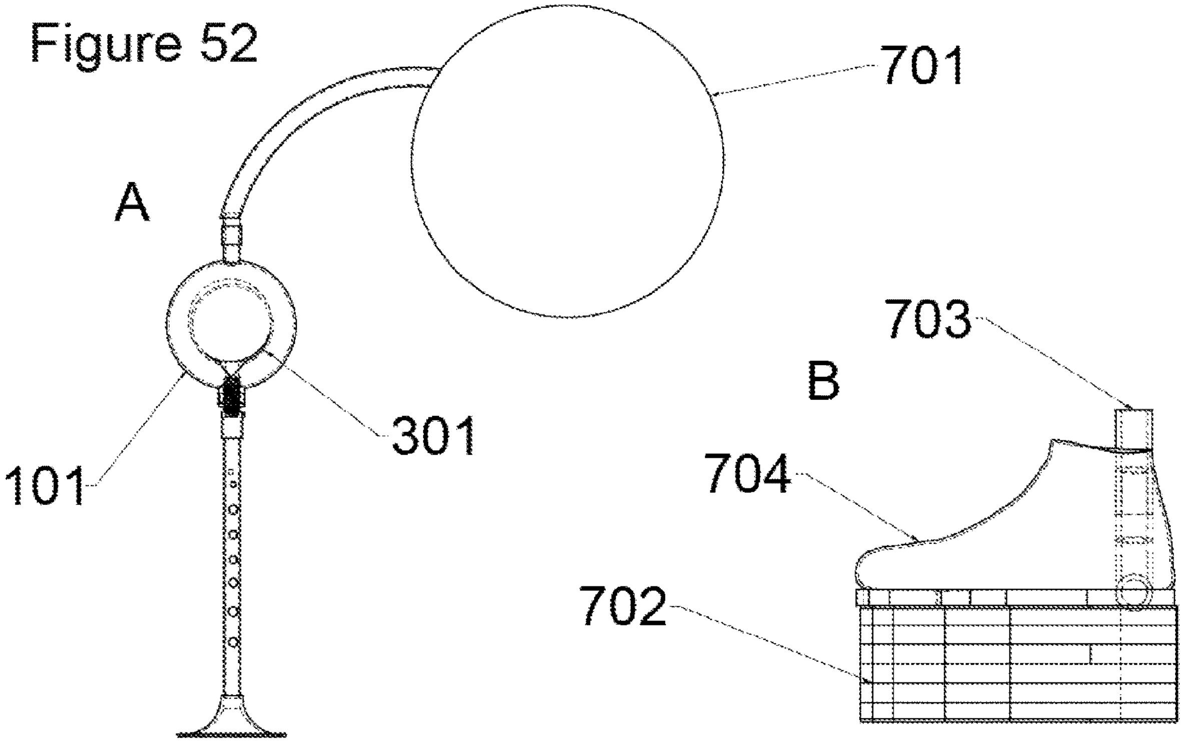
FIGS. 52A-52B: A is a means of supplying compressed air to an aerophone instrument according to the present disclosure using a hose connected to an air source; B is another means of supplying compressed air to an aerophone instrument using air pumping shoes.

Referring to FIGS. 52A-52B, an air source 701 is required to supply air to an aerophone instrument in order to produce vibration and sound. Air may be supplied into the air conduit using a player's lungs, an air compressor, a piston, a bellow, or any source of air pressure delivered through an air inlet into any embodiment of the instrument according to the present disclosure. With reference to FIG. 52B, a user may produce compressed air using air-pumping shoes 704 by pumping a bellow 702 with their legs and feet, which may serve as an alternative source of compressed air for any aerophone instrument that is connected to an air discharge hose 703, which is in turn connected to the air inlet of an aerophone instrument. Alternative sources of compressed air such as the air-pumping shoes 704 allow a user to sing or vocalize while producing vibration through an aerophone instrument.

Figure 53:
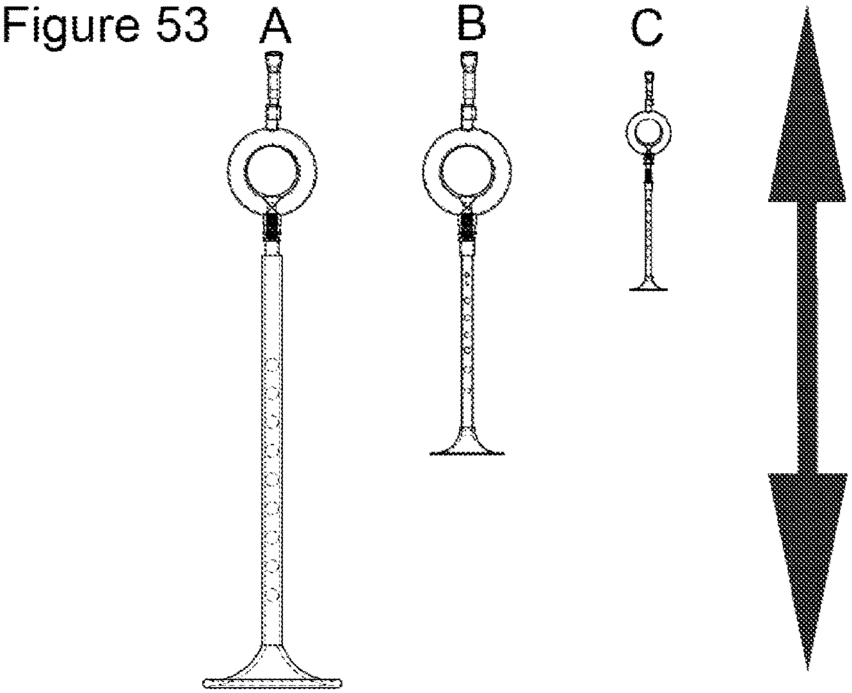
FIG. 53: Three similar prototypic embodiments of an aerophone instrument according to the present disclosure illustrating relative scale and size options.

Certain embodiments may utilize nonlinear pipe segments, and/or may be hundreds of feet in length, while the pipe segments featured in other embodiments may be relatively short. Referring to FIGS. 53A-53C, certain embodiments of aerophone instruments are illustrated which may produce a sound decibel volume between 40-95 dB. FIG. 53A illustrates a bass range aerophone instrument where its air conduit length measures between 18 inches to 50 feet, and produces vibrations between about 20-500 Hz at between about 40-95 dB. Tenor range aerophone instruments, referring to FIG. 53B may have air conduit lengths that measure between 12 to 48 inches, and produce frequencies between about 120-700 Hz at about 40-95 dB. Referring to FIG. 53C, alto range aerophones may have air conduit lengths that measure between 3 to 18 inches, and produce frequencies between about 200 Hz and 2000 kHz at about 40-95 dB.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

FIGURE FEATURE LIST

101 air conduit
102 air inlet
103 air outlet
104 air pathway
105 air passage
106 chamber segment
107 mouthpiece
108 valve
109 air reservoir
110 outside pipe segment
111 inside pipe segment
201 object holder
202 vibration anchor points
203 female pipe segment positioning means
204 male pipe segment positioning means
205 male connection
206 female connection
301 air-filled object
302 rigid structure of air-filled object
303 anchor points on an air-filled object
401 vibration gap
402 vibration gap distance
501 method for sealing air within an air-filled object
502 fasteners
503 representation of expansion forces applied to fasteners 502
504 compression thread interface
601 tone holes
602 pipe segment sound modulation means
603 horn attachment
604 sliding joint
605 female tuning connector
606 male tuning connector
607 vibration gap positioner
701 air source
702 bellow
703 air discharge hose
704 air-pumping shoes The embodiments of the invetion in which an exclusive property or privilege is claimed are defined as follows:

1. An apparatus for assembling an aerophone instrument comprising:

a) an air conduit with a first end and a second end and one or more segments to provide an air passage;

b) one or more air inlets, each disposed on the air conduit to create an air entry point and configured for a delivery of a first volume of compressed air to the air passage of the air conduit;

c) one or more air outlets, each disposed on the air conduit to create an air exit point and configured for a release of a second volume of compressed air along one or more air pathways in the air passage, each defined by a position of one of the one or more air inlets and a position of one of the one or more air outlets along the air conduit; and d) a means for positioning an enclosed air-filled object to be operatively associated with the air conduit; and wherein when the enclosed air-filled object is operatively associated with the air conduit using the means for positioning the enclosed air-filled object the aerophone instrument is assembled, a vibration gap in fluid communication with an opening to the air passage is formed between an area of an external wall of the enclosed air-filled object and an opposing surface, and a first volume of compressed air can be delivered to enter the air conduit through one of the one or more air inlets to cause a portion of the area of the external wall of the enclosed air-filled object to vibrate at the vibration gap and cause a second volume of compressed air to vibrate in the air passage as some or all of said second volume of compressed air exits the air conduit from one of the one or more air outlets and thereby generate sound.

2. The apparatus according to claim 1, wherein at the vibration gap there is a vibration gap distance between the portion of the area of the external wall of the enclosed air-filled object and the opposing surface that is between 0-10 mm.

3. The apparatus according to claim 1, wherein the means for positioning the enclosed air-filled object comprises one or more vibration anchor points to keep the enclosed air-filled object stationary in a desired position.

4. The apparatus according to claim 1, wherein the one or more segments of the air conduit each define a segment of the air passage.

5. The apparatus according to claim 1, wherein one of the one or more segments of the air conduit may be interchanged with another segment of an air conduit.

6. The apparatus according to claim 1, wherein the apparatus further comprises one or more sound modulation means.

7. The apparatus according to claim 6, wherein one of the one or more sound modulation means comprises a means to alter the one or more air pathways, a means to change the position of the enclosed air-filled object and remain operatively associated with the air conduit, or a means to alter a tension of the external wall of the enclosed air-filled object when operatively associated with the air conduit.

8. The apparatus according to claim 6, wherein one of the one or more sound modulation means comprises one or more segments of an air conduit; one or more mouthpieces, tone holes, keys, valves, sliders, horn attachments, and tuning connectors; the means for positioning the enclosed air-filled object to be operatively associated with the air conduit; a means for deflating or inflating and resealing the enclosed air-filled object; fasteners operatively associated with an actuation mechanism for stretching the external wall of the enclosed air-filled object; sand, styrofoam balls; or other rigid or semi-rigid structures placed inside of the enclosed air-filled object.

9. The apparatus according to claim 1, wherein the apparatus further comprises a connector means to join the air conduit to an air conduit of another apparatus and multiply available air pathways.

10. The apparatus according to claim 1, wherein the one of the one or more air inlets is configured to be operatively connected to a source of compressed air.

11. A method of assembling an aerophone instrument comprising the steps of:

a) providing an apparatus comprising:
   i. an air conduit with a first end and a second end and one or more segments to provide an air passage;
   ii. one or more air inlets, each disposed on the air conduit to create an air entry point and configured for a delivery of a first volume of compressed air to the air passage of the air conduit;
   iii. one or more air outlets, each disposed on the air conduit to create an air exit point and configured for a release of a second volume of compressed air along one or more air pathways in the air passage, each defined by a position of one of the one or more air inlets and a position of one of the one or more air outlets along the air conduit; and
   iv. a means for positioning an enclosed air-filled object to be operatively associated with the air conduit; and
b) positioning the enclosed air-filled object to be operatively associated with the air conduit using the means for positioning the enclosed air-filled object; and wherein when the enclosed air-filled object is operatively associated with the air conduit using the means for positioning the enclosed air-filled object the aerophone instrument is assembled, a vibration gap in fluid communication with an opening to the air passage is formed between an area of an external wall of the enclosed air-filled object and an opposing surface, and a first volume of compressed air can be delivered to enter the air conduit through one of the one or more air inlets to cause a portion of the area of the external wall of the enclosed air-filled object to vibrate at the vibration gap and cause a second volume of compressed air to vibrate in the air passage as some or all of said second volume of compressed air exits the air conduit from one of the one or more air outlets and thereby generate sound.

12. The method of claim 11, wherein at the vibration gap there is a vibration gap distance between the portion of the area of the external wall of the enclosed air-filled object and the opposing surface that is between 0-10 mm.

13. The method of claim 11, wherein the means for positioning the enclosed air-filled object comprises one or more vibration anchor points to keep the enclosed air-filled object stationary in a desired position.

14. The method according to claim 11, wherein the one or more segments of the air conduit each define a segment of the air passage.

15. The method according to claim 11, wherein one of the one or more segments of the air conduit may be interchanged with another segment of an air conduit.

16. The method according to claim 11, wherein the apparatus further comprises one or more sound modulation means.

17. The method according to claim 16, wherein one of the one or more sound modulation means comprises a means to alter the one or more air pathways, a means to change the position of the enclosed air-filled object and remain operatively associated with the air conduit, or a means to alter a tension of the external wall of the enclosed air-filled object when operatively associated with the air conduit.

18. The method according to claim 16, wherein one of the one or more sound modulation means comprises one or more segments of an air conduit; one or more mouthpieces, tone holes, keys, valves, sliders, horn attachments, and tuning connectors; the means for positioning the enclosed air-filled object to be operatively associated with the air conduit; a means for deflating or inflating and resealing the enclosed air-filled object; fasteners operatively associated with an actuation mechanism for stretching the external wall of the enclosed air-filled object; sand, styrofoam balls; or other rigid or semi-rigid structures placed inside of the enclosed air-filled object.

19. The method according to claim 11, wherein the apparatus further comprises a connector means to join the air conduit to an air conduit of another apparatus and multiply available air pathways.

20. The method according to claim 11, wherein the one of the one or more air inlets is configured to be operatively connected to a source of compressed air.

* * * * *